United States Patent
Yamada et al.

(10) Patent No.: US 8,310,094 B2
(45) Date of Patent: Nov. 13, 2012

(54) POWER SUPPLY SYSTEM

(75) Inventors: Kazuo Yamada, Nara (JP); Ryoji Matsui, Gose (JP); Ayumi Yagi, Yamatotakada (JP); Naoki Yoshimi, Kashiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 815 days.

(21) Appl. No.: 12/162,408

(22) PCT Filed: Jan. 25, 2007

(86) PCT No.: PCT/JP2007/051187
§ 371 (c)(1),
(2), (4) Date: Nov. 4, 2008

(87) PCT Pub. No.: WO2007/086472
PCT Pub. Date: Aug. 2, 2007

(65) Prior Publication Data
US 2009/0302681 A1 Dec. 10, 2009

(30) Foreign Application Priority Data

| Jan. 27, 2006 | (JP) | 2006-019244 |
| Apr. 25, 2006 | (JP) | 2006-120659 |
| Aug. 17, 2006 | (JP) | 2006-222676 |
| Sep. 22, 2006 | (JP) | 2006-257424 |

(51) Int. Cl.
*H02J 1/12* (2006.01)
*H02J 7/00* (2006.01)
*H02J 9/00* (2006.01)

(52) U.S. Cl. .......................... 307/46; 307/66

(58) Field of Classification Search .............. 307/46, 307/66
See application file for complete search history.

(56) References Cited

U.S. PATENT DOCUMENTS

| 4,725,740 | A * | 2/1988 | Nakata ............ 307/64 |
| 2003/0047209 | A1 | 3/2003 | Yanai et al. |
| 2006/0055366 | A1* | 3/2006 | Tsunetsugu et al. ..... 320/101 |
| 2007/0034246 | A1* | 2/2007 | Nakata ............ 136/244 |

FOREIGN PATENT DOCUMENTS

| JP | 58-175929 | 10/1983 |
| JP | 61-135366 | 6/1986 |

(Continued)

OTHER PUBLICATIONS

International Search Report for PCT/JP2006/324755 dated Mar. 13, 2007.

(Continued)

*Primary Examiner* — Rexford Barnie
*Assistant Examiner* — Dru Parries
(74) *Attorney, Agent, or Firm* — Nixon & Vanderhye P.C.

(57) ABSTRACT

A power supply system capable of smoothing photovoltaic generation output, and enabling time shift is provided. A power supply system including a DC power supply string in which a storage battery is connected in parallel to a DC power supply; and a DC/AC power conversion device for connecting the DC power supply string to a power system or a load is provided. A switch is connected between the DC power supply and the storage battery, where an output power of the DC power supply or a combined output power of the DC power supply and the storage battery is switched and supplied to the DC/AC power conversion device by the switch. The photovoltaic generation output is thereby smoothed, and time shift is enabled.

34 Claims, 31 Drawing Sheets

FOREIGN PATENT DOCUMENTS

| | | | |
|---|---|---|---|
| JP | 6-266458 A | | 9/1994 |
| JP | 08-033211 | | 2/1996 |
| JP | 09-046912 | * | 2/1997 |
| JP | 09-091049 | | 4/1997 |
| JP | 10-201086 | | 7/1998 |
| JP | 11-089096 | | 3/1999 |
| JP | 11-206037 | | 7/1999 |
| JP | 2002-034175 A | | 1/2002 |
| JP | 2002-044869 | | 2/2002 |
| JP | 2003-079054 | | 3/2003 |

OTHER PUBLICATIONS

European Search Report dated Apr. 12, 2012 in corresponding European Application No. 07707419.3 (5 pages).

* cited by examiner

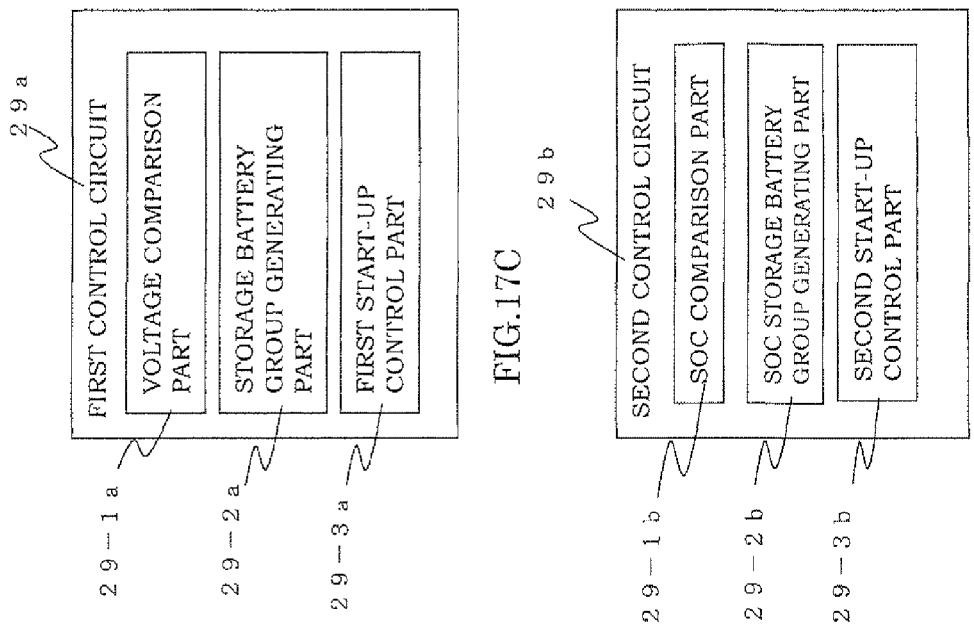
FIG.17B
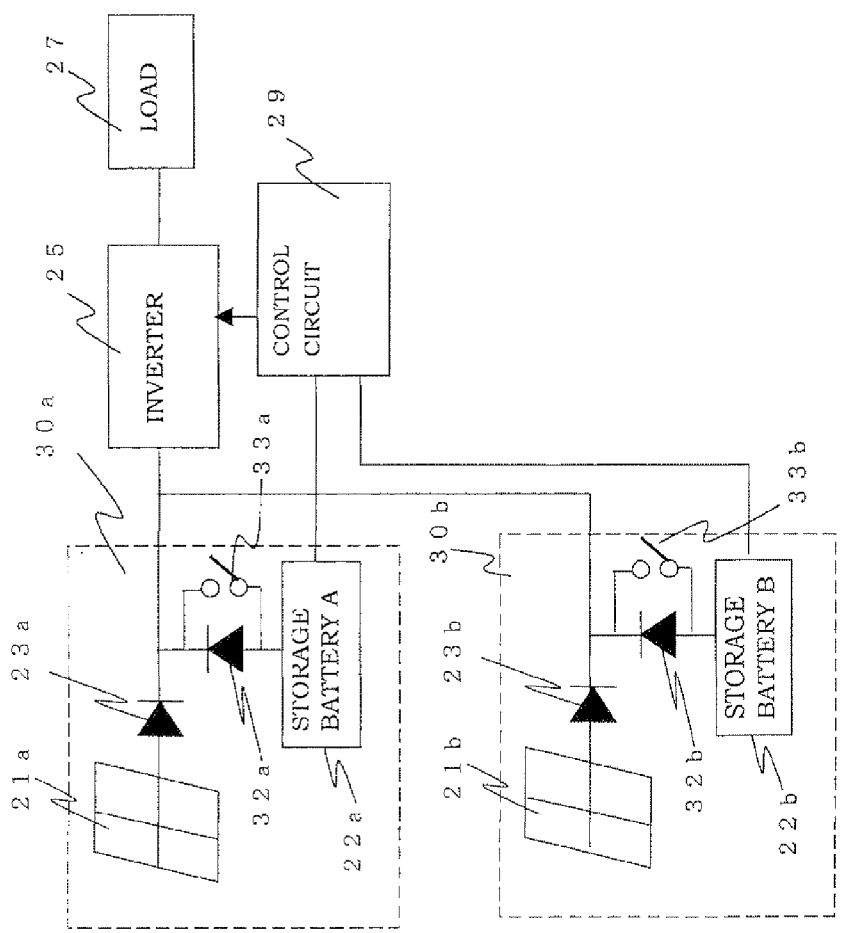
FIG.17A
FIG.17C

FIG.21

| INSTRUCTION PATTERN | INSOLATION INTENSITY (kW/m²) | | |
|---|---|---|---|
| | 0~0.3 | 0.3~0.6 | 0.6~1.0 |
| | QUANTITY CONTROL 1 | QUANTITY CONTROL 2 | ALL QUANTITY OPERATION |
| REQUESTED OUTPUT POWER TO EACH INVERTER | INSOLATION INTENSITY × GENERATED POWER OF ONE SOLAR BATTERY ARRAY × 3 | INSOLATION INTENSITY × GENERATED POWER OF ONE SOLAR BATTERY ARRAY × 1.5 | INSOLATION INTENSITY × GENERATED POWER OF ONE SOLAR BATTERY ARRAY × 1 |
| HOLDING TIME UNTIL NEXT DETERMINATION | 5min. IF INSOLATION INTENSITY IS CHANGED EXCEEDING THRESHOLD VALUE, REDETERMINATION OF INSTRUCTION PATTERN IS IMMEDIATELY PERFORMED | | | ize
POWER SUPPLY SYSTEM

This application is the U.S. national phase of International Application No. PCT/JP2007/051187, filed 25 Jan. 2007, which designated the U.S. and claims priority to Japanese Application No(s). 2006-019244, filed 27 Jan. 2006; 2006-120659, filed 25 Apr. 2006; 2006-222676, filed 17 Aug. 2006; and 2006-257424, filed 22 Sep. 2006, the entire contents of each of which are hereby incorporated by reference.

BACKGROUND OF THE INVENTION

1. Field of the Invention

The present invention relates to power supply systems including a DC power supply string in which a direct current (DC) power supply for outputting a DC power from a power generator such as solar battery, wind power generator, and fuel battery and a storage battery are connected in parallel; in particular, to a power supply system for smoothing the power variation of the DC power supply and time shifting the output power of the DC power supply.

The present invention also relates to a power supply system for converting the output power of the DC power supply which generated power amount greatly varies according to environment without requiring a complex control. The present invention also relates to a power supply system capable of supplying maximum power by equalizing each battery voltage so that one of a plurality of storage batteries is not overly used, and obtaining a total power of each storage battery.

2. Description of the Related Art

The output power generated by the power generator such as solar battery, wind power generator, and fuel battery can be supplied to an electrical load or reverse flowed to a commercial power source. In the prior art, however, the output of the solar battery, the wind power generator, or the fuel battery is stored in the storage battery, and collectively converted with the power of the storage battery in a power conditioner, and thus the conversion power of the power conditioner needs to be limited to avoid power flow-out from the storage battery to the commercial power source. The limitation of the conversion power of the power conditioner results in limiting the generating power of the solar battery, the wind power generator, or the fuel battery, and thus maximum output of the solar battery, the wind power generator, or the fuel battery cannot be retrieved as a result, and the generated power output cannot be sufficiently reverse flowed.

In order to solve such problem, a power storage photovoltaic system of Japanese Laid-Open Patent Publication No. 2002-171674 is equipped with a photovoltaic power conditioner having a first power conversion means which performs cooperative operation with a power system connected between a solar battery and a power system, and having a second power conversion means connected between a power storage means and the first power conversion means. A load is connected between the power conditioner and the power system, and a control means for controlling the second power conversion means so that a receiving power does not become less than a predetermined power in time of power output from the power storage means by a receiving power detection means connected between the load and the power system is arranged.

According to Japanese Laid-Open Patent Publication No. 2002-171674, the output of the storage battery is adjusted with the second power conversion means, and the output from the storage battery can be stopped when reverse flowing power by photovoltaic generation to the power system while efficiently discharging the midnight power stored in advance.

A method of performing a maximum power point tracking control operation to retrieve a maximum power from the solar battery, and connecting the solar battery and the storage battery in parallel and performing a storage battery combined operation without a troublesome switching operation is disclosed in Japanese Laid-Open Patent Publication No. 2002-34175. According to this system, the power of the storage battery can be output when the generated power amount of the solar battery is significantly low.

A technique of utilizing the power generating ability of the solar battery to a maximum extent, an insolation energy effectively and extending the lifespan of the battery is disclosed in Japanese Laid-Open Patent Publication No. 6-266458.

The systems of Japanese Laid-Open Patent Publication No. 2002-34175 and Japanese Laid-Open Patent Publication No. 6-266458 are provided to operate the photovoltaic generation at a maximum power and retrieve the generated power to a maximum extent, and are systems mainly focused on performing maximum power point tracking irrespective of the power variation by the insolation variation.

Japanese Laid-Open Patent Publication No. 2001-224142 relates to a photovoltaic device which operates a storage battery combined operation including a plurality of strings consisting of a solar battery and a secondary battery and an operation of only the solar battery without a troublesome switching operation, preferentially charges the storage battery during the day, and maintains the storage battery in a fully charged state as much as possible to prepare for autonomous operation. The device in Japanese Laid-Open Patent Publication No. 2001-224142 will be described using FIG. 31.

As shown in FIG. 31, each string 120a, 120b including a solar battery 121a, 121b and a secondary battery 122a, 122b respectively includes an inverter 125a, 125b. The generated power outputs of the solar batteries 121a and 121b are supplied to the inverters 125a and 125b when solar light is sufficiently irradiating during the daytime. If solar irradiation lacks, the powers are supplied from the secondary batteries 122a and 122b to the inverters 125a and 125b. Each inverter 125a, 125b is operated in accordance with the power demand of a load 126 to supply the necessary power. Since the inverter 125a, 125b is arranged for every string, the input voltage of the inverter 125a, 125b, that is, the voltage of the solar battery 121a, 121b and the secondary battery 122a, 122b is independently set for every string.

In charging to the secondary batteries 122a, 122b, a switch for bypassing to backflow prevention diode 124a, 124b on the secondary battery 122a, 122b side is arranged in advance, and a bypass switch of the storage battery to be charged when solar irradiation is sufficient is turned ON to charge from the solar batteries 121a, 121b.

FIG. 32 shows another example of the conventional power supply system. A DC/DC converter 127a, 127b is arranged between the secondary batteries 122a, 122b and the inverter 125, so that the discharging powers of the secondary batteries 122a, 122b are controlled to match the input voltage to the inverter 125. In other words, the output voltages of the solar battery 121a and the solar battery 121b need to be set to be equal, but the voltages of the secondary battery 122a and the secondary battery 122b are stepped up or stepped down to match a predetermined input voltage of the inverter 125 by the DC/DC converters 127a and 127b. All the storage batteries will have the same voltage according to such control, and thus one storage battery will not be overly discharged.

In charging to the secondary batteries 122a, 122b, a switch for bypassing the DC/DC converters 127a, 127b is arranged in advance, and a bypass switch is turned ON for the storage battery to be charged when solar irradiation is sufficient to charge from the solar batteries.

Therefore, the power supply system generally uses a DC/AC power conversion device to connect a power generator which uses natural energy such as solar battery and wind power generator, or a fuel battery to an electrical load or a power system. However, the DC/AC power conversion device is generally known to lower the conversion efficiency in time of low output.

Thus, as shown in FIG. 33, the conventional power supply system has outputs of a plurality of solar batteries 131a, 131b, and 131c connected so as to be collected at one junction box 132. Thereafter, a load 134 or a commercial system power 135 is connected by way of a plurality of parallel connected inverters 133a, 133b, and 133c, the operation of the inverters 133a, 133b, and 133c is controlled by a control unit 136.

The system of controlling the inverters is used in a household solar battery system or a large-scale solar battery system having a generated power amount of a few 10 kW to a few MW class.

The system shown in FIG. 33 is disclosed as a technique of connecting a plurality of small output inverters in parallel, and reducing the number of operating inverters when the generated power amount of the solar battery is small in Japanese Laid-Open Patent Publication No. 6-165513.

Japanese Laid-Open Patent Publication No. 2000-305633 discloses a technique of selecting the inverter to operate according to a predetermined rule such as in the order of small output power amount of each inverter or in the order of small operating time, or at random.

Japanese Laid-Open Patent Publication No. 2004-146791 discloses a power supply system, including a plurality of DC power supply strings for storing a generated power output of a plurality of DC power supplies including a solar battery, a fuel battery, or the like in each storage battery, for outputting power as necessary.

SUMMARY OF THE INVENTION

Japanese Laid-Open Patent Publication No. 2002-171674 discloses a system which basically charges midnight power and discharges power during day time, where charging and discharging are performed through the power conversion means when charging from photovoltaic generation (in time of autonomic operation). Thus, the conversion efficiency of the system needs to be enhanced to a large extent. As there is loss in conversion even with a high efficiency conversion circuit, it is not suited for use of frequently repeating charge and discharge. Therefore, it is not suited for smoothing energy with large power variation such as natural energy.

Japanese Laid-Open Patent Publication No. 2002-34175 is premised on that output is made from the storage battery when the output of the solar battery lowers, and thus the output voltage of the storage battery is set considerably lower than the maximum power point voltage. Thus, if the solar battery is operation the storage battery voltage when the generated insolation amount to the solar battery is sufficient, the solar battery operates at an extremely bad efficiency.

Most systems annexed with the conventional storage battery have the storage battery annexed for emergency, the frequency of such storage battery being charged from the solar battery is small and thus the efficiency is not given much importance. However, frequent charging and discharging of the storage battery system are necessary to constantly smooth the output of photovoltaic generation having large power variation. In the charging and discharging device, the voltage is converted twice, in time of charging and in time of discharging, and thus the total conversion efficiency becomes the square of the conversion efficiency. For instance, in the conversion device which conversion efficiency in time of charging or in time of discharging is 97%, the total conversion efficiency becomes 0.97×0.97=0.94% by performing charging and discharging.

The electric circuit including the conversion device generally requires a base current, where the efficiency is satisfactory if the electric circuit operates near rating capacity, and microscopic power conversion leads to unsatisfactory efficiency. Therefore, when charging the output of photovoltaic generation in the storage battery, the output of the photovoltaic generation is small if the insolation is weak as in dawn or before sunset, and thus the power is consumed only to operate the conversion device, and the efficiency degrades.

The inverter 125a, 125b is arranged for every string in the prior art example shown in FIG. 31, and the DC/DC converter 127a, 127b is arranged between the storage batteries and the inverter in the prior art example shown in FIG. 32. The realization of the operation at the maximum power point of the solar battery is set as an aim to maximize the generating power of the solar battery, but the number of components increases, and the system becomes expensive.

In Japanese Laid-Open Patent Publication No. 6-165513 and Japanese Laid-Open Patent Publication No. 2000-305633, the number of operating inverters is reduced when the generated power amount of the solar battery is small, and the inverter is selected in the order of small output power amount, in the order of small operating time, or at random. Thus, the solar battery output needs to be detected, and a complex control by such detected output is required. The configuration and the control of the control unit thus become complicating. The control device needs measures for when the generated power amount of the solar battery rapidly becomes large, and an advanced control is necessary. Since the inverter is switched according to the variation of the generated power amount of the solar battery, the number of switching operations becomes large in the solar battery in which the generated power amount often varies greatly, and a high reliability switching circuit is necessary. Furthermore, since the output varies according to the generated power amount of the solar battery, unstable operation is compelled on the load and the commercial system power. The maximum output of the system is determined by the generated power amount of the solar battery, and the maximum power cannot be controlled.

According to Japanese Laid-Open Patent Publication No. 2004-146791, an output voltage adjustment means needs to be arranged to use the sum of the maximum output powers from each solar battery string having different power generating capacity as a maximum output power. If the voltage of each storage battery can be equalized by the output voltage adjustment means, the output can be retrieved from each storage battery, and the total power of each storage battery can be output. However, if each storage battery voltage cannot be equalized, output is obtained from the storage battery of high voltage, and output cannot be obtained from the storage battery of low voltage. Thus, the total power of each storage battery cannot be obtained. Furthermore, the usage frequency of the storage battery is biased since output is obtained from the storage battery of high voltage.

In view of the above problems, the present invention provides a power supply system capable of smoothing the photovoltaic generation output, and enabling time shift.

The present invention also provides a power supply system which does not require a complex control of a power conversion unit. The present invention further provides a power supply system capable of controlling a maximum power.

The present invention further provides a power supply system for supplying a maximum power by obtaining a total power of each storage battery and preventing one storage battery from being overly used.

In order to solve the above problems, a power supply system of the present invention includes a DC power supply string in which a storage battery is connected in parallel to a DC power supply; a DC/AC power conversion device for connecting the DC power supply string to a power system or a load; and a switch, connected between the DC power supply and the storage battery, for switching an output power of the DC power supply or a combined output power of the DC power supply and the storage battery and supplying to the DC/AC power conversion device. The photovoltaic generated power output is thus smoothed, and time shift becomes possible.

In order to solve the above problems, a power supply system of the present invention includes a solar battery string in which a storage battery is connected in parallel to a solar battery; a DC/AC power conversion device for connecting the solar battery string to a commercial power source or a load; a battery state detecting unit for detecting a state of the storage battery; an output detecting unit for detecting an output power of the DC/AC power conversion device; and an output control unit for controlling the DC/AC power conversion device based on the state of the storage battery detected by the battery state detecting unit and the output power detected by the output detecting unit. Since the DC/AC power conversion device is controlled, smoothing of output and time shift are achieved with an inexpensive system.

In order to solve the above problems, a power supply system of the present invention connects a plurality of power supply devices including the DC power supply string in which a storing unit is connected in parallel to a DC power supply and the DC/AC power conversion device to the power system or the load in parallel. Thus, in the present invention, complex control is eliminated, and the number of operating times of the change-over switch can be reduced since a plurality of power supply devices is connected to the load or the power system in parallel. The time shift can be realized by storing power output from the DC power supply to the storing unit.

In order to solve the above problems, in a power supply system of the present invention, a plurality of DC power supply strings in which a storage battery is connected in parallel to a DC power supply; a DC/AC power conversion device for connecting the plurality of DC power supply strings to a power system or a load; and a storage battery control unit for controlling the DC/AC power conversion device so that each storage battery voltage becomes substantially the same. The total power of each storage battery thus can be obtained, and a maximum power can be supplied. One storage battery will not be overly used, and thus the lifespan of the system can be extended.

According to the present invention, the output variation specific to natural energy can be equalized. Furthermore, according to the present invention, charging/discharging of high efficiency can be realized without conversion loss by circuits. The output of the solar battery and the wind power generator can be time shifted and retrieved when convenient to be effectively used. The maximum power point tracking does not need to be performed when charging the storage battery, whereby the system can be simplified. According to the present invention, since power by photovoltaic generation directly charges the storage battery, the power consumption of the circuit as in the prior art of charging/discharging through circuit does not exist, whereby power can be exchanged at substantially constant charging/discharging efficiency independent of the magnitude of the generated power amount.

According to the present invention, when connecting a plurality of solar battery strings, equalization control can be performed with one power controller. Normally, in a large-scale power supply system, if the storage battery and the solar battery are connected in parallel, the storage battery and the solar battery compensate each other and a control unit for collective output becomes necessary, but it is performed by one DC/AC conversion device in the present invention, and a conventional control unit for controlling for collective output is not required.

According to the present invention, smoothing of the output and the time shift are realized with an inexpensive system. Since the discharging current of the storage battery does not flow in excess, stabilization of the system can be achieved, and the lifespan of the storage battery can be extended since excessive current does not flow to the battery.

The system configuration is simple and the equipment investment can be suppressed since a plurality of solar battery strings can be connected to one inverter without a DC/DC converter.

Furthermore, the present invention periodically updates the storage battery group of high voltage value after system start-up and increases the storage battery to contribute to discharge, and thus the system can be reliably brought to a stable state in a minimum time.

The storage battery is charged from the solar battery during solar irradiation by arranging a charge switch in each storage battery, and the charge varying state of the storage battery can be alleviated. Since the storage battery is not discharged by turning OFF the open/close switch of the storage battery during the night, the variation of the storage battery voltage at the start up in the early morning can be reduced, and the start-up of the system can be carried out more stably and easily.

According to the present invention, a complex control of the power supply system can be reduced, and the operating number of times of the switching circuit can be reduced. The power generated by the DC power supply can be time shifted and supplied. The maximum output power amount can be controlled by retrieving the maximum power stored in the storing unit.

According to the present invention, the total power of each storage battery can be obtained. One particular storage battery is prevented from being overly used. Furthermore, the present invention does not require a complex control, and thus a power supply system of the present invention can be realized with an extremely simple circuit.

BRIEF DESCRIPTION OF THE DRAWINGS

FIG. 17A is a block diagram of example 2-4 of the second embodiment of the present invention;

FIG. 17B is a first control circuit diagram of the example 2-4 of the second embodiment of the present invention;

FIG. 17C is a second control circuit diagram of the example 2-4 of the second embodiment of the present invention;

FIG. 21 is a control algorithm of the third embodiment of the present invention;

Figure 1:
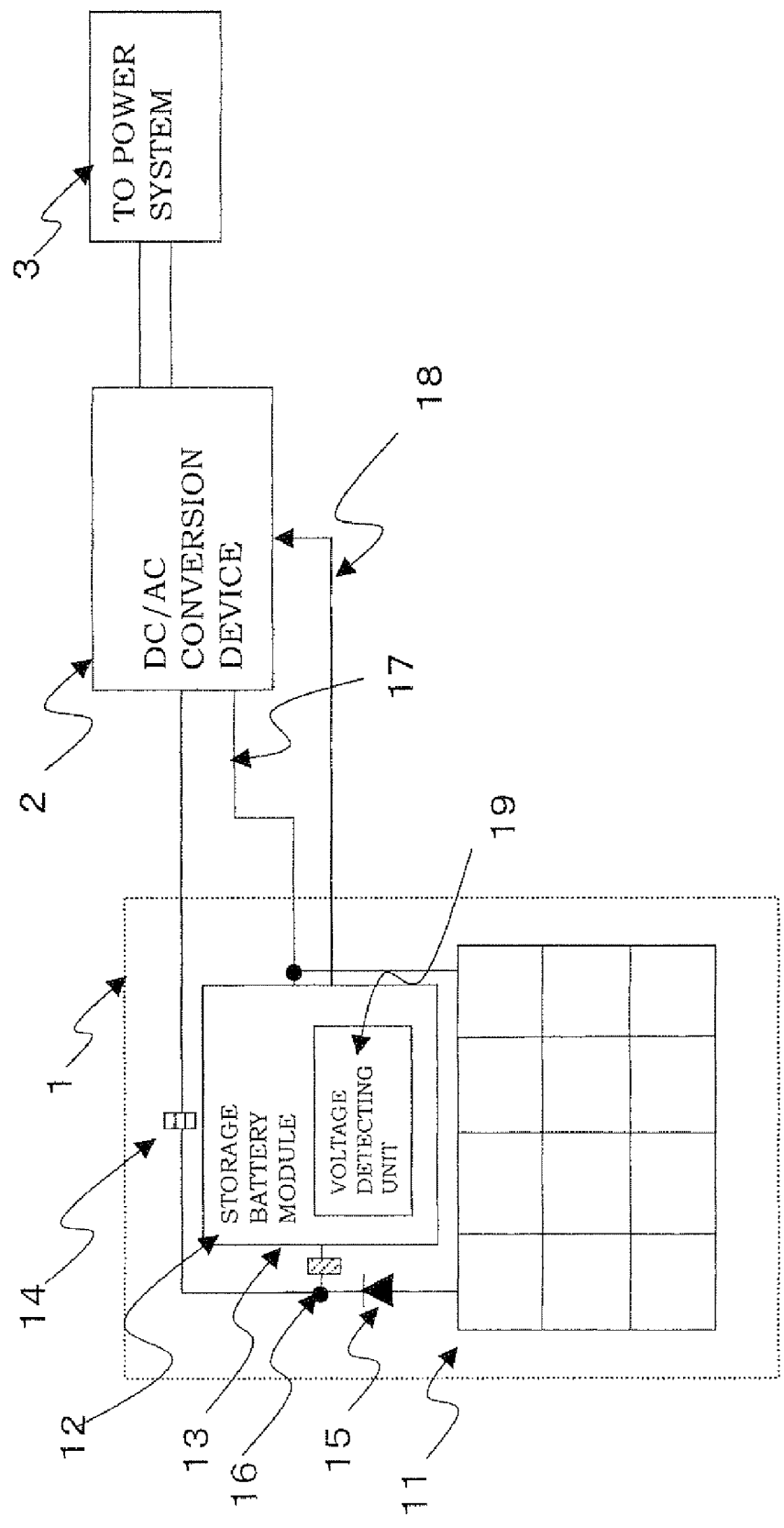
FIG. 1 is a block diagram of a power supply system according to a first embodiment of the present invention.

1 a solar battery string
2 and is connected to a power system
3 a DC/AC conversion device
11 a solar battery module
12 a storage battery module
13 a switch
14 a current sensor
15 a backflow prevention diode
16 a node
17 a connection line
18 a signal line
19 a voltage detecting unit
20 a backflow prevention diode

DESCRIPTION OF THE PREFERRED EMBODIMENTS

First embodiment and second embodiment of the present invention mainly relate to a power supply system for smoothing a power variation of a power generator and enabling time shift of a generated power output.

Third embodiment of the present invention mainly relates to a power supply system for power converting a generated power output from a DC power supply which greatly varies according to environment without requiring a complex control.

Furthermore, fourth embodiment of the present invention mainly relates to a power supply system for obtaining a total power of each storage battery while preventing the storage battery arranged in each of a plurality of DC power supply strings from being used in a biased manner.

The first to the fourth embodiments of the present invention will be sequentially described below.

(First Embodiment)

The power supply system of the first embodiment includes a DC power supply string in which a storage battery module is connected in parallel to a DC power supply; a DC/AC power conversion device for connecting the DC power supply string to a power system or a load; and a switch between the DC power supply and the storage battery module. An output power of the DC power supply or a combined output power of the DC power supply and the storage battery module is switched and supplied to the DC/AC power conversion device by the switch. The output power of the DC power supply is thereby smoothed, and time shift becomes possible.

The DC power supply is typically a solar battery, but may be a wind power generator or a fuel battery. It may also be a device combining the solar battery and the wind power generator, the solar battery and the fuel battery, or the wind power generator and the fuel battery.

The first embodiment will be described with the DC power supply as the solar battery module. Therefore, the DC power supply string will be described as a solar battery string.

The storage battery module preferably includes a charging capacity for storing the output power generated by the DC power supply for at least 0.3 hours. A charging capacity for storing the output power generated by the DC power supply for 0.5 hours, and furthermore, a charging capacity for storing the output power generated by the DC power supply for one hour are preferably arranged. The capacitance balance of the storage battery module and the solar battery module is thereby accomplished, and as a result, charging or discharging can be carried out while utilizing a current limiting function originally provided to the solar battery module.

The solar battery module preferably includes a solar battery element excelling in temperature characteristics. Thus, when an operation voltage range of the solar battery module is fixed at the voltage of the storage battery module, it can be set to an appropriate voltage range close to a maximum power.

The solar battery preferably includes a solar battery element excelling in temperature characteristics. Thus, when an operation voltage range of the solar battery is fixed at the voltage of the storage battery, it can be set to an appropriate voltage range close to a maximum power.

The solar battery element excelling in temperature characteristics is preferably a thin-film solar battery element. The thin-film solar battery element excels in temperature characteristics and can be set to an appropriate voltage range. The storage battery module is preferably a battery without degradation of cycle by lack of charging, and memory effect. The voltage range thus can be set narrow. In particular, lithium ion battery is preferable as a charge/discharge curve is flat, and degradation of cycle and memory effect in partial charging/discharging do not exist.

The storage battery module is desirably set to a voltage range capable of retrieving power of greater than or equal to 60% and less than or equal to 100% with respect to a maxim power point voltage (Vpmax) output when the solar battery module configuring the DC power supply receives a predetermined insolation amount at a predetermined temperature. The voltage range thus becomes narrow, and the output power of the solar battery module can be smoothed, The solar battery module is preferably directly connected to the storage battery module by way of a backflow prevention element. The conversion loss by the voltage conversion device is thus eliminated since the storage battery module is directly charged by the generated power output of the solar battery module without passing the voltage conversion device. Thus, output with high efficiency can be smoothed. The storage battery module and the solar battery module are directly connected, and charging is carried out with a small charging current value when the insolation amount is small such as in the morning or in the evening, or in cloudiness or in rain, and thus the effect of CV charging can be obtained.

The DC power supply further includes a time monitoring unit, a voltage detecting unit or a current detecting unit, and the switch is desirably switched when one of the time monitoring unit, the voltage detecting unit, or the current detecting unit satisfies a predetermined condition. An appropriate voltage range is thereby set.

The predetermined condition is, i) start output (switch ON) when a detected voltage of the voltage detecting unit or a detected current of the current detecting unit becomes greater than or equal to a predetermined value, or stop output (switch OFF) when becoming smaller than or equal to the predetermined value; ii) start output (switch ON) or stop output (switch OFF) in accordance with a predetermined time of the time monitoring unit; iii) start output (switch ON) or stop output (switch OFF) when the detected voltage of the voltage detecting unit or the detected current of the current detecting unit becomes greater than or equal to the predetermined value and in accordance with a predetermined time of the time monitoring unit; and iv) start output (switch ON) or stop output (switch OFF) when the detected voltage of the voltage detecting unit or the detected current of the current detecting unit becomes smaller than or equal to the predetermined value and in accordance with a predetermined time of the time monitoring unit. The voltage value, the current value, and the time of the time shift for smoothing the photovoltaic generation output then can be arbitrarily set.

The DC power supply string is desirably controlled so as to output a predetermined power from the DC/AC conversion device. The output of the solar battery module thus can be controlled. When retrieving the output of the solar battery modulo while the switch is opened, the solar battery module is desirably operated in a maximum power point tracking method. The maximum power then can be retrieved from the solar battery module without being limited by the storage battery module.

The DC power supply string is desirably connected in parallel to a plurality of DC/AC conversion devices, and a backflow prevention element is desirably arranged in each DC power supply string. A plurality of DC power supply strings can be connected with a simple circuit configuration, and a very large power supply system can be obtained.

Each component part of the first embodiment of the present invention will be described in detail below. The first embodiment will be described with the DC power supply as the solar battery, but the DC power supply may be a wind power generator or a fuel battery.

FIG. 1 shows a block diagram of the first embodiment of the present invention, where the power supply system includes a solar battery string 1 and a DC/AC conversion device 2, and is connected to a power system 3. The power system is a so-called commercial power system, and is electrically power sold by reverse power flowing excessive power to the power system by the power supply system of the present invention. The power supply system may be connected to a load other than the power system 3. The load is a street lamp, traffic lights, an indicator, a direction board and the like in the case of a public facility; a motor, a power device, a air conditioner, a lighting equipment and the like in the case of a factory; office equipments such as personal computer and copying machine, a air conditioner, a lighting equipment and the like in the case of an office; a store window, a air conditioner, a lighting equipment and the like in the case of a store; and a television, a refrigerator, a washing machine, a air conditioner, a vacuum cleaner and the like in the case of a household.

The DC/AC power conversion device 2 is a so-called inverter which converts direct current to alternating current, and may be used in any method such as a method using high frequency insulating transformer and a method of performing PWM control and insulating with a commercial frequency transformer. The DC/AC power conversion device arranged in each solar battery string may be the same type or may be different.

The solar battery string 1 is configured by a solar battery module 11, a storage battery module 12, a switch 13, a current sensor 14, and a backflow prevention diode 15. The solar battery module 11 is connected to a node 16 by way of the backflow prevention diode 15, and the storage battery module 12 is connected thereto by way of the switch 13. The node 16 is connected to the current sensor 14. The switch 13 includes an ON/OFF switch and the like, where the combined output of the solar battery module 11 and the storage battery module 12 is retrieved when the switch 13 is turned ON. Only the output from the solar battery module 11 is retrieved when the switch 13 is turned OFF.

The current sensor 14 is inserted to the output side of the solar battery string 1, and detects the output current. A connection line 17 indicates a ground line for connecting the solar battery module 11 and the storage battery module 12 to the DC/AC conversion device 2. A signal line 18 is a connection line for notifying a charge/discharge state of the storage battery module 12 to the DC/AC conversion device 2. A voltage detecting unit 19 is arranged in the storage battery module, and the detected output is transmitted to the DC/AC conversion device 2 via the signal line 18. The voltage detecting unit 19 may be arranged exterior to the storage battery module, or does not need to be particularly arranged if the solar battery string 1 is singular, and the voltage can be detected at the connecting portion of the DC/AC conversion device 2 (since voltage is the same).

The current is a combination of currents of the solar battery module 11 and the storage battery module 12 at the entrance of the DC/AC conversion device 2, and thus the current detecting unit 19 is necessary at the exit of the storage battery module even if the solar battery string 1 is singular.

Figure 2:
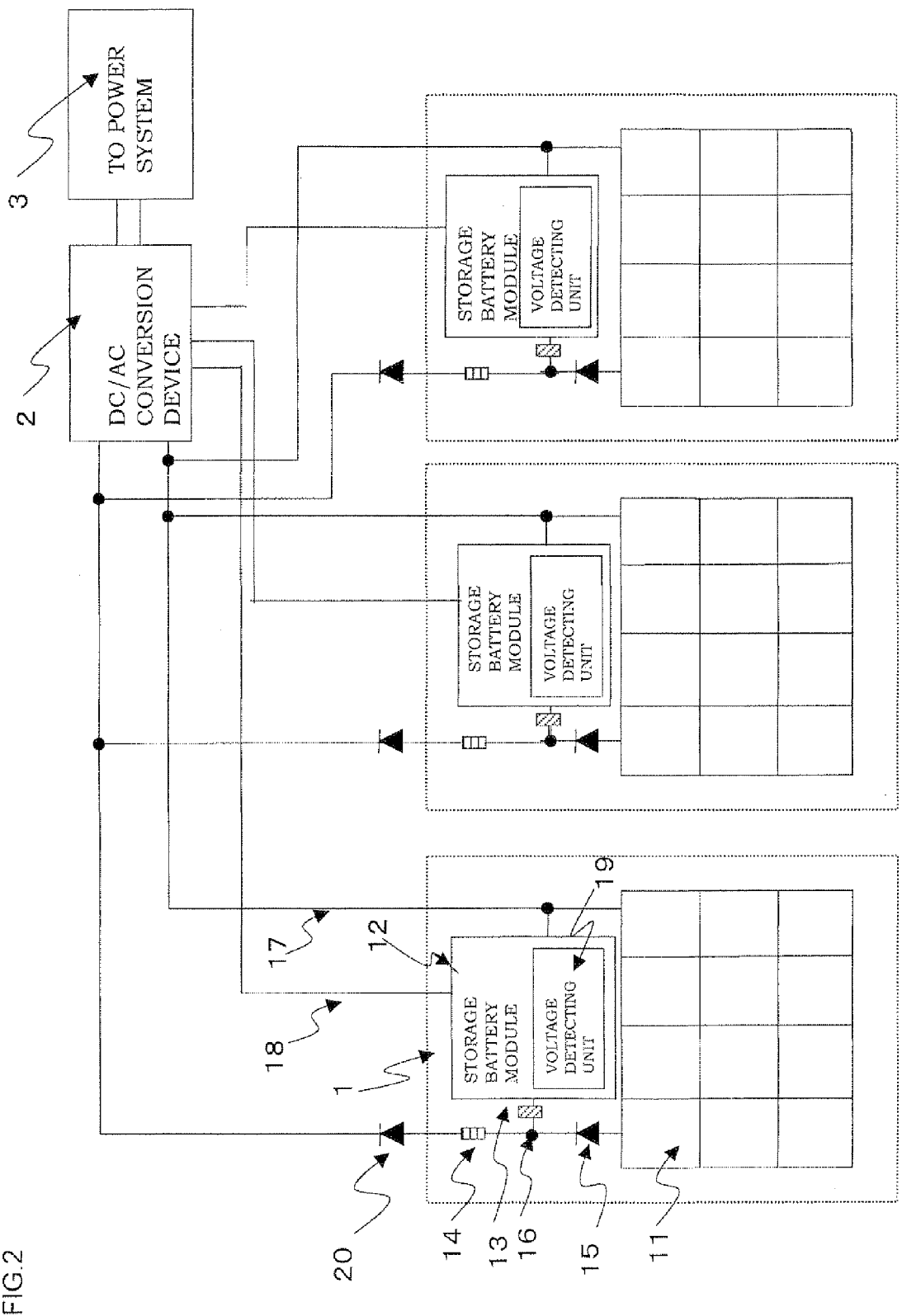
FIG. 2 is a configuration view of the power supply system including a plurality of solar battery strings according to the first embodiment of the present invention.

FIG. 2 shows a configuration view of the power supply system connecting a plurality of solar battery strings 1 in the first embodiment. As shown in FIG. 2, the plurality of solar battery strings 1 are connected in parallel by way of a backflow prevention diode 20, and connected to the power system 3 by way of the DC/AC conversion device 2. Same reference numerals are denoted for the same portions as in FIG. 1.

The signal line 18 is used to exchange voltage information of the voltage detecting unit 19 incorporated in the storage battery module 12, information on the state of charge by a capacity counter, an error signal of when failure occurs, and the like. The usual communication protocol such as RS-232C and RS-485 can be used.

The details of each component part of the power supply system according to the first embodiment of the present invention shown in FIGS. 1 and 2 will now be described.

<<Solar Battery Module>>

The solar battery module used in the first embodiment may be a crystal type solar battery module formed by connecting a plurality of crystal type solar battery cells, a solar battery module using a cell in which a thin-film solar battery consisting of silicon semiconductor or compound semiconductor formed through methods such as CVD on a glass substrate is processed so as to be connected in series, or a solar battery module using a solar battery of tandem structure in which a crystal type silicon and an amorphous silicon are stacked.

The normal power supply system tracks the maximum power point which changes according to solar irradiation conditions and temperature of the solar battery module, and has the operation point voltage controlled so that the power to be output becomes a maximum. However, in the first embodiment, control is performed such that the voltage of the storage battery module to be connected becomes the operation point voltage of the solar battery module. Thus, the operation point voltage of the solar battery module is limited to a voltage range in which the storage battery module operates.

Figure 3:
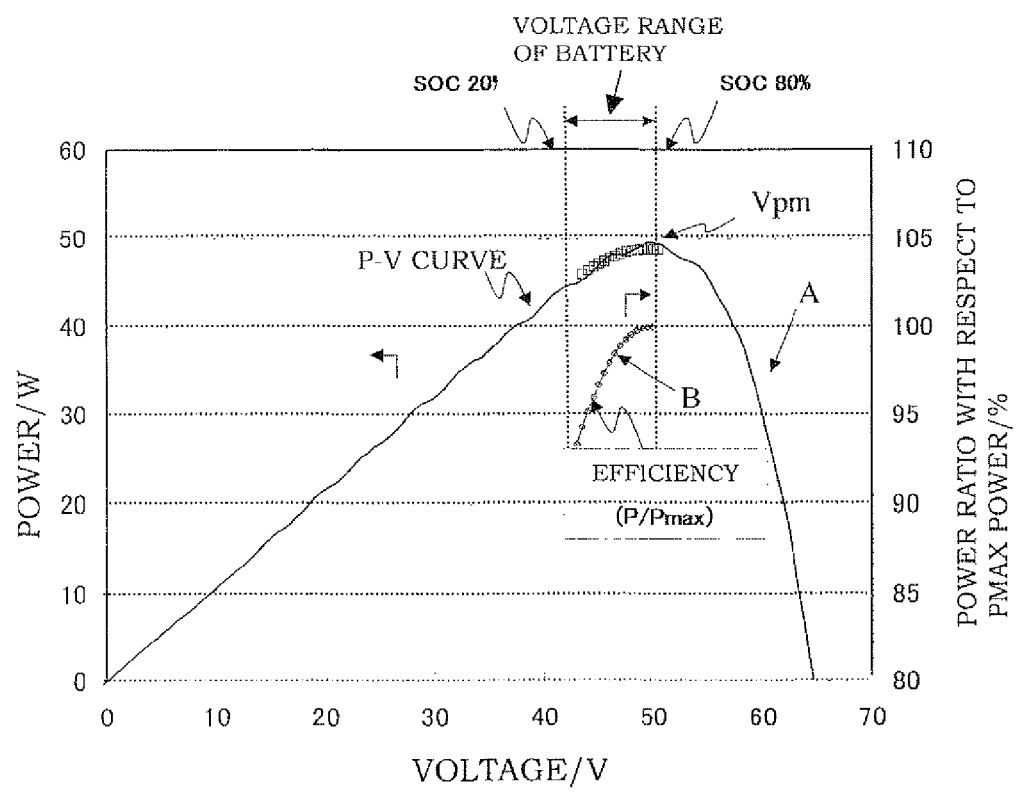
FIG. 3 is a view showing a relationship of output voltage and output power of a solar battery module according to a first embodiment of the present invention.

FIG. 3 shows a relationship of an output power P and an output voltage V of the solar battery module, and a P-V curve A of the solar battery module is as shown in the figure. In the P-V curve A, the operation voltage range of the storage battery module 12 is set to be within a range of SOC 20% to SOC 80%. SOC (State of Charge) indicates the state of charge of the storage battery module, where SOC 100% is a fully charged state and SOC 0% is a discharge termination state.

The percentage with respect to the maximum power point voltage (Pmax) in the range of SOC 20% to SOC 80% is shown on the vertical axis scale on the right side, where the efficiency is in the range of 92% to 100% from a curve B showing efficiency.

Generally, the solar battery shows a linear relationship where the output lowers when the module temperature rises, and the maximum power operation point has a negative slope (temperature coefficient) with respect to temperature. Normally, the temperature coefficient is about −0.45 to −0.5%/° C. in crystal silicon. The temperature coefficient is about −0.17 to −0.2%/° C. in the thin-film solar battery including amorphous silicon. In the solar battery where the amorphous silicon is stacked with the crystal silicon, or the compound semiconductor solar battery and the like of GaAs etc., that in which the temperature coefficient is suppressed to −0.2 to −0.3%/° C. is being developed and put to practical use.

The operation voltage of the storage battery module is barely influenced by temperature. Therefore, the solar battery module of the first embodiment desirably selects a solar battery that is not susceptible to change in output voltage by temperature and that excels in temperature characteristics. The temperature coefficient of the solar battery module is smaller than or equal to −0.42%/° C., and a solar battery module which temperature coefficient is more preferably smaller than or equal to −0.3%/° C. is desirably selected. High system efficiency is thereby obtained. This depends on the type of storage battery device to be connected, but is calculated in view of the variation width by temperature change of the operation voltage of the storage battery device being about 20 to 30%, and the usage temperature width of the solar battery module being about 60° C.

In particular, a lithium ion battery has a very small change in charging voltage by temperature, and a solar battery excelling in temperature coefficient is particularly preferably combined when selecting the lithium ion battery for the storage battery device of the storage battery module.

<<Setting of Voltage Range>>

Figure 4:
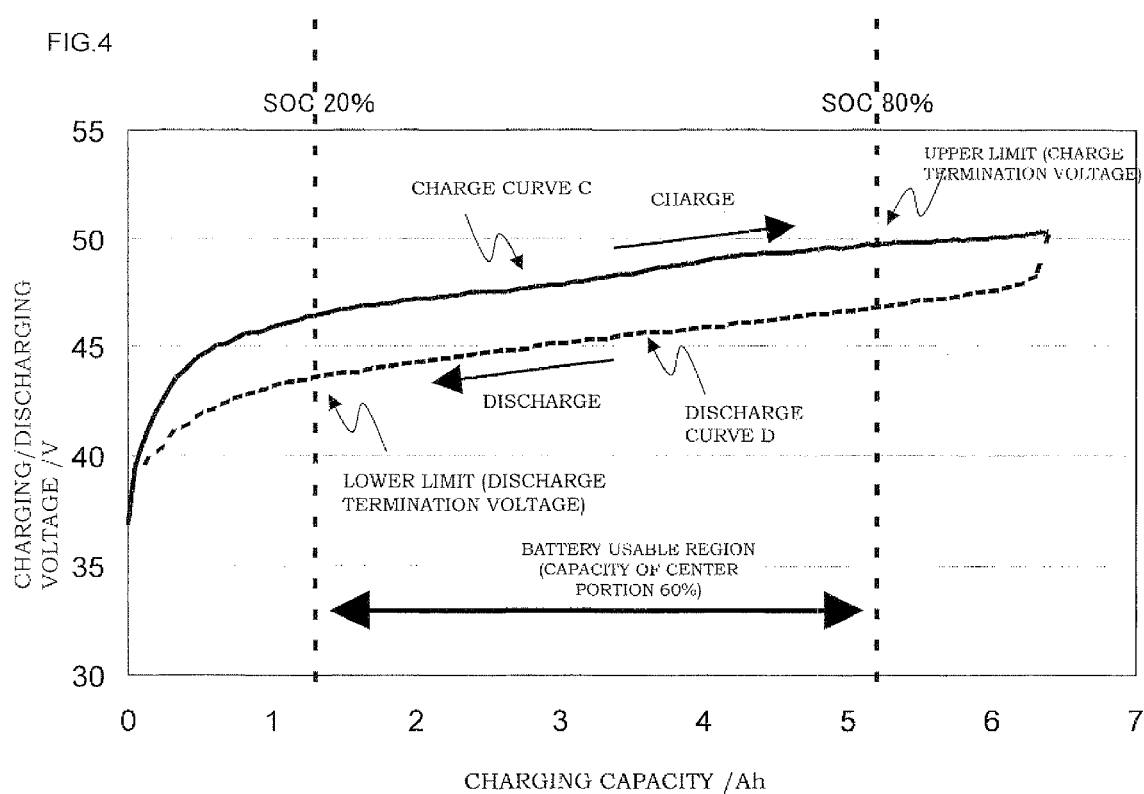
FIG. 4 is a view showing a relationship between a charging capacity and a charging/discharging voltage of a storage battery module according to a first embodiment of the present invention.

In the first embodiment of the present invention, the voltage range refers to the voltage range of when charging/discharging the storage battery module, where an upper limit voltage value of charge is a charge termination voltage and a lower limit voltage value of discharge is a discharge termination voltage. FIG. 4 shows a relationship between the charging capacity and the charging/discharging voltage, where charging is carried out as indicated with a charge curve C and discharging is carried out as indicated with a discharge curve D. The voltage range in time of charging/discharging can be arbitrarily set, but in describing a case where the storage battery module is used in the range of SOC 20% to SOC 80% in the present description, the charge termination voltage is the voltage of SOC 80% and the discharge termination voltage is the voltage of SOC 20%. As a result, the battery usable region is the central 60% of the SOC.

The lithium ion battery degrades even if not used if left untouched in a state close to a fully charged state, and thus utilizing the power of the central portion of the power is preferable in cycle characteristics of the battery when using the lithium ion battery as the storage battery device.

For instance, with respect to the generated power of the maximum power point voltage (Vpmax) of the solar battery module when the insolation amount is 1000 mW/m$^2$ and the temperature is 25° C., the lower limit value of the voltage range is greater than or equal to the operation point voltage at which the power of greater than or equal to 60% is obtained under the same insolation amount and the temperature condition. It is preferably greater than or equal to the operation point voltage at which the power of greater than or equal to 65% is obtained, more preferably, greater than or equal to 70%, and most preferably, greater than or equal to 75%. Most preferably, it is 100%. A case where the insolation amount and the temperature are specified is described herein, but the maximum power point voltage output when the solar battery module is a predetermined temperature and a predetermined insolation amount may be targeted. A case of 25° C. has been described, but the insolation amount and the temperature of the most frequent values may be set based on information of the actual installed location, and the like.

The voltage can be realized by appropriately selecting the type and the number of series of the solar battery device, the type and the number of series of the storage battery device, and the state of charge to be used in.

A case of using the lithium ion battery as the storage battery device by selecting the SOC to be used will be described. The lithium ion battery using cobalt oxide at the positive terminal has a capacity in the voltage region of 3.0 to 4.2V per unit cell. Therefore, when using SOC 0% to 100%, the lower limit value of the voltage range is 3.0V×number of series. When shifting the lower limit value towards the high voltage side, the upper limit value of the voltage range is 3.7×number of series when using SOC 50% to 100%.

As described above, in the first embodiment of the present invention, the operation point of the solar battery module is determined by the voltage of the storage battery module to be connected. Thus, the storage battery module to be connected is charged by the power generated by the solar battery module or discharged by the output to the connected power conditioner, whereby the voltage thereof varies. However, since the battery voltage cannot drastically vary, sufficient power cannot be obtained compared to the maximum power voltage point if the voltage range deviated from the voltage range as described above is set. The solar battery thus continues to generate power at an inefficient operation voltage, and the system efficiency cannot be enhanced.

Furthermore, the above-described voltage range is preferably set so as to include the maximum power point voltage at 60° C. and 1000 mW/m$^2$ within the voltage range determined by the range of the set SOC.

If an insolation amount for the solar battery to sufficiently generate power exists, the temperature of the solar battery module is often high, and photovoltaic generation at high efficiency becomes possible at various insolation amounts and solar battery module temperatures by the setting described above.

The voltage range may be fixed, or the set value can be sequentially changed according to the insolation amount, climate condition, degradation state of the storage battery device, and the like.

When changing according to the insolation condition and the climate condition, the voltage range may be set by sectionalizing to appropriate periods based on the past insolation data and the air temperature data. For instance, the voltage range is set high in winter where the air temperature is low since the temperature of the solar battery module becomes low. The voltage range is set low in summer where the air temperature is high. Furthermore, the voltage range of the intermediate of the winter and the summer is set in spring and in fall. Thus, when setting in view of the insolation condition, the lower limit value can be set to greater than or equal to 80% in regions where the insolation is stable.

In order to further improve the efficiency of the power supply system of the first embodiment under the condition the insolation is stable, the storage battery device in which variation of voltage by charging/discharging is small is desirably selected. The storage battery device in which the variation of voltage by charging/discharging is small will be described in the storage battery module below.

As degradation of the storage battery proceeds, the internal resistance increases, and thus may be set in advance so as to raise the charge termination voltage in a step-wise manner within the above-described range and lower in the discharge termination voltage. To this end, a switch may be arranged, so that a set value set in control software may be updated using a communication means, and the like.

<<Switch>>

The switch can be a switch for mechanically controlling ON/OFF, or an electrical field effect semiconductor switch such as MOSFET and IGBT. The switch is controlled to operate in a predetermined operation voltage range.

<<Storage Battery Module>>

The storage battery module used in the first embodiment of the present invention is connected with one or more storage battery devices and a protective circuit, if necessary. Secondary battery using chemical reaction such as lithium ion battery, nickel hydride battery, and lead storage battery; electrical double layer capacitor, and the like can be used for the storage battery device. As described above, a battery in which large capacity can be obtained as much as possible with a narrow voltage range is preferable, and a secondary battery using chemical reaction is preferable. Among them, a battery system that basically does not involve side reaction in the charging/discharging reaction is more preferable as the power efficiency by charging/discharging is high. A typical example thereof is lithium ion battery.

Furthermore, the lead storage battery conventionally used as the storage battery device may cause capacity degradation when lack of charging continues, or a memory effect etc. in which capacity is not sufficiently obtained is seen when charging/discharging is repeated in a determined range in the nickel hydride battery etc., but the lithium ion battery does not have cycle degradation by lack of charging, memory effect, and the like, and does not have temperature dependency of the charge termination voltage, and thus it can be suitably used as a battery configuring the storage battery module of the first embodiment of the present invention.

Various materials have been proposed for the positive terminal material and the negative terminal material with respect to the material of the lithium ion battery, all of which can be used. Among them, the lithium ion battery using LiFePO$_4$ for the positive terminal is particularly preferable as the charge/discharge curve is flat.

The protective circuit includes an over-charge prevention circuit, an over-discharge prevention circuit, an overcurrent prevention circuit, a voltage monitoring circuit of each cell of the storage battery device connected in series, a balance circuit for adjusting the voltage of each cell, and the like.

<<Solar Battery String>>

In the first embodiment of the present invention, the solar battery string refers to that in which the solar battery module and the storage battery module are connected in parallel. More specifically, the solar battery string includes the switch 13, the current sensor 14, and the backflow prevention diode 15, as shown in FIGS. 1 and 2. In this case, the solar battery module is installed at sunny places such as the roof or the rooftop. The storage battery module can be installed at one part of a solar battery mount or one part of the junction box which collects the wirings in shade by the solar battery module, or places avoiding rain and wind such as indoors. The storage battery module and the plurality of solar battery strings connected such that the voltage range of the storage battery module becomes the above-described voltage range are connected by an electrical wiring to respectively form a pair.

<<Charging Control Method>>

In the first embodiment of the present invention, the output of the DC/AC conversion device can be smoothed and the charging of the storage battery module can be controlled by controlling the output of the DC/AC conversion device. That is, that obtained by subtracting the output of the DC/AC conversion device from the photovoltaic power generated by the solar battery module is the charging power. According to such output control, the generated power output of the solar battery module is smoothed and the charging control can be performed.

The output control from the DC/AC conversion device may be a constant output to absorb the power variation from the solar battery module, or the output of the DC/AC conversion device may be controlled so that the charging current becomes constant.

A control method focusing on smoothing the output will be described using FIG. 5. This figure shows generated power E of the solar battery module, output F of the DC/AC conversion device, charging power G to the storage battery module, and SOC (state of charge) H between 16:00 and 17:00 of a certain day. As time approaches late afternoon, the insolation amount lowers and the generated power E gradually lowers, but the output F from the DC/AC conversion device is controlled to be constant. Thus, a constant output is obtained regardless of the lowering in the insolation amount. At the same time, the charging power G to the storage battery module can be gradually lowered, whereby two controls can be simultaneously accomplished. Such control is very effective since similar effects as constant current/constant voltage charging which is frequently used in the charging control of the storage battery module are obtained when used at the end stage of charging the storage battery module.

Normally, a control to narrow the charging power is carried out when a full charge of the battery is approached by the charging control device, but in the power supply system of the first embodiment of the present invention, the control to narrow the charging power is not necessary near the full charge, and the charging control can be simultaneously accomplished with only the output control of the DC/AC conversion device.

Figure 6:
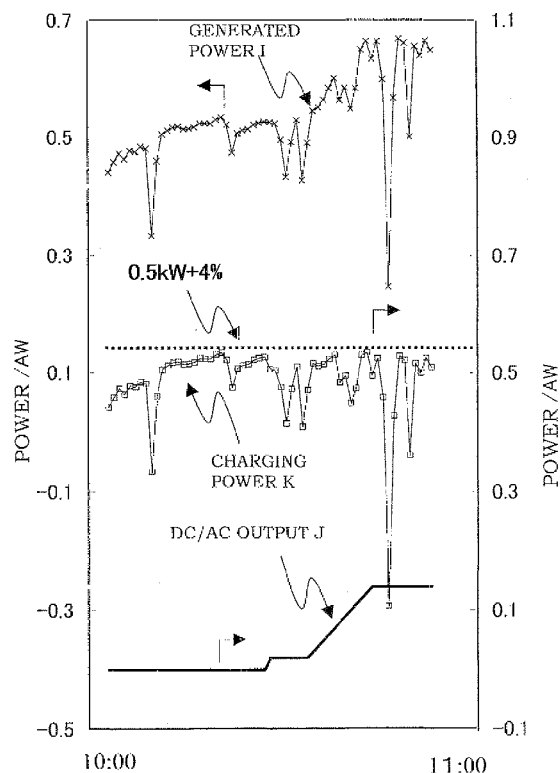
FIG. 6 is a view describing a control method of controlling the charging current of the solar battery module according to a first embodiment of the present invention.

A case of controlling the charging current will be described using FIG. 6. This figure shows generated power I of the solar battery module, output J of the DC/AC conversion device, and charging power K to the storage battery module between 10:00 and 11:00 of a certain day. Left scale of FIG. 6 shows the generated power I of the solar battery module. Right scale of FIG. 6 shows the charging power K. The generated power I of the solar battery module changes steeply with the variation of the insolation amount. However, a control of following as needed is not carried out, and the output is controlled according to the large flow of the insolation amount. Thus, the output J from the DC/AC conversion device can be smoothed. Furthermore, the charging power K has variation but is simultaneously controlled so as to always be lower than or equal to a constant power(0.5 kW+4%). In the battery control, control so that charging of greater than or equal to the rated charging power is not performed is important for extending the lifespan of the battery. Such control is normally carried out by a dedicated charging device, but the control of the charging power is simultaneously accomplished by smoothing the output from the DC/AC conversion device in the first embodiment.

<<Regarding Balance of Capacity>>

If the output of the solar battery module0 is P1 (W) and the storage capacity of the storage battery module is W1 (Wh), the balance thereof is preferably $P1 \times 0.3 \text{ hrs} < W1$. In other words, the storage battery module preferably has a charging capacity for storing the output power generated by the solar battery module at least for 0.3 hours. With the storage battery module capacity of such extent, output can be equalized at a fine time interval. In the charging control of a normal storage battery module, current is limited so that large current does not flow to the storage battery module.

However, the solar battery module has the maximum current capable of flowing to the device determined by the number, the internal resistance, the wiring resistance and the like of solar battery cells, and is a power supply originally having a current limiting function. A current limiting circuit in time of charging, which was normally necessary, is not necessary as the balance between the output of the solar battery module and the storage capacity of the storage battery module is adjusted. Therefore, the capacity balance is very important. From such standpoint as well, the minimum value of the charging current is preferably the lower limit value mentioned above, but more preferably, $P1 \times 0.5$ hrs, and most preferably $P1 \times 1$ hr.

The normal storage battery device is designed so as not to be unsafe if the flow-in of the current is about 3 C (current for charging the storage battery capacity in three hours). A relationship of $P1 \times 0.3 \text{ hrs} < W1$ is derived from the standpoint of safety. The storage battery device tolerates the charging current of about 1 C (current for charging the storage battery capacity in one hour) as the charging current that does not adversely affect the characteristics. Thus, a minimum value of $P1 \times 1$ hr is preferable as the storage battery device can be used without degrading the characteristics of the storage battery device.

The maximum value of the charging current does not present a problem, even if large, in implementing the present invention but is preferably $P1 \times 10$ hrs, and more preferably about $P1 \times 5$ hrs from the stand point of equipment size, cost, operating rate of the equipment, and the like. If the storage capacity is sufficient, both smoothing of the output at fine time intervals and power shift (equalization) in a large time of time shifting the power are both met, and thus is preferable.

<<Description of Output Control for Outputting a Predetermined Capacity>>

The general power supply system is controlled to output all the power it can output while following the maximum power point of the solar battery module held at the predetermined insolation amount.

In the independent type, the output capacity is controlled according to the load capacity of the equipment connected to the DC/AC conversion device. The output in this case is defined to the load capacity of the equipment, and thus the photovoltaic generated power may not be effectively used.

Figure 7:
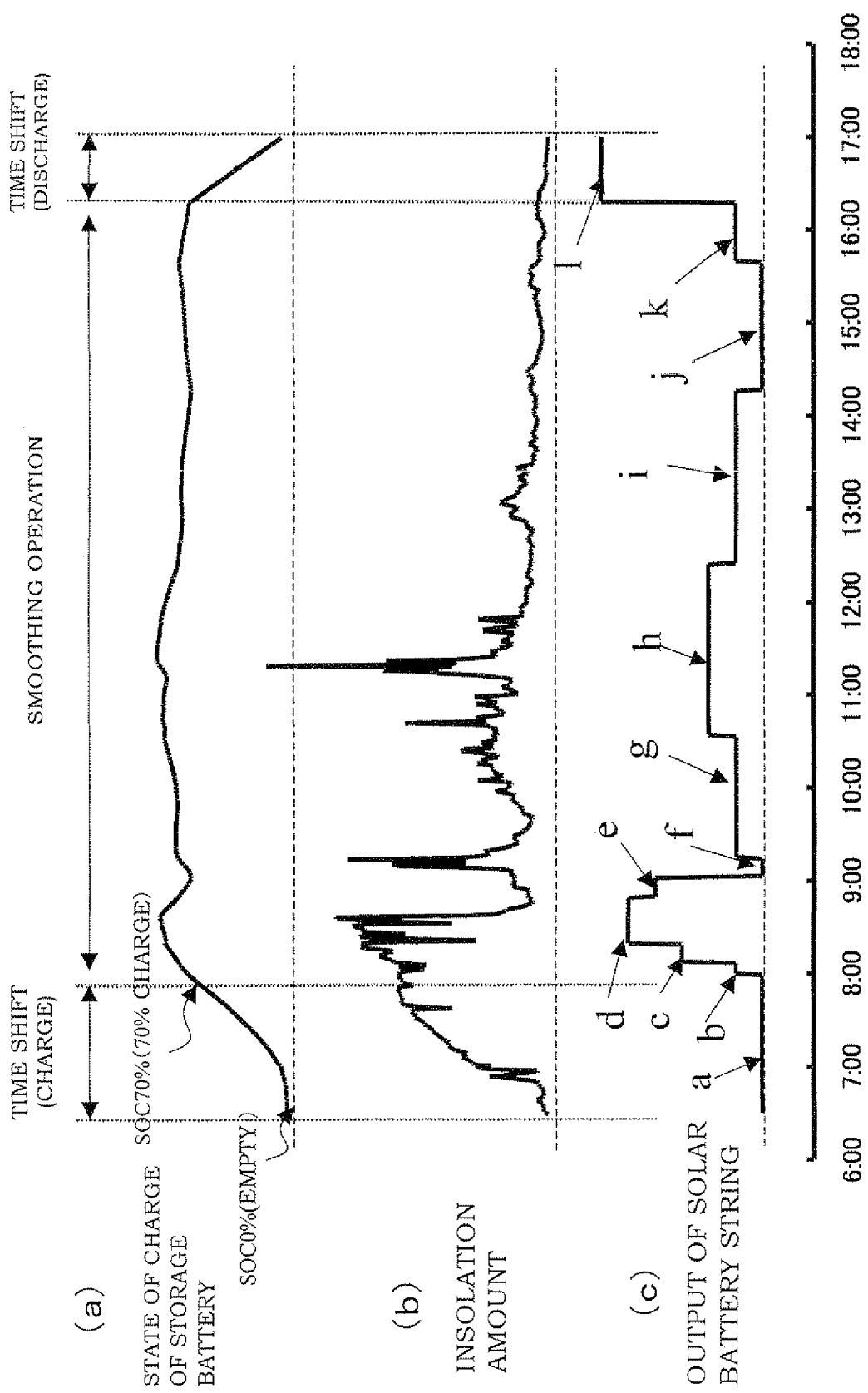
FIG. 7 is a view describing a control method of the power supply system of the first embodiment of the present invention, and is an explanatory view of when performing a control to maintain a constant output during a certain time width.
Figure 8:
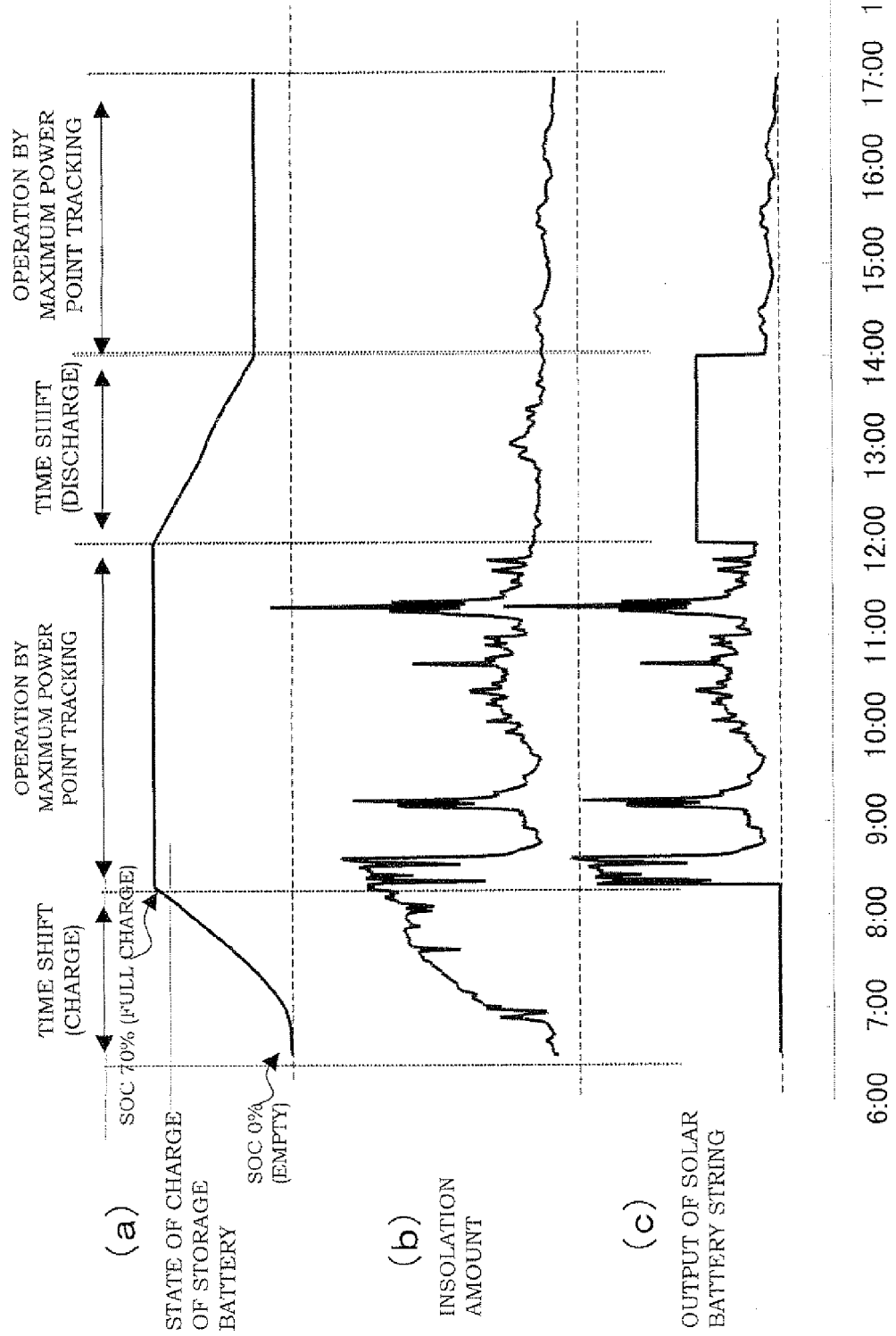
FIG. 8 is a view describing a control method of the power supply system of the first embodiment of the present invention, and is an explanatory view of when performing a control to smooth and output along the flow of a large insolation variation.

In the first embodiment of the present invention, such control of the prior art is not performed, and control as shown in FIG. 7 is performed during a certain time width to maintain a constant output. Alternatively, control as shown in FIG. 8 is performed so as to smooth and output along the flow of a large insolation variation, When referring to the solar battery module and the storage battery module being connected in series, connection is made such that the photovoltaic generated power can be directly charged and discharged with respect to the storage battery module. In FIGS. 7 and 8, (a) shows a state of charge of the storage battery module, (b) shows an insolation amount, and (c) shows an output of the solar battery string.

As shown in FIGS. 7 and 8, the charging/discharging amount to the storage battery module can be controlled by adjusting the output width or the output amount, so that the storage battery module gradually shifts in the full charge direction or gradually shifts in the discharge terminating direction, or to periodically be full charge→around discharge termination→full charge→around discharge termination.

The curve B of FIG. 3 shows the operation of when the module temperature of the solar battery module is 60° C. and the insolation intensity is 90 mW/m². In this case, charging and discharging are performed in a range of the voltage at which power of 92% is obtained to the voltage at which power of 100% is obtained with respect to the maximum power point in the set voltage range. Therefore, system efficiency is further enhanced by performing charging first at the initial stage, and performing smoothing of the output at the region close to full charge.

With respect to the output amount of the constant output and the time width, a method of determining according to the state of charge of the battery, a method of selecting a preset pattern with reference to the weather information and the separately measured insolation amount, and the like may be considered.

<<Description of Changeover Switching Operation>>

The solar battery string of the first embodiment of the present invention includes the time monitoring unit, the voltage detecting unit or the current detecting unit, and the switch is switched when the output of the time monitoring unit, the voltage detecting unit, or the current detecting unit meets a predetermined condition. The time monitoring unit is a so-called clock, and is arranged in the DC/AC conversion device. The predetermined condition is, i) start output (switch ON) when a detected voltage of the voltage detecting unit or a detected current of the current detecting unit becomes greater than or equal to the predetermined value, or stop output (switch OFF) when becoming smaller than or equal to the predetermined value; ii) start output (switch ON), or stop output (switch OFF) in accordance with a predetermined time of the time monitoring unit; iii) start output (switch ON) or stop output (switch OFF) when the detected voltage of the voltage detecting unit or the detected current of the current detecting unit becomes greater than or equal to the predetermined value and in accordance with the predetermined time of the time monitoring unit; and iv) start output (switch ON) or stop output (switch OFF) when the detected voltage of the voltage detecting unit or the detected current of the current detecting unit becomes smaller than or equal to the predetermined value and in accordance with the predetermined time of the time monitoring unit. The voltage value, the current value, and the time of the time shift for smoothing the photovoltaic generation output then can be arbitrarily set.

Thus, in the first embodiment of the present invention, the switch 13 is connected, opened, or switched by detecting the voltage of the storage battery module 12 connected to the solar battery string, and the battery can be separated for a while after full charge, only the generated power of the solar battery may be utilized in the maximum power point tracking method, the storage battery module may be again connected after a predetermined time has elapsed thereafter, and the combined power of the solar battery module and the storage battery module can be used for a constant time. The current from the solar battery string may be detected to change over the switch.

For instance, when a plurality of solar battery strings is connected to one DC/AC conversion device in parallel as shown in FIG. 2, and the insolation amount of some solar battery string lowers or go into shade and the output of some solar battery string lowers during the constant power control, the output request is avoided from concentrating to only a certain solar battery string when becoming a non-power generable state in extreme cases.

The solar battery string of the first embodiment of the present invention includes the storage battery module, and thus the required amount of power can be supplied even without insolation, but if the output is switched to only the solar battery module when constant current or greater is flowed, the voltage lowers if power of greater than or equal to the ability is required since the power from the solar battery module is finite, whereby the output from the storage battery module in another solar battery string is encouraged.

If the switch is changed over to open the solar battery module and the storage battery system by externally transmitting a signal with a normal communication means, the switch is changed over so that only the output of the solar battery module is obtained by the signal from the DC/AC conversion device, and to be operated in the maximum power point tracking as necessary.

EXAMPLE 1-1

<System Configuration>

FIG. 1 is a view showing one example of a configuration of a power supply system of example 1-1. The solar battery module 11 is configured by twelve thin-film crystal solar battery panels having a maximum power point voltage of Vpm=51 V and Isc=2 A, 85 W lined in four by three. The storage battery module 12 has a configuration in which the lithium ion battery of 5.7 Ah is in series of forty-eight, and is configured with a circuit section including a protective circuit and a power counter. The solar battery string 1 of such configuration is connected in parallel by way of the backflow prevention element 15 arranged so that the power of the storage battery module 12 does not backflow to the solar battery module 11. The protective circuit is configured by a commercially available voltage monitoring IC, FET, control CPU, and the like, and has a function of opening the circuit when detecting voltage abnormality etc., and protecting the battery. The power counter is a circuit mounted with a power monitoring IC, and the like, for monitoring the charging/discharging power of the storage battery device, and capable of outputting the state of charge of the battery to the outside. The backflow prevention element 15 is made up of a diode.

The switch 13 of turning ON/OFF the connection of the solar battery module and the storage battery module is connected between the storage battery module 12 and the node 16. The node 16 is connected to the DC/AC conversion device 2 by way of the current sensor 14 for measuring the current of the solar battery string. A field effect transistor (MOS TFT) is used for the switch 13. The current sensor 14, for example, connects a shunt resistor, and measures the voltage at both ends thereof, uses the Hall sensor, and the like. The switch 13 is controlled to be connected to the storage battery module, or opened from the storage battery module by a control circuit (not shown).

The solar battery string 1 configured as above is connected to the DC/AC conversion device 2, and is connected to the power system 3 by the output of the DC/AC conversion device 2.

The state of the storage battery module can be detected by the signal line 18 from the storage battery module 12. The signal line 18 is used to provide the voltage of the storage battery module and the signal of the SOC (state of charge) and the like to the DC/AC conversion device 2, and to determine the output from the DC/AC conversion device 2.

<<Operation Voltage Range of Storage Battery>>

The voltage range of when charging/discharging the whole power of the lithium ion battery configuring the storage battery module 2 is 202 V to 144 V, and is in the range of SOC 20% to SOC 80% where upper and lower 20% are cut in the example 1-1, and 60% of the entire capacity is used. The lower limit voltage in time of discharging in this case is 174 V, and the upper limit voltage in time of charging is 199 V.

The maximum power point voltage (Vpm) at 1000 mW/m$^2$ and 25° C. of the solar battery module is 204 V, and the generated power in this case is 85 W. The output power at the lower limit voltage 174 V and the upper limit voltage 199 V of the battery at the PV curve in the same condition is 78.2 W (92%) and 83.7 W (92%), respectively.

<<Control Method of Output>>

In example 1-1, the output control is carried out in the following conditions. SOC(C) in the following description is shown as a percentage with the capacity actually used defined as above (60% capacity of storage battery device) as 100 to facilitate the understanding of the numerical value. In other words, SOC 20%=SOC(C) 0%, and SOC 80%=SOC(C) 100%.

(1) Stop output if lower than or equal to SOC(C) 70%.

(2) Solar battery string starts 100 W output when charging advances to greater than or equal to SOC(C) 70%.

(3) Increase the output of the solar battery string by 100 W when SOC(C) is greater than or equal to 70% and for every 10% increase.

(4) Decrease the output of the solar battery string by 100 W when SOC(C) is greater than or equal to 70% and for every 10% decrease.

(5) The output of the solar battery string is increased or decreased by 200 W when SOC(C) is greater than or equal to 70% and a variation exceeding 10% occurred within 15 minutes.

(6) Perform 600 W output at 16:18 (time which power of 70% state of charge completes at 10:00 by 600 W (about 1 C discharge).

<<Conclusion>>

The operation data of one day of the system of example 1-1 is shown in FIG. 7. It can be seen that the insolation variation is sharp and the output of the solar battery module greatly varies, but the output from the DC/AC conversion device is smoothed. In other words, the insolation amount shown in FIG. 7 is increased from around 6:45 to 8:00, but the state of charge of the storage battery module is less than SOC(C) 70%. Thus, according to the above-described condition (1), the output of the solar battery string of example 1 is 0W as shown with "a" in FIG. 7. After 8:00, however, the SOC(C) of the storage battery module exceeds 70%. Thus, according to the above-described condition (2), the output of the solar battery string outputs 100W as shown with "b" in FIG. 7. The insolation amount further increases, and the SOC(C) of the storage battery module increases by 10% and becomes SOC (C) 80%. As such 10% increase occurred within 15 minutes, the output from the solar battery string is increased by 200 W as shown with "c" in FIG. 7, according to the above-described condition (5). The charging is continued thereafter, and the SOC(C) becomes 90%. The 10% increase here occurred within 15 minutes, and thus the output from the solar battery string is increased by 200 W as shown with "d" in FIG. 7, according to the above-described condition (5).

The insolation amount then decreases, the SOC(C) of the storage battery module decreases by 10%, and the output from the solar battery string is decreased by 100 W as shown with "e" in FIG. 7, according to the above-described condition (4). The output of the solar battery string increases and decreases as shown with "1", "g", "h", "i", "j", and "k" in FIG. 7 in correspondence to the insolation amount and the variation of the SOC(C).

According to the above-described condition (6), the generated power (time zone of "a") from the time of start-up to the actual start of the output and the generated power during the insolation are time shifted in the time zone after 16:18.

Therefore, through the control according to the above-described conditions, the output can be smoothed, and the generated power can be time shifted in the time zone after 16:18.

The actually obtained power amount with respect to the assumed generated power when controlled entirely with the maximum power amount obtained in this case was 97% (excluding charging/discharging loss of the storage battery). This is equivalent to the efficiency of step-up and step-down in the circuit of 98.5% (0.985×0.985=0.97 to and from) when smoothing the output through the circuit, and thus the efficiency is very high.

Therefore, smoothing of the output and time shift of the power can be achieved at high efficiency according to the first example 1-1.

EXAMPLE 1-2

In example 1-2, operation was performed according to the system similar to example 1-1 with only the control method changed.

The operating condition is as follows.

(1) Charge until full charge.

(2) Output with the storage battery device separated when full charge is reached, and the control method changed to the maximum power point tracking.

(3) Perform 300 W output in 12:00 to 14:00 (one hour).

The operation result is shown in FIG. 8. As apparent from the result, the generated power in the morning can be shifted to 12:00 to 14:00. The easy outputting of only the generated power of the solar battery module to the power system by maximum power point tracking according to the situation, and adding the output of the solar battery module and the output of the storage battery module and smoothing the same for output can be easily switched.

Moreover, the power amount actually obtained in the example (only the charging/discharging period) is 96.3% (excluding charging/discharging loss of the storage battery) with respect to the assumed generated power when controlled entirely with the maximum power amount. This is equivalent to the efficiency of step-up and step-down in the circuit of 98% (0.98×0.98=0.96 to and from) when smoothing the output through the circuit, and thus the time shift can be realized at a very high efficiency.

(Second Embodiment)

A power supply system according to a second embodiment of the present invention includes a solar battery string in which a storage battery is connected in parallel to a solar battery; a DC/AC power conversion device for connecting the solar battery string to a power system or a load; a battery state detecting unit for detecting a state of the storage battery; an output detecting unit for detecting an output power of the DC/AC power conversion device; and an output control unit for controlling the DC/AC power conversion device based on the state of the storage battery detected by the battery state detection unit and the output power detected by the output detecting unit. The smoothing of the output or the time shift become possible with an inexpensive system as control is made by the state of the storage battery and the output power of the DC/AC power conversion device. Since excessive current does not flow to the storage battery, the lifespan of the storage battery is extended, and the stabilization of the system is achieved.

The battery state detecting unit detects one or more of the voltage of the storage battery, the state of charge (SOC), and the rate of change of the state of charge (SOC) per unit time. Furthermore, the present invention includes a data storage unit or a communication unit for receiving external data, where the data storage unit or the communication unit acquires one or more information of past insolation data, average air temperature data, predicted insolation amount or predicted air temperature by weather forecast etc., temperature data of the solar battery, predicted temperature characteristics of the solar battery, and degrading information of the storage battery, and the output control unit controls the DC/AC power conversion device based on the relevant information.

In the second embodiment, the storage battery includes a plurality of storage battery modules; and the battery state detecting unit includes a voltage comparison part for numbering in the order of high battery voltage detected by the battery state detecting unit, a storage battery group generating part for generating a storage battery group in the order of high numbering by the voltage comparison part, and a first start-up control part for controlling the DC/AC power conversion device so that the output power of the DC/AC power conversion device becomes smaller than a total output power permitted from the storage battery group in start-up of the power supply system.

Thus, if the power supply system is a large scale, even if the first specification is the same, the power supply system of the present invention uses in the order of high output voltage of the storage battery when a solar battery of large output and a solar battery of small output are created depending on the installed location of the solar battery or when a storage battery of large output and a storage battery of small output are created depending on the installed state or the ambient temperature of the storage battery, and thus the storage battery of satisfactory state of charge first can contribute to the output, and all the solar batteries and the storage batteries can be equalized.

In the second embodiment, the storage battery includes a plurality of storage battery modules; and the battery state detecting unit includes an SOC comparison part for numbering in the order of large state of charge (SOC) of the storage battery modules detected by the battery state detecting unit, an SOC storage battery group generating part for generating an SOC storage battery group in the order of large state of charge (SOC) numbered by the SOC comparison part, and a second start-up control part for controlling the DC/AC power conversion device so that the output power of the DC/AC power conversion device becomes smaller than a total output power permitted from the SOC storage battery group in start-up of the power supply system.

Thus, if the power supply system is a large scale, even if the first specification is the same, a storage battery of large output and a storage battery of small output are created depending on the installed state or the ambient temperature of the storage battery. However, the present invention can equalize all the storage batteries since use is made in the order of large state of charge (SOC) of the storage battery.

The solar battery string includes a plurality of (n) solar battery strings, where the number k of the solar battery string satisfying the condition $$(E1 - Ei)/r < \Delta Imax$$

is researched, where r is a internal resistance of the storage battery module, $\Delta Imax$ is a margin from an absolute maximum rating Imax of an output current of the storage battery module, $\eta$ is an efficiency of the DC/AC power conversion device, SB1, SB2, ..., SBn is each storage battery module in time of start-up of the power supply system in the order of high voltage, E1, E2, ..., En is an electromotive force of each storage battery module, and I1, I2, ..., In is current; and the output power is controlled so that the output P of the DC/AC power conversion device becomes a relational expression $$P<(E1-r\times Imax)\times(Imax+I2max+ \ldots +Ikmax)\times \eta$$
$$(Iimax=Imax\times(Ei-(E1-r\times Imax))/(E1-r\times Imax),$$
$$i=2,3 \ldots, k).$$

The output that does not flow overcurrent from the storage battery module is thereby obtained. Absolute maximum rating Imax means a maximum current which each storage battery module can output in the safety operating range.

Furthermore, the voltage of each storage battery module is periodically monitored from the start-up of the power supply system, and an output acceptable value of the DC/AC power conversion device is increased in correspondence to increase in k when the k is increased. Since the storage battery group of high voltage value is periodically updated after system start-up, and the storage battery module to be contributed to discharge can be increased, the system can be reliably brought to a stable state in a minimum time.

The above-described DC power supply string includes a charge switch for every storage battery module to turn ON the charge switch and charge the storage battery module with the solar battery module when the charging amount of the storage battery module is small in time of solar irradiation, and turn OFF the charge switch when the storage battery module is charged and the electromotive voltage is high, whereby the charging of the storage battery module of small charging amount can be easily performed.

An open/close switch for separating each storage battery module from the system is arranged, where natural discharge of the storage battery module is suppressed and variation of the state of charge of the storage battery module can be reduced since the storage battery module is opened when the system is ceased in nighttime etc.

Each component part of the second embodiment of the present invention will be described in detail below.

Similar to the first embodiment, the second embodiment also describes a case where the DC power supply is a solar battery, but is also applicable to a power generator such as wind power generator and fuel battery. In the second embodiment, <<Solar battery module>>, <Setting of voltage range>>, <<Storage battery module>>, <Solar battery string>>, <<Charging control method>>, <<Regarding balance of capacity>>, and <<Description of output control for outputting a predetermined capacity>> are the same as the first embodiment, and thus the description will be omitted herein.

In the second embodiment, the balance of the capacity is preferably the output P1 (W) of the solar battery array, and the balance of the storage battery capacity W1 (Wh) of the storage battery module is preferably P1×0.3 hours<W1<P1×5 hrs. P1×0.5 hours<W1 is more preferable, and P1×1 hrs<W1 is most preferable.

The second embodiment describes a case where the switch arranged in the first embodiment is not arranged, but the switch may be arranged similar to the first embodiment and similar control may be carried out.

<<Voltage Comparison Part, Storage Battery Group Generating Part, Start-Up Control Part, SOC Comparison Part, SOC Storage Battery Group Generating Part>>

Each of such portion is arranged in a control circuit of the second embodiment, numbers the storage battery modules in the order of high voltage or in the order of high SOC using a RAM serving as a temporary information storage unit, and generates groups in order from the superior group. The superior group is desirably determined by condition 1 described below, but alternatively, the number is not particularly limited, and the number may be set in advance such as half or ⅓ of the entire storage battery modules. The start-up control part performs a control to supply the power to the power conversion device using the battery group of the superior group in time of start-up.

EXAMPLE 2-1

<System Configuration>

Figure 9:
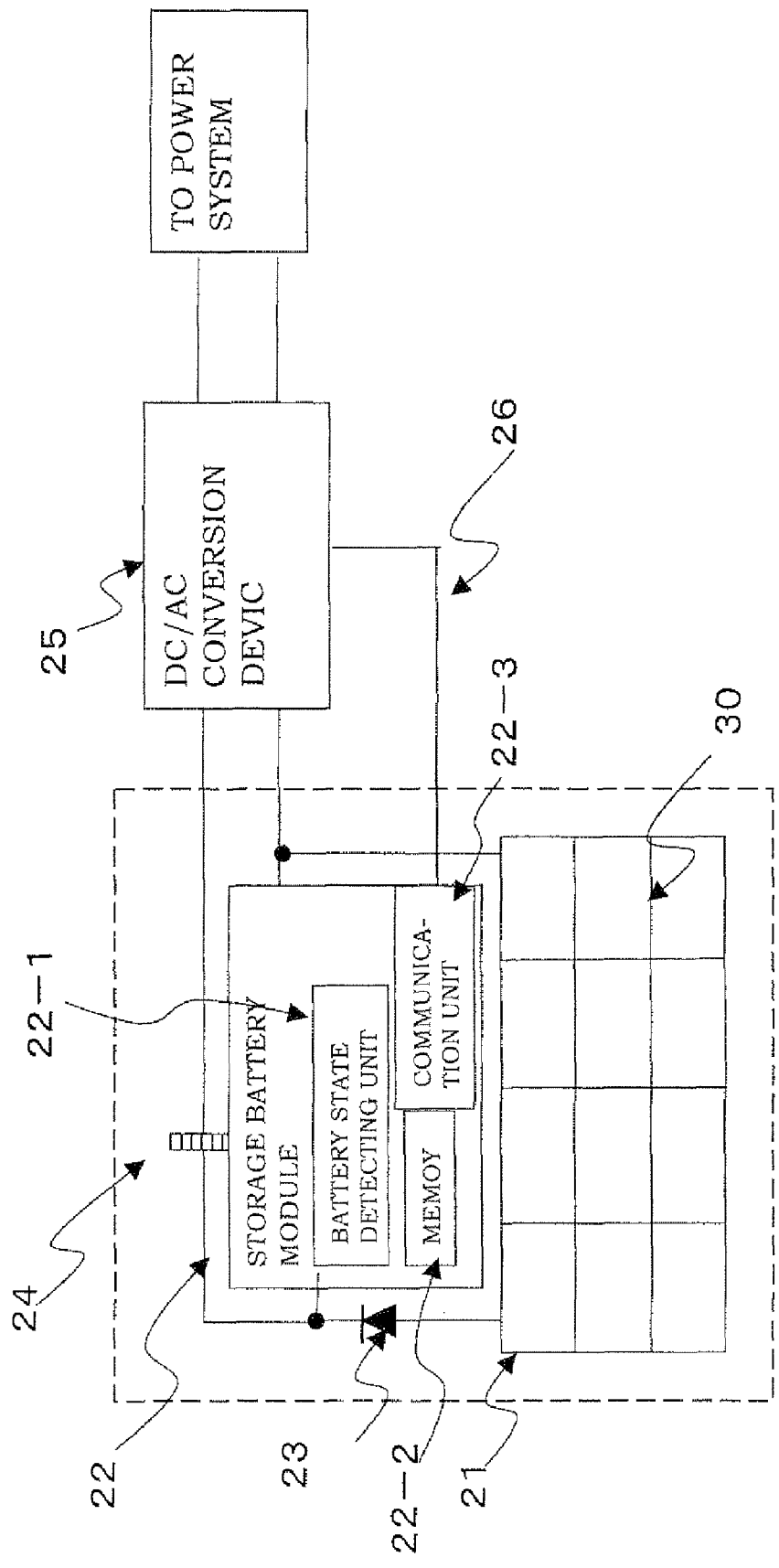
FIG. 9 is a block diagram of a power supply system of example 2-1 of a second embodiment of the present invention.

FIG. 9 is a block diagram showing one example of a configuration of a power supply system according to example 2-1. A solar battery module 21 is configured by 12 thin-film crystal solar battery panels (Vpm=51 V and Isc=2 A, 85 W) lined at four by three, and outputs 1 kW. A storage battery module 22 has a configuration in which the lithium ion battery of 9.5 Ah is in series of 48, and is configured with a circuit section including a protective circuit and a power counter.

The solar battery module 21 and the storage battery module 22 are connected in parallel to a DC/AC conversion device 25 by way of a backflow prevention element 23 arranged so that the power of the storage battery module does not backflow to the solar battery module. A current sensor 24 for measuring the current of the solar battery string is connected between the storage battery module 22 and the DC/AC conversion device 25. The DC/AC conversion device 25 can detect the state of the storage battery module by a signal line 26 from the storage battery module 22.

The storage battery module 22 includes a battery state detecting unit 22-1, and detects at least one of the voltage of the storage battery module, the state of charge (SOC), or the rate of change of the state of charge (SOC) per unit time.

A solar battery string 30 includes a data storage unit 22-2 or a communication unit 22-3 for receiving external data, where the data storage unit 22-2 or the communication unit 22-3 acquires one or more information of the past insolation data, average air temperature data, predicted insolation amount or predicted air temperature by weather forecast etc., temperature data of the solar battery module, predicted temperature characteristics of the solar battery module, and degrading information of the storage battery module, and the output control unit controls the DC/AC power conversion device based on the relevant information.

Although not shown, the DC/AC conversion device 25 internally includes an output detecting unit for detecting an output power amount of the DC/AC conversion device 25. The output control unit controls the DC/AC conversion device 25 based on the state of the storage battery module detected by the battery state detecting part 22-1, or the output power amount of the DC/AC conversion device 25 detected by the output detecting unit.

The solar battery string 30 configured as above is then connected to the DC/AC conversion device 25, and is connected to the power system or the load by the output of the DC/AC conversion device 25.

<<Operation Voltage Range of the Storage Battery>>

The voltage region of when charging/discharging the entire power of the lithium ion battery is 202 V to 144 V, but is SOC (state of charge) 20% to SOC 80% where upper and lower 20% are cut in the example 2-1, and 60% of the entire capacity is used. The lower limit voltage in time of discharging in this case is 174 V, and the upper limit voltage in time of charging is 199 V.

The output power P and the output voltage V of the solar battery module of example 2-1 are as shown in FIG. 3, and the operation voltage range of the storage battery module is SOC 20% to SOC 80%.

Figure 10:
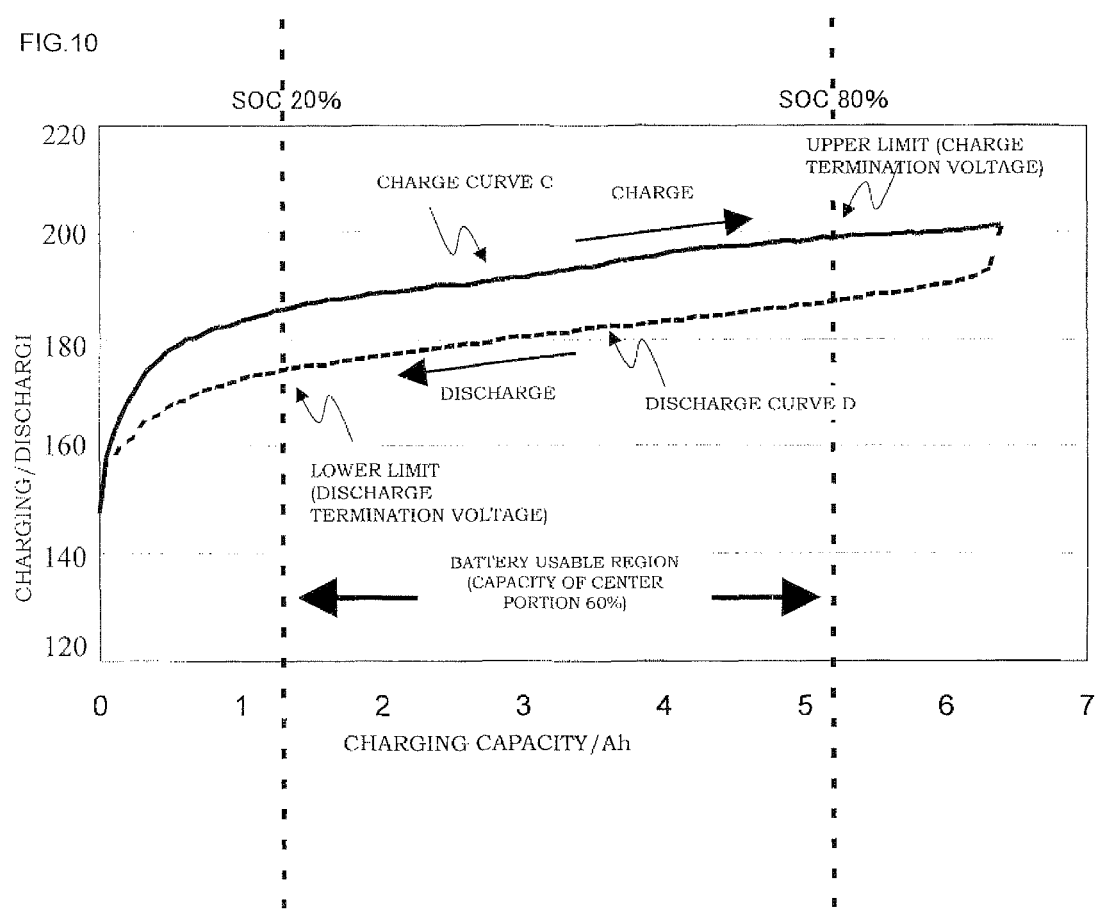
FIG. 10 is a view showing a relationship of a charging capacity and a charging/discharging voltage of a solar battery module of the second embodiment of the present invention.

The relationship of the charging capacity and the charging/discharging voltage of example 2-1 is such that the storage battery is charged as shown with charge curve C and is discharged as shown with discharge curve D, as shown in FIG. 10. In such charge/discharge curve, the charge termination voltage is set as the upper limit voltage value in time of charging, the discharge termination voltage is set as the lower limit voltage value in time of discharging, and the voltage range from the charge termination voltage to the discharge termination voltage can be arbitrarily set. In example 2-1, the center portion 60% between SOC 20% and SOC 80% is the voltage range.

Therefore, the maximum power point voltage (Vpm) at 1000 mW/m$^2$ and 25° C. of the solar battery module is 204 V, and the generated power in this case is 85 W. The output power at the lower limit voltage 174 V and the upper limit voltage 199 V of the battery in the same condition is 78.2 W (92%) and 83.7 W (98.5%), respectively.

<<Control Method of Output>>

In example 2-1, the output control is carried out in the following conditions. SOC is an abbreviation of state of charge, and is represented as a percentage with respect to the capacity actually used defined as above (60% capacity of storage battery device) in example 2-1.

(1) Stop output at less than SOC 10%.
(2) DC/AC conversion device 25 performs 200 W output at greater than or equal to SOC 10% and less than 20%.
(3) DC/AC conversion device 25 performs 300 W output at greater than or equal to SOC 20% and less than 40%.
(4) DC/AC conversion device 25 performs 700 W output at greater than or equal to SOC 40% and less than 95%.
(5) DC/AC conversion device 25 performs 1000 W output at greater than or equal to SOC 95%.
(6) DC/AC conversion device 25 performs 500 W output at 17:00

However, the condition is not changed for 20 minutes once the condition is changed.

<<Conclusion>>

Figure 11:
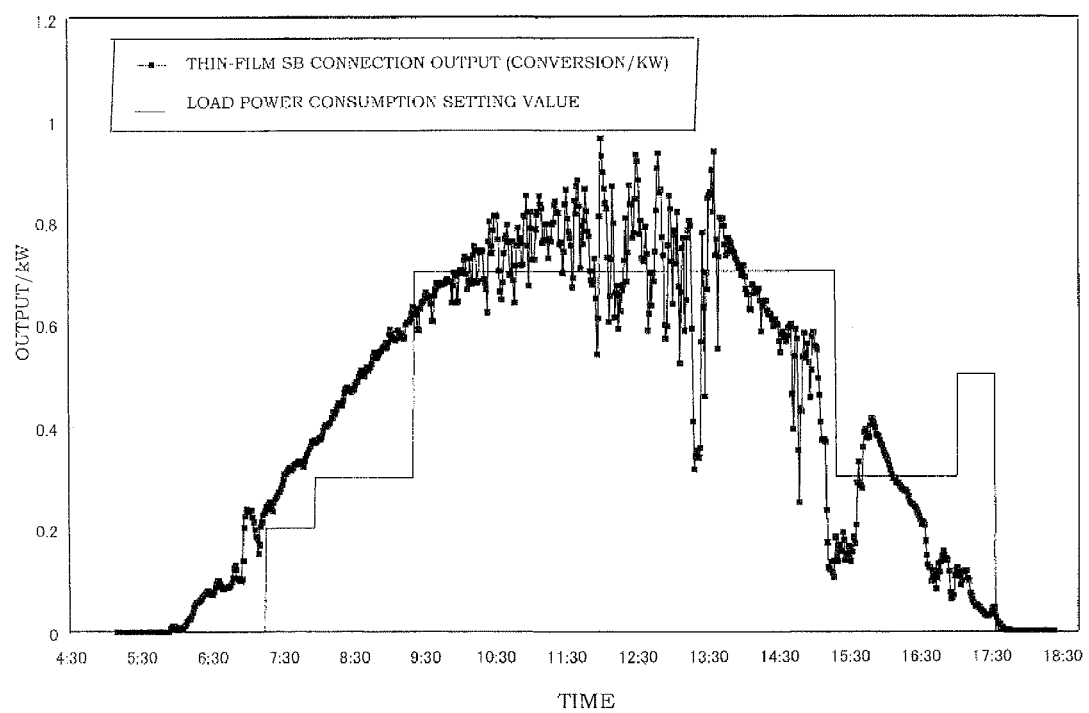
FIG. 11 is a view showing operation data of one day of the second embodiment of the present invention.

The operation data of one day of example 2-1 is shown in FIG. 11. It can be seen that the output of the solar battery sharply and largely varies with the insolation variation as shown with a sharply and greatly varying line, but the output from the DC/AC conversion device is smoothed and the generated power during the day can be peak shifted after 17:00 as shown with a linear line.

Figure 12:
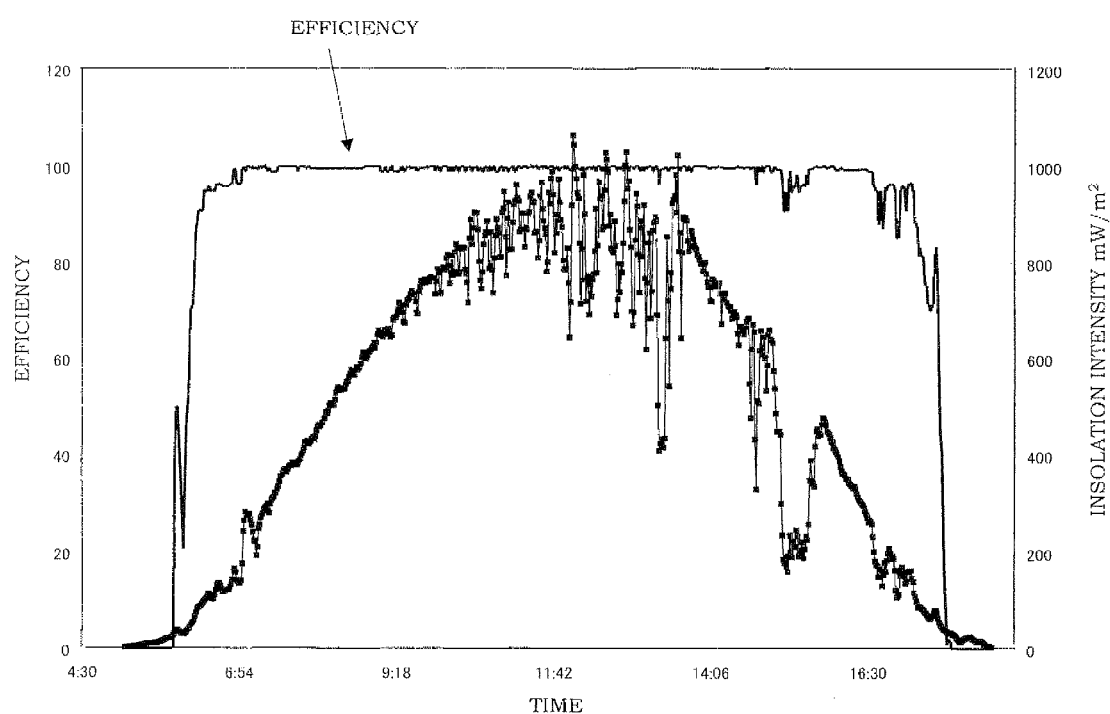
FIG. 12 is a view showing relationship of an insolation intensity, a generated power amount of the solar battery module and efficiency of the second embodiment of the present invention.

FIG. 12 shows the percentage of at what rate the generated power is obtained with respect to the maximum power point power by comparing the generated power amount at the maximum power point calculated from the insolation intensity and the module temperature at each power generation, and the generated power amount at the voltage the battery is actually connected. In this figure, the efficiency at the integral power of one day is 99%.

It is apparent from example 2-1 that smoothing of the output and the time shift of the power can be realized at high efficiency.

EXAMPLE 2-2

The system configuration of example 2-2 is the same as example 2-1 other than that the solar battery capacity is 3 kW and the storage battery capacity is 15 Ah, where only the control method is set and the control is performed as below.
<<Control Method of Output>>

(1) Calculate the generated power amount by photovoltaic generation of the past 30 minutes from the amount of change of the SOC of the battery and the integrated value of the determined output.

(2) Calculate the average generated power amount per one minute from the calculated generated power amount as the output of the next one minute.

<<Conclusion>>

Figure 13:
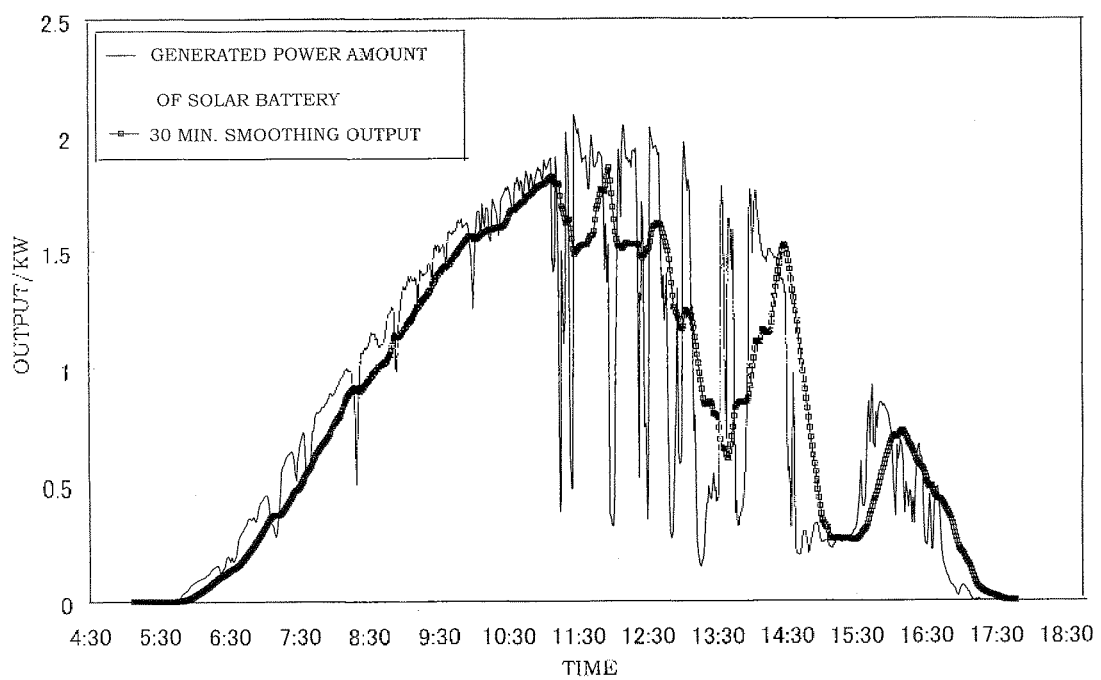
FIG. 13 is a view showing operation data of one day of the second embodiment of the present invention.
Figure 14:
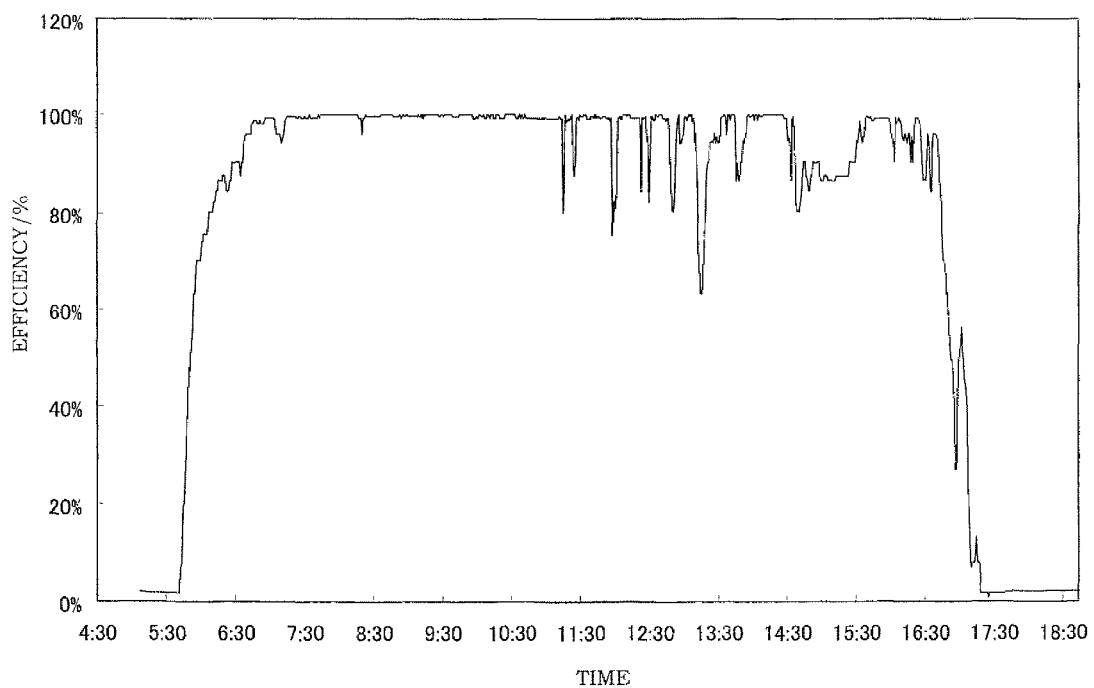
FIG. 14 is a view showing relationship of an insolation intensity, a generated power amount of the solar battery module and efficiency of the second embodiment of the present invention.

As shown in FIG. 13, the smoother output can be obtained at a 30 minute delay. FIG. 14 shows the percentage of at what rate the generated power is obtained with respect to the maximum power point power by comparing the generated power amount at the maximum power point calculated from the insolation intensity and the module temperature at each power generation, and the generated power amount at the voltage the battery is actually connected, when performing the smoother output. The efficiency at the integral power of one day is 97.8%.

The insolation amount may be measured and the generated power amount of photovoltaic generation may be calculated by such insolation amount, but in the system of the present invention, the past generated power amount can be calculated by the SOC of the battery and the output amount controlled by the system itself, and the smoothed output can be obtained without measuring the insolation.

Measuring the SOC after elapse of a constant time corresponds to measuring the integral power consumption of the charging/discharging amount to the battery of a constant time. The controlled output is basically the output determined by the system itself, and the amount thereof can be known without measuring. Therefore, the generated power amount of the past photovoltaic generation necessary for smoothing can be accurately obtained with a relatively easy measurement without requiring high precision measuring instrument that follows the insolation variation, which was necessary in the prior art.

In example 2-1 and example 2-2, power is controlled by the state of charge (SOC) and the output of the DC/AC conversion device 25, but can be controlled using the voltage of the storage battery module, the past insolation data, the average air temperature data, predicted insolation amount or predicted air temperature by weather forecast etc., temperature data of the solar battery module, predicted temperature characteristics of the solar battery module, and degrading information of the storage battery module.

EXAMPLE 2-3

Figure 15B:
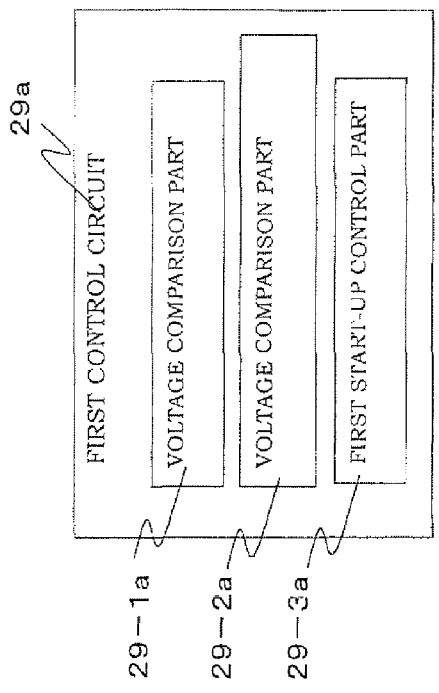
FIG. 15B is a first control circuit diagram of the example 2-3 of the second embodiment of the present invention.
Figure 15C:
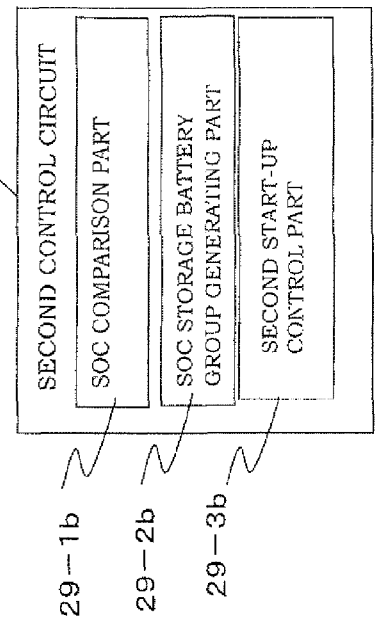
FIG. 15C is a second control circuit diagram of the example 2-3 of the second embodiment of the present invention.
Figure 15A:
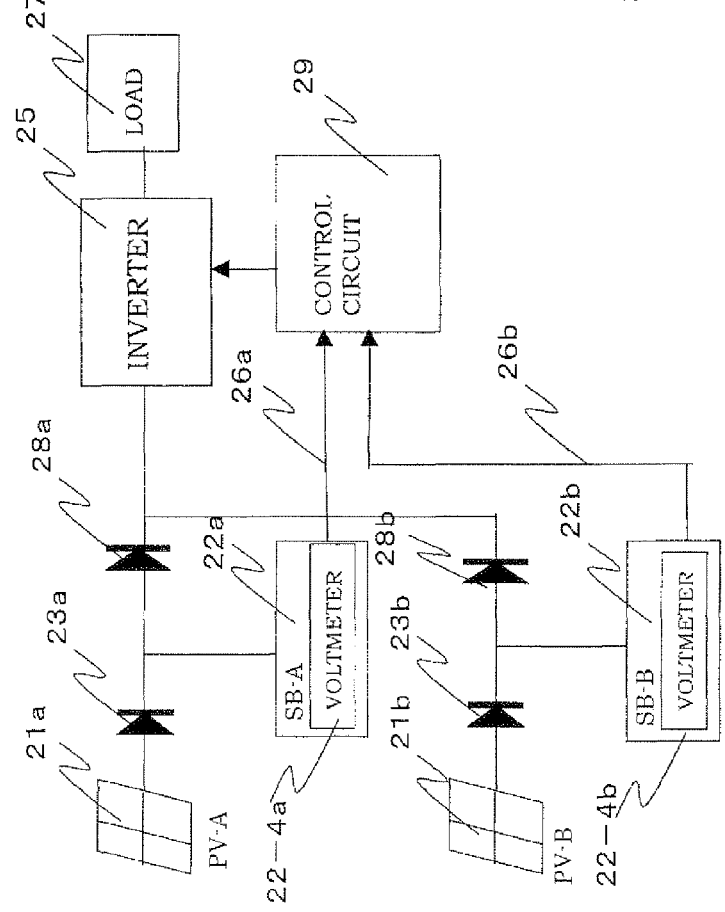
FIG. 15A is a block diagram of example 2-3 of the second embodiment of the present invention.

FIG. 15A is a block diagram of example 2-3.

The configuration of the solar battery module 21, the storage battery module 22, an inverter 25, and the string 30 is the same as FIG. 9 shown in example 2-1, but differs in that the string is connected plurally, and a backflow prevention diode 23 is connected to each string 30. This example 2-3 has a configuration in which a voltmeter 22-4 is attached to the storage battery module of each string, and the output voltage value of each storage battery module is monitored by a control circuit 29 of the inverter 25 through a signal line 26.

In FIG. 15A, the number of strings is two but may be more, and the alphabet subscript shows the plurality of strings. In the following description, n is the number of strings, r is the internal resistance of the storage battery module, E0 is the set voltage of the storage battery module, I0 is the set current of the storage battery module, and Δimax is the current margin from the set current of the storage battery module to the maximum rated current Imax. The maximum output is output when n×(E0−r×I0)×I0×η=Pmax, that is, when the storage battery modules of all the strings outputs at the set voltage/set current, where η is the efficiency of the power conversion device, and Pmax is the maximum output.

EXAMPLE 2-3

FIG. 15A is a block diagram of example 2-3.

The configuration of the solar battery module 21, the storage battery module 22, an inverter 25, and the string 30 is the same as FIG. 9 shown in example 2-1, but differs in that the string is connected plurally, and a backflow prevention diode 28 is connected to each string 30. This example 2-3 has a configuration in which a voltmeter 22-4 is attached to the storage battery module of each string, and the output voltage value of each storage battery module is monitored by a control circuit 29 of the inverter 25 through a signal line 26.

In FIG. 15A, the number of strings is two but may be more, and the alphabet subscript shows the plurality of strings. In the following description, n is the number of strings, r is the internal resistance of the storage battery module, E0 is the set voltage of the storage battery module, I0 is the set current of the storage battery module, and Δimax is the current margin from the set current of the storage battery module to the maximum rated current Imax. The maximum output is output when n×(E0−r×I0)×I0×η=Pmax, that is, when the storage battery modules of all the strings outputs at the set voltage/set current, where η is the efficiency of the power conversion device, and Pmax is the maximum output.

This is satisfied when the system is stable and all the storage battery modules are at similar state of charge, but the output is limited in the following manner when voltage of the storage battery module varies according to the state of charge of the storage battery module in time of system start-up etc., since too much current is taken from the storage battery module of high voltage when attempting to output Pmax.

In time of system start-up, the voltage of the storage battery module of each string is first measured, and whether or not the condition $$(E1-Ei)/r < \Delta I\text{max} \quad \text{(condition 1)}$$

is met is researched for the voltage Ei of each storage battery module in order from i=2, where SB1, SB2, . . . , SBn is the storage battery module in order of high voltage, E1, E2, . . . , En is the electromotive force of each storage battery module, and I1, I2, . . . , In is the current.

Figure 16:
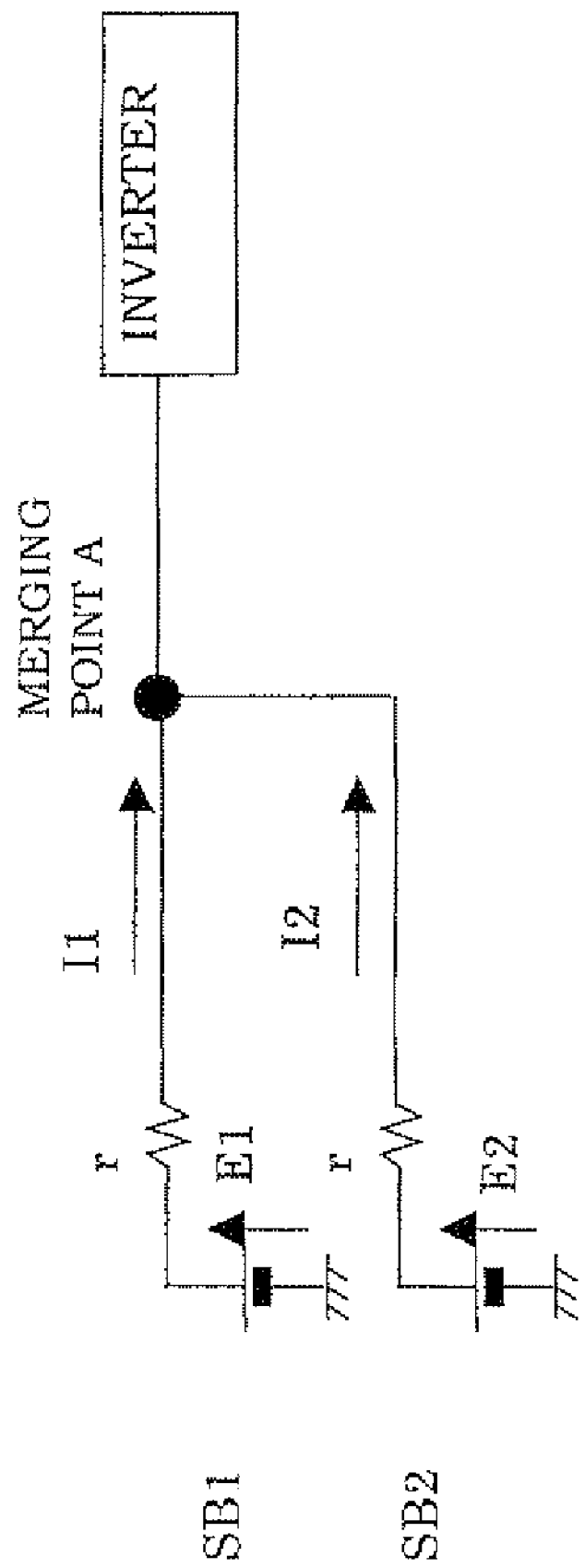
FIG. 16 is a view describing in frame format a relationship of a voltage E and a current I of a storage battery of the second embodiment of the present invention.

For instance, FIG. 16 is a view describing in frame format the relationship of voltage E and current I of the storage battery. When i=2 and (E1−E2)/r>ΔImax, even when SB1 and SB2 attempt to simultaneously flow current, the current I1 from the SB1 increases and the voltage drop by the internal resistance r becomes large since the voltage E1 of the SB1 is too high with respect to the other storage batteries, and the I1 exceeds Imax and becomes overcurrent before the voltage lowers to the voltage E2 of the SB2 even if the voltage of a merging point S lowers. In other words, current can only be retrieved from SB1, and thus the output is limited to P<(E1−r×Imax)×Imax×η worth one string.

If (E1−E2)/r<ΔImax, current I2 can also be flowed from the SB2. When I1 is Imax, I2 becomes $$I2max = Imax \times (E2 - (E1 - r \times Imax))/(E1 - r \times Imax)$$

and thus can be output to $$P < (E1 - r \times Imax) \times (Imax + I2max) \times \eta$$

Similarly, if condition 1 is met until i=k, output can be made to $$P < (E1 - r \times Imax) \times (Imax + I2max + \ldots + Ikmax) \times \eta \quad \text{(condition 2)}$$

(where, Ikmax=Imax×(Ek−(E1−r×Imax))/(E1−r×Imax))
Thus, the system can be started up without flowing overcurrent from each storage battery module by controlling the output of the inverter.

As in the above-described description, the voltage of the storage battery module is measured, and the storage battery module is equalized by controlling to condition 2 by the storage battery module satisfying condition 1. Such control can be realized by arranging a voltage comparison part 29-1, a storage battery group generating part 29-2, and a start-up control part 29-3 in a first control circuit shown in FIG. 15B and a second control circuit shown in FIG. 15C, and operating each of such portion.

The voltage of the storage battery module is measured in the example 2-3 described above, but the SOC of the storage battery module may be measured, the storage battery module may be numbered in the order of large SOC, an SOC storage battery group belonging to a group of large SOC may be generated, and the output of the power conversion device may be made smaller than the total value of the output permitted by the SOC storage battery group by the SOC storage battery group. This can be realized by arranging the SOC comparison part, the SOC storage battery generating part, and the start-up control part.

The description has been made herein to measure the voltage or the SOC of the storage battery module, and number the storage battery modules in high order, but similar result can be obtained by measuring the voltage or the SOC, and grouping the storage battery modules depending on whether or not condition 1 is satisfied.

Therefore, when the system is once started up, the voltage of the discharging storage battery module gradually lowers. In the photovoltaic system of the present invention, a timer is arranged in the control circuit 29, the voltage of each storage battery module is periodically monitored from the start-up, and the above-described conditions are desirably checked. If measured that a constant time has elapsed by the timer, when k increases, the output of the power conversion device is increased therewith to eventually cause all the storage battery modules to output.

(EXAMPLE 2-4)

FIG. 17A is a block diagram of example 2-4. Difference with example 2-1 shown in FIG. 9 lies in that a backflow prevention diode 32, and a charge switch 33 for bypassing the backflow prevention diode 32 are added to each storage battery module. Other configurations are the same. Example 2-4 shows that each portion is arranged plurally with an alphabet subscript.

According to such configuration, when the electromotive force of the solar battery module is sufficient in normal solar irradiation, and the charge of the storage battery module is in an empty state, the charge switch 33 is turned ON to directly charge the storage battery module 22 from the solar battery module 21. If the charge switch 33 is turned OFF, the maximum power point control is performed, and only the solar battery module is operated.

Furthermore, the amount of natural discharge can be reduced by turning OFF the charge switch 33 and separating the storage battery module for all the strings when the system is stopped such as during the night, and the varied state of the charging amount can be alleviated when the system is started up.

The block diagram shown in FIG. 17A is arranged with the backflow prevention diode 32 and the charge switch 33, but the backflow prevention diode 32 may be omitted and may be configured with merely an open/close switch. When configured only with the switch, operation similar to example 2-2 is performed even if a switch element such as FET and IGBT is arranged, and similar effects can be obtained.

Figure 18:
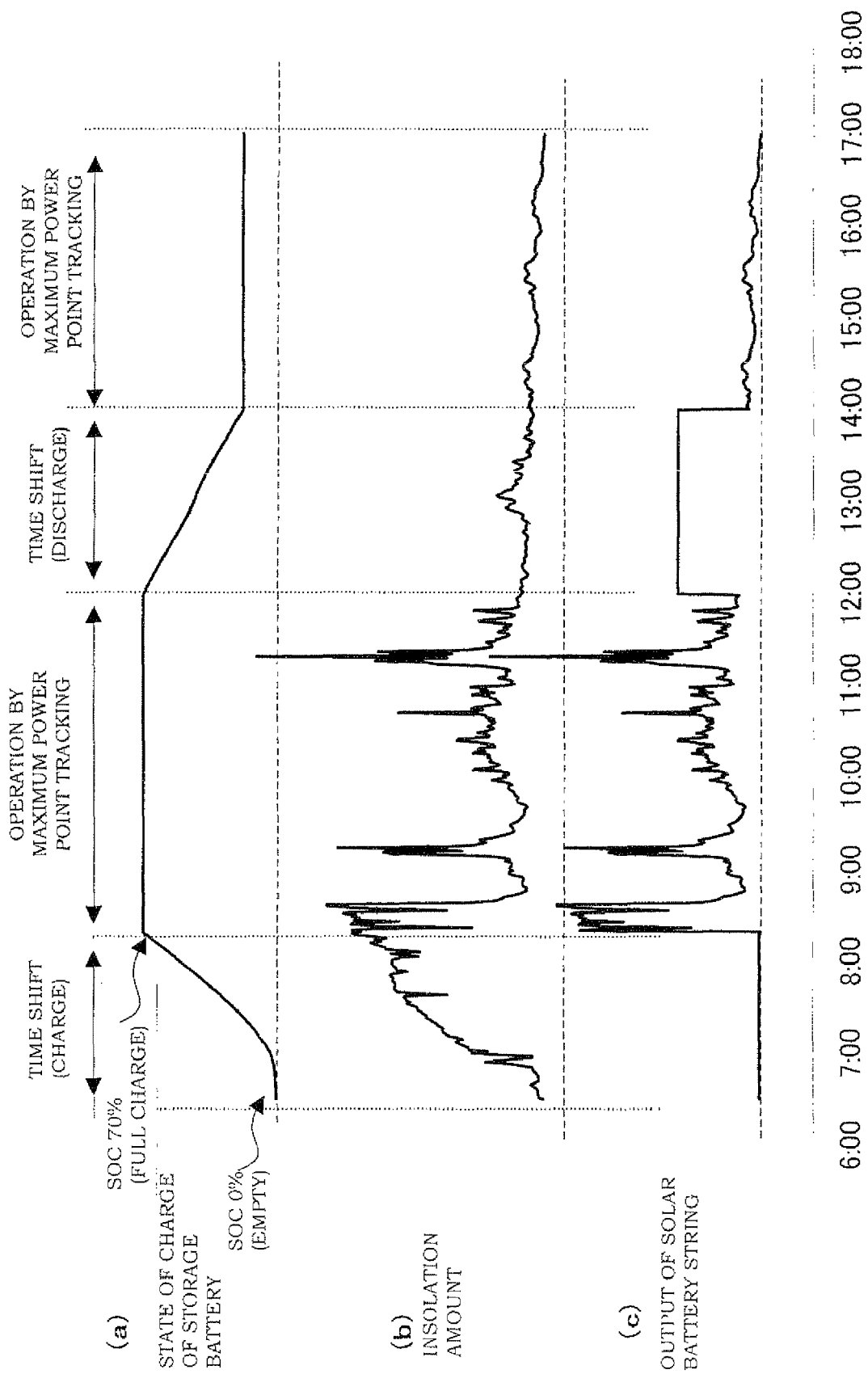
FIG. 18 is a view describing a control method of the power supply system according to the second embodiment of the present invention, and is an explanatory view of when controlling so as to maintain a constant output for a certain time width.

As another control method of the present invention, instead of the maximum power point following control or the output power control corresponding to the load capacity, control can be made so as to maintain a constant output during a certain time width. In FIG. 18, (a) shows the state of charge of the storage battery module. (b) shows the insolation amount. (c) shows the output of the solar battery string.

As shown in FIG. 18, the charging/discharging amount to the storage battery module can be controlled by adjusting the output width and the output amount, so that the storage battery module gradually shifts in the full charge direction or gradually shifts in the discharge terminating direction, or to periodically be full charge→around discharge termination→full charge→around discharge termination.

In other words, as apparent from the operation result shown in FIG. 18, the generated power output obtained by the operation according to the maximum power point tracking during the morning time shifts to 12:00 to 14:00 and discharges, and the generated power output obtained by the operation according to the maximum power point tracking during 14:00 to 17:00 time shifts to 17:00 to 08:00 of the next day and charges the storage battery.

Figure 5:
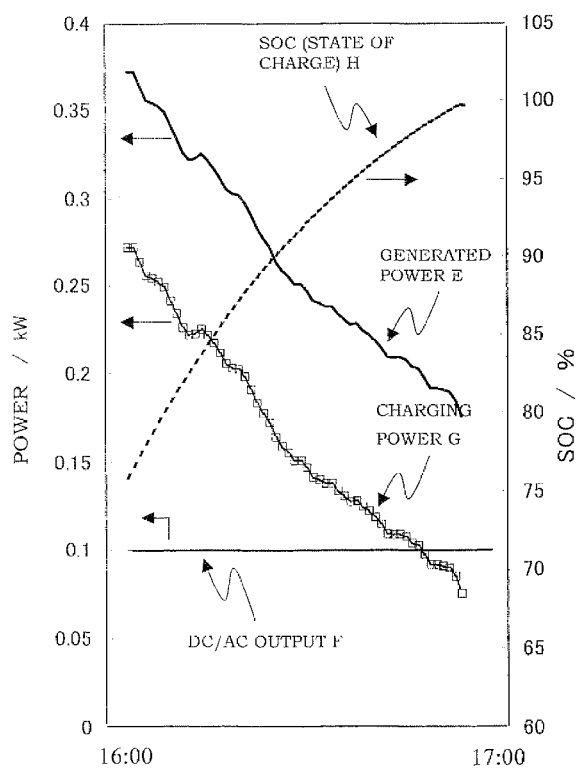
FIG. 5 is a view describing a control method focusing on smoothing the output of the solar battery module according to a first embodiment of the present invention.

The control method focusing on the smoothing of the output of example 2-4 is as shown in FIG. 5.

The control of the charging current of example 2-4 is as shown in FIG. 6.

(Third Embodiment)

The third embodiment of the present invention relates to a system for supplying power at high efficiency even in time of low output without requiring a complex control of a DC/AC power conversion device.

A power supply system according to the third embodiment of the present invention has a power supply device including a DC power supply string and a DC/AC power conversion device connected plurally in parallel to a power system or a load.

The DC power supply refers to that which obtains a DC power from a power generator such as a solar battery, a wind power generator, or a fuel battery. The DC/AC power conversion device is a so-called inverter which converts direct current to alternating current, and may be used in any method such as a method using a high frequency insulating transformer and a method of performing PWM control and insulating with a commercial frequency transformer, where the DC/AC power conversion device arranged in each power string may be the same type or may be different. A storing unit stores the DC power output by the DC power supply, and is represented by a storage battery, but in addition thereto, merely needs to that which stores and allows retrieval of power as in a hydrogen storage system of a type of changing power to hydrogen and storing the same.

Therefore, the present invention can absorb rapid variation and stabilize the output by arranging a storing unit connected to at least one or more DC power supply, and furthermore, advanced and complex control of the DC/AC power conversion device becomes unnecessary, and thus the operating number of the changeover switch can be reduced. The power from the DC power supply can be output at a time different from the output time, that is, can be supplied to the load or the system through time shift by storing the power output by the DC power supply in the storing unit. The maximum output power amount can be controlled according to the maximum output power output from the power supply system, or the maximum power amount requested by the load or the system by retrieving the maximum power stored in the storing unit.

In the power supply system of the present invention, the DC power supply is preferably a device for outputting a DC power from the power generator such as solar battery, wind power generator, or fuel battery, or a combination thereof. Thus, various power supplies can be used as the DC power supply, and can be arbitrarily combined for use.

The power supply system of the present invention desirably has the storing unit arranged in each DC power supply. The variation of the output power amount from the DC power supply is further reduced and stabilized by arranging the storing unit, and as a result, advanced and complex control of the DC/AC power conversion device becomes unnecessary. Since greater power amount can be stored in the storing unit, the power amount to be time shifted can be increased and the maximum output power amount can be increased.

In the present invention, the power conversion control unit determines the output of the power supply system by ON/OFF control of the DC/AC power conversion device. In this case, the power conversion control unit detects the power amount of each power string, and can determine the output value of the power supply system of the present invention as a total value thereof. Alternatively, the power amount requested from the load or the system can be output.

Thus, according to the present invention, the total of the output of the DC power supply such as photovoltaic device, wind power generator, and fuel battery, and the power stored in the storing unit can be output.

In the third embodiment, the power conversion control unit starts up an arbitrary DC/AC power conversion device according to the determined output value. Since the power conversion control unit starts up an arbitrary DC/AC power conversion device according to the determined output value, the DC/AC power conversion device can be operated at high conversion efficiency.

The power supply system of the present invention further includes a DC power supply output amount detecting means for detecting the output power amount of the DC power supply, where the power conversion control unit desirably controls the DC/AC power conversion device according to the output power amount detected by the DC power supply output power amount detecting means. Thus, the power generated by the DC power supply can be effectively used.

The power supply system of the present invention further includes a storage amount detecting means for detecting a storage amount of the storing unit, where the power conversion control unit desirably controls the DC/AC power conversion device according to the storage amount detected by the storage amount detecting means. Thus, the power stored in the storing unit can be effectively used.

The power supply system of the present invention further includes an output power amount detecting means for detecting an output power amount of the power supply system, where the power conversion control unit desirably controls the DC/AC power conversion device according to the power amount detected by the output power amount detecting means. Thus, the storage amount can be controlled according to the output power amount of the power supply system of the present invention.

In the power supply system of the present invention, the control unit periodically and sequentially starts up each DC/AC power conversion device. Through such start-up, each DC/AC power conversion device can be evenly operated.

<<Configuration of Power Supply System>>

Figure 19:
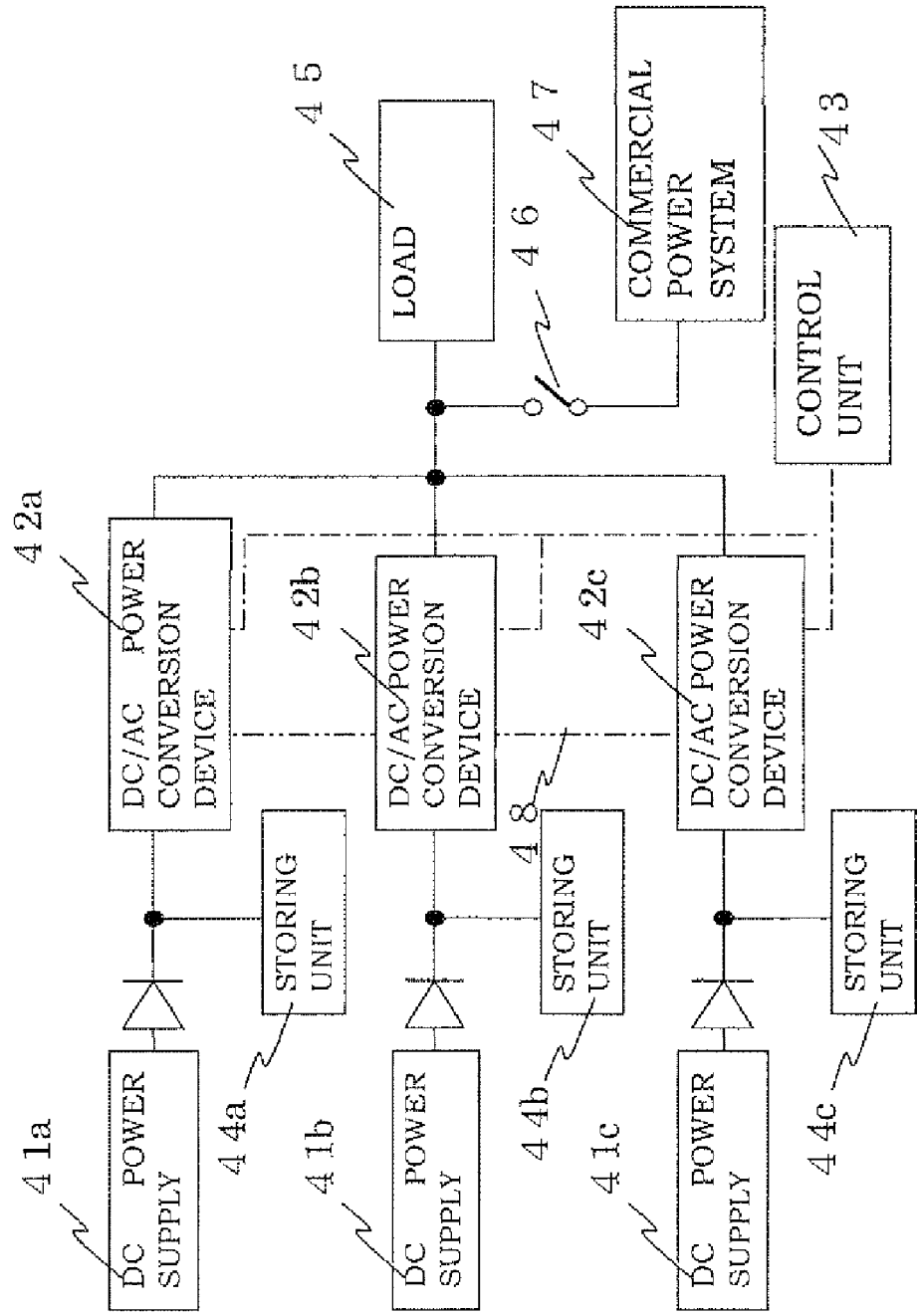
FIG. 19 is a block diagram of a power supply system according to a third embodiment of the present invention.

As shown in FIG. 19, the power supply system according to the third embodiment of the present invention is configured by connecting in parallel a plurality of power strings including a plurality of DC power supplies 41a, 41b, 41c and DC/AC power conversion devices 42a, 42b, and 42c for converting the DC power from each DC power supply 41a, 41b, and 41c. Furthermore, a power conversion control unit 43 for controlling the DC/AC power conversion devices 42a, 42b, 42c according to the output power amount of the DC power supply, and storing units 44a, 44b, or 44c respectively connected to the DC power supplies 41a, 41b, or 41c are arranged. The outputs of the DC/AC power conversion devices 42a, 42b, and 42c are collected to one, and connected to a commercial power 47 or a power system through a load 45 or a switch 46. In FIG. 19, the storing unit is arranged in each DC power supply, but the storing unit may be arranged in at least one or more DC power supply.

The DC power supply 41 obtains a DC generated power from a power generator such as solar battery, wind power generator, or fuel battery. In the case of large-scale DC power supply, specification and performance of each DC power supply obviously differ, and the output power value differs depending on the installed location, direction, and tilt in the solar battery and the wind power generator. FIG. 19 shows three DC power supplies 41a, 41b, and 41c, and three DC/AC power conversion devices 42a, 42b, and 42c, but the number is arbitrary, and may be two or may be more, and each DC power supply 41 and each DC/AC power conversion device 42 may be the same, may have the same performance, or may be different. The DC power supply may be an arbitrary different combination such as solar battery, wind power generator, or fuel battery. The storing unit 44a, 44b, or 44c does not need to be arranged in the DC power supply 41a, 41b, and 41c respectively, and may be at least one or more.

The DC/AC power conversion devices 42a, 42b, and 42c are so-called inverters which convert direct current to alternating current. The DC/AC power conversion device may be used in any method such as a method using high frequency insulating transformer and a method of performing PWM control and insulating with a commercial frequency transformer, each of which may be the same type or may be different.

In addition to controlling according to the output power amount of the DC power supply 41, the power conversion control unit 43 can control according to the storage amount of the storing unit 44, the output of the power supply system, or the output value determined by the control unit itself.

The power supply system shown in FIG. 19 is a system including the power conversion control unit 43, the power conversion control unit 43 controlling the DC/AC power conversion device 42, but a method in which the power conversion control unit 43 is not arranged, and one of the DC/AC power conversion device 42*a* to 42*c* or all of the DC/AC power conversion devices control another DC/AC power conversion device with respect to each other may be adopted. The case of such method is shown with a connection line 48 in FIG. 19, and can be operated similar to a case of arranging the power conversion control unit 43.

The storing unit 44 stores the DC power output by the DC power supply 41, and a storage battery is representatively used. In addition, a hydrogen storage system of a type for decomposing water by electric current by the output from the DC power supply 41, storing the generated hydrogen, and obtaining power by burning hydrogen as necessary may be adopted. The storing unit 44 merely needs to be arranged in at least one DC power supply 41, and is more preferably arranged in each DC power supply 41.

The power supply system shown in FIG. 19 does not have a switch arranged with a node of the storing unit 44 and the DC power supply 41, but a switch similar to the first embodiment may be arranged, and such switch may be controlled as in the first embodiment.

Figure 20:
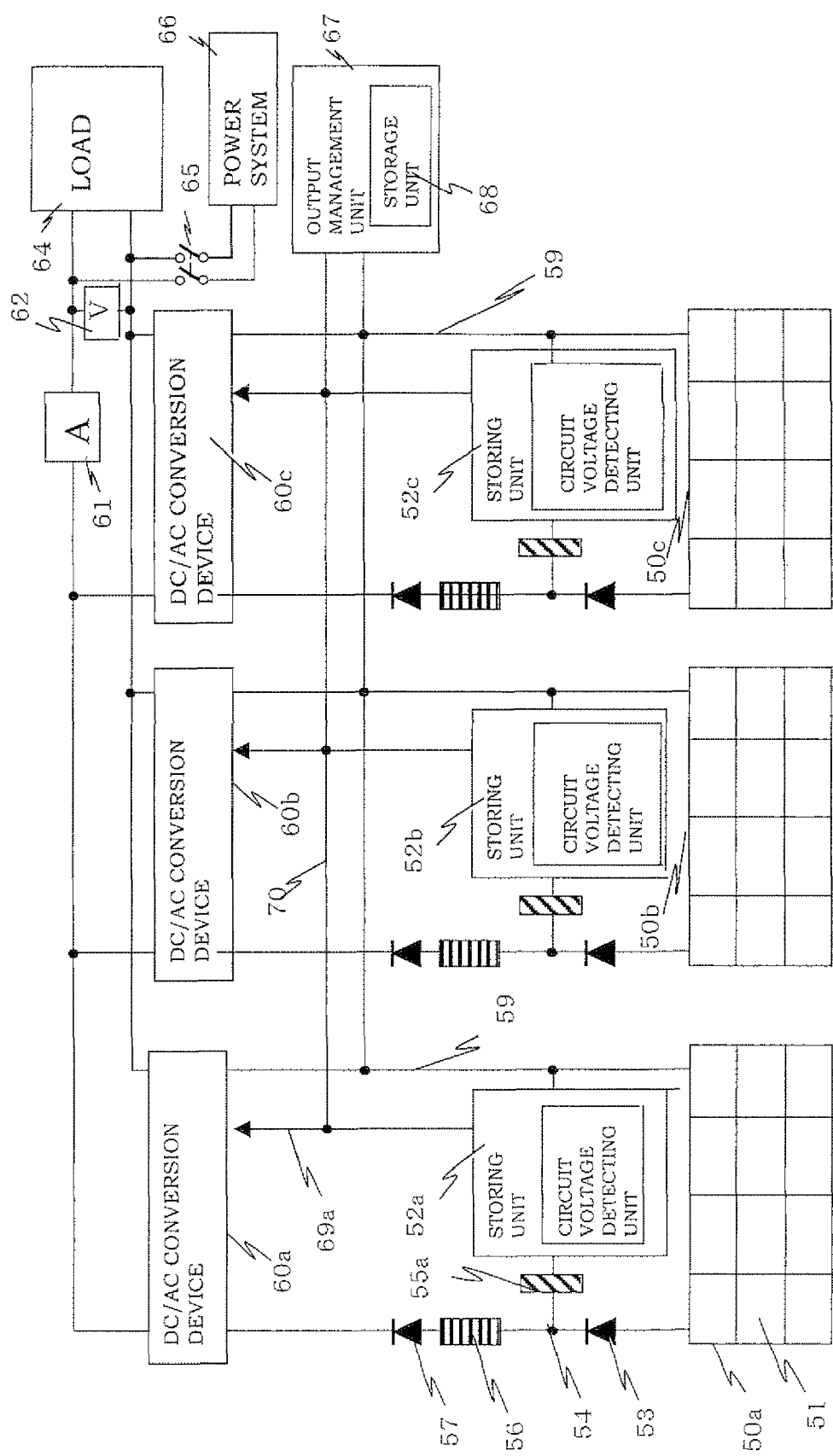
FIG. 20 is a block diagram of one embodiment of the third embodiment of the present invention.

The power supply system of the third embodiment will be described with the block diagram of FIG. 20 with respect to an embodiment having the solar battery as the DC power supply. FIG. 20 is one embodiment of the third embodiment, and the present invention is not limited by FIG. 20. The block diagram of FIG. 20 shows a view in which a switch is arranged similar to the first embodiment.

A solar battery module 51 shown in FIG. 20 is a thin film-microcrystal solar battery panel of maximum power voltage Vpm=51 V, maximum short-circuit current Isc=2 A, and output 85 W. A solar battery array 50 has a twelve-configuration in which the solar battery module 51 is connected in four by three. Therefore, the maximum output is 1020 W. FIG. 20 shows three solar battery arrays 50.

A storage battery module 52 has a configuration in which a lithium ion battery of 5.7 Ah is in series of 48, and is configured with a circuit section including a protective circuit and a power counter.

This embodiment will be described assuming the generated power amount of the three solar battery arrays 50 and the storage capacity of the three storage battery modules 52 are respectively the same, but do not necessarily need to be the same, and may be different. Since the solar battery array has different light receiving amount depending on the installed location, the generated power amount may differ.

The protective circuit arranged in the storage battery module 52 is configured by a known voltage monitoring IC, FET, control CPU, or the like, and has a function of opening the circuit and protecting the storage battery module when detecting voltage abnormality. In other words, the protective circuit includes an over-charge prevention circuit, an over-discharge prevention circuit, an overcurrent prevention circuit, a voltage monitoring circuit of each cell of the storage battery device connected in series, a balance circuit for adjusting the voltage of each cell, and the like.

The power counter uses a power monitoring IC, and has a function of monitoring the charging/discharging power of the storage battery module, and is capable of outputting the state of charge of the storage battery module to the outside.

The solar battery array 50 of the above-described configuration is connected in parallel to the storage battery module 52 by way of a backflow prevention element 53 including a diode arranged so that the power of the storage battery module 52 does not backflow to the solar battery module 51.

A switch 55 is connected between a node 54 connecting in parallel the solar battery array 50 and the storage battery module 52, and the storage battery module 52, and the node 54 is connected to a DC/AC conversion device 60 by way of a current sensor 56 and a backflow prevention diode 57.

A connection line 59 is a ground line for connecting the solar battery array 50 and the storage battery module 52 to the DC/AC conversion device 60.

A field effect transistor (MOS TFT) is used for the switch 55. The switch 55 performs a control of connecting the storage battery module 52 to the solar battery array 50 or opening from the solar battery array 50 by a control circuit (not shown). The detail of the switch 55 will be hereinafter described.

A shunt resistor etc. is connected to the current sensor 56, and that which measures the voltage of both ends, that which uses a hall sensor, and the like can be used.

A plurality of power strings in which the solar battery array 50 is connected to the DC/AC conversion device 60 is merged in parallel, and connected to a load 64. Alternatively, it is connected to a power system 66 by way of a switch 65 so as to allow reverse power flow (output of generated power of a dispersed power supply such as solar battery to power system).

An ammeter 61 and a voltmeter 62 are arranged at an output section to detect the voltage and the current merging the plurality of DC/AC conversion devices 60, and the detection result is provided to an output management unit 67. The output management unit 67 includes a storage unit 68 to store data.

The signal of the voltage value, the storage amount, the SOC (State of Charge), and the like of the storage battery module 52 is provided to the DC/AC conversion device 60 by the signal line 69, and is used to determine the output of the DC/AC conversion device 60. The signal is provided to the output management unit 67, and used as a control signal of the DC/AC conversion device 60.

A signal line 70 connecting the signal line 69 and the output management unit 67 is used as a connection line for providing a signal such as voltage value, storage amount, and SOC to the output management unit 67, and providing a signal for the output management unit 67 to instruct operation/stop of the DC/AC conversion device 60, as hereinafter described.

In the configuration described above, the solar battery array 50 is normally installed at sunny places such as the roof or the roof top. The storage battery module 52 and the DC/AC conversion device 60 are stored in a construction arranged under the solar battery mount or near the solar battery array 50. The distance between the solar battery array 50 and the storage battery module 52 or the DC/AC conversion device 60 is thus long, and thus a design that takes wiring resistance into view becomes necessary.

In the above-described configuration, the solar battery module 51 desirably uses an element that excels in temperature characteristics and can be set to an appropriate voltage range such as a thin-film solar battery. An amorphous silicon solar battery or a tandem structure solar battery in which a crystal silicon and an amorphous silicon are stacked can be used.

The storage battery module 52 is desirably a battery without cycle degradation by lack of charging, and memory effect. A lithium ion battery is suitable for such battery device, where the lithium ion battery is preferably as the voltage range can be set narrow in correspondence to the solar battery module, the charge/discharge curve is flat, and cycle degradation and memory effect in partial charging are not present.

The voltage range of the storage battery module 52 is set to a voltage range at which power of 60% to 100% at a predetermined insolation amount and temperature can be retrieved with respect to the maximum power point voltage (Vpmax) at when the solar battery module is the predetermined insolation amount and the temperature. The output of the solar battery module thus can be smoothed with a narrow voltage range.

The normal solar battery system has the operation point controlled by the insolation condition and the maximum power point tracking method which changes according to the temperature of the solar battery element, but in the present invention, it is operated so that the voltage of the storage battery module 52 becomes the operation point voltage of the solar battery array 50. The operation point voltage of the solar battery array 50 can be limited to the voltage range in which the storage battery module 52 operates.

As shown in FIG. 3, the operation voltage range of the storage battery module 52 is the range of SOC 20% to SOC 80% in the P-V curve A of the solar battery array. The percentage with respect to the maximum power point voltage (Pmax) of the range of the SOC 20% to SOC 80% is 92% to 100% as shown in FIG. 3.

Generally, when the temperature of the solar battery module 51 rises, the output tends to lower, and the temperature coefficient representing the slope thereof indicates negative. For instance, the temperature coefficient of the crystal silicon is $-0.45$ to $-0.5\%/°$ C.

On the other hand, the operation voltage of the storage battery module 52 is barely affected by temperature, and thus the solar battery module 51 used in the present invention desirably selects a solar battery devices excelling in temperature characteristic. For instance, the temperature coefficient is desirably lower than or equal to $-0.42\%/°$ C., and moreover, lower than or equal to $-0.3\%/°$ C. Thus, as described above, a thin-film solar battery in which the temperature coefficient is $-0.17$ to $-0.2\%/°$ C. is suited for the solar battery module of small temperature coefficient, where high system efficiency can be obtained by using the thin-film solar battery.

<<Setting of Voltage Range>>

In the present invention, the voltage range of charging/discharging the storage battery module 52 is the range of SOC 20% to SOC 80%, as shown in FIG. 4.

The lithium ion battery degrades even if not used if left untouched in a state close to the full-charge state, and thus utilizing the power of the central portion of the battery is preferable in cycle characteristic of the battery when using the lithium ion battery as the storage battery device.

The above-described voltage can be realized by appropriately selecting the type and number of series of the solar battery module 51, the type and number of series of the storage battery module 52, and the state of charge to use. The above-described voltage range may be fixed, or the set value can be sequentially changed according to the insolation amount or the climate condition, degradation state of the storage battery device, and the like.

When changing the above-described voltage by insolation condition and climate condition, the voltage range can be set by appropriately segmenting into appropriate periods based on the past insolation data and the air temperature data.

For instance, the voltage range is set high in winter where the air temperature is low since the temperature of the solar battery module becomes low. The voltage range is set low in summer where the air temperature is high. Furthermore, the voltage range of the intermediate of the winter and the summer is set in spring and in fall. Thus, when setting in view of the insolation condition, the lower limit value can be set to greater than or equal to 80% in regions where the insolation is stable.

Furthermore, as degradation of the storage battery module 52 proceeds, the internal resistance increases, and thus may be set in advance so as to raise the charge termination voltage in a step-wise manner within the above-described range and lower at the discharge termination voltage. To this end, a switch may be arranged, so that a set value set in a control software may be updated using a communication means, and the like.

<<Charging control method>>

In the present invention, the output from the DC/AC conversion device 60 is smoothed and the charging of the storage battery module 52 can be controlled by controlling the output from the DC/AC conversion device 60. That is, that obtained by subtracting the output of the DC/AC conversion device 60 from the generated power amount of the solar battery array 50 becomes the charging power. According to such output control, the generated power output of the solar battery array 50 is smoothed and the charging control can be performed.

The output control of the DC/AC conversion device 60 may be a constant output to absorb the power variation from the solar battery array 50, or the output of the DC/AC conversion device 60 may be controlled so that the charging current becomes constant.

The control method focusing on smoothing the output is as described in FIG. 5 above. The case of controlling the charging current is as described in FIG. 6 above.

<<Regarding Balance of Capacity>>

The output $P1(W)$ of the solar battery array and the storage capacity $W1(Wh)$ of the storage battery module are preferably $P1 \times 0.3 \text{ hr} < W1$. The equalization of the output in fine time interval becomes possible if the storage battery module capacity of such extent is provided. More preferably, it is $P1 \times 0.5$ hrs, and most preferably $P1 \times 1$ hrs. The normal storage battery device allows the charging current of about 1C (current for charging the storage battery module capacity in one hour), and thus is preferable as the options of the storage battery device can be greatly widened if the minimum value is $P1 \times 1$ hr.

The maximum capacity value of the storage battery module 52 does not present a problem, even if large, in implementing the present invention but is preferably $P1 \times 10$ hrs, and more preferably about $P1 \times 5$ hrs from the stand point of equipment size, cost, operating rate of the equipment, and the like. If the storage capacity is sufficient, both smoothing of the output at fine time intervals and power shift (equalization) in a large time of time shifting the power are both met, and thus is preferable.

<<Description of Changeover Switching Operation>>

In the third embodiment the voltage of the storage battery module 52 connected to the solar battery string is detected and the switch 55 is switched to connect or open, and thus the solar battery array 50 is separated for a while after full charge, and only the generated power of the solar battery is utilized in the maximum power point tracking method. When the generated power of the solar battery thereafter lowers, the storage battery module 52 is again connected, and the combined power of the solar battery array 50 and the storage battery module 52 can be utilized.

In the third embodiment, the current from the solar battery array 50 is detected and the switch 55 is switched. Thus, if each solar battery string is connected in parallel as shown in FIG. 20, and the insolation amount of some solar battery array lowers or comes into shade during the constant power control so that the output of some solar battery array lowers, and power generation becomes impossible due to failure in the extreme case, the output request is avoided from concentrating at only a certain solar battery array.

In the third embodiment, the solar battery string includes the storage battery module and thus the required amount of power can be supplied even without insolation. However, if the output is switched to only the solar battery array 50 when a constant storage amount or greater is consumed, the voltage lowers if power of greater than or equal to the ability is required since the power can be supplied from the solar battery array 50 but the power is finite, whereby the output from the storage battery module 52 in another solar battery string is encouraged.

If the switch 55 is switched to open the solar battery array 50 and the storage battery module 52 by externally transmitting a signal with a normal communication means, the solar battery array 50 can be operated at a maximum power point tracking.

<<Operation Algorithm>>

The power supply system of the third embodiment shown in FIG. 19 or FIG. 20 operates according to the following operation algorithm.

The power supply system of the present invention derives the power to output according to a predefined algorithm (function using variable) with the insolation intensity at the relevant instant as an input variable. As shown in table 1 of FIG. 21, the algorithm performs a quantity control in correspondence to the insolation intensity. The algorithm is stored in the storage unit 68 in the output management unit 67, and the requested output power value calculated by the output management unit 67 is transmitted to each DC/AC inverter 60 in the form of an electric signal.

In the table 1 shown in FIG. 21, "quantity control 1" shown as an instruction pattern refers to an instruction of operating only one DC/AC inverter when the insolation intensity is 0 to 0.3 kW/m$^2$. In this case, the requested output to the operation instructed DC/AC inverter 20 is (insolation intensity)×(generated power of one solar battery array)×3.

"Quantity control 2" is an instruction of operating two DC/AC inverters when the insolation intensity is 0.3 to 0.6 kW/m$^2$. In this case, the requested output to the operation instructed DC/AC inverter 20 is (insolation intensity)×(generated power of one solar battery array)×1.5.

"All quantity operation" is an instruction of operating all the DC/AC inverters 60 respectively arranged in each solar battery array 50 when the insolation intensity is 0.6 to 1.0 kW/m$^2$. In this case, the requested output to each operation instructed DC/AC inverter 60 is (insolation intensity)×(generated power of one solar battery array)×1.

The "quantity control" will be described with specific examples.

When detection output in which the insolation intensity entering each solar battery array 50 corresponds to about 1.0 kW/m$^2$ (intensity of solar light on a clear day of satisfactory condition in Japan) is obtained by the current sensor 56, the output management unit 67 selects "all quantity operations" for the instruction pattern according to the algorithm of table 1 shown in FIG. 21, and outputs an instruction to start-up/operate to all the DC/AC inverters 60a, 60b, and 60c. Each solar battery array 50 exhibits a maximum power generating ability, and thus charges the storage battery module 52 and at the same time, reverse power flows maximum power to the power system 66 through the DC/AC inverters 60a, 60b, and 60c. Alternatively, each solar battery array 50 supplies power to the load 64.

In this description, the insolation intensity is detected by the current sensor 56, but may be detected by the ammeter 62 or the voltmeter 63 arranged at locations where a plurality of DC/AC conversion devices 60 merge. This is the same in the following description.

The above operation is continued while the insolation intensity continues. In other words, each solar battery array 50 exhibits a maximum power generating ability, and thus charges the storage battery module 52 and at the same time, reverse power flows maximum power to the power system 66 through the DC/AC inverters 60a, 60b, and 60c. Alternatively, each solar battery array 50 supplies power to the load 64.

When detecting that the insolation intensity is 0.1 kW/m$^2$ from the detection output of the current sensor 56, the output management unit 67 reads out "quantity control 1" from the algorithm of FIG. 21. The output management unit 67 reads out the voltage value detected in the voltage detecting unit 71 arranged in each storage battery module 52 through the signal lines 69, 70, and compares the same to select the storage battery module indicating the largest voltage value among all the storage battery modules 52a, 52b, and 52c.

Figure 22:
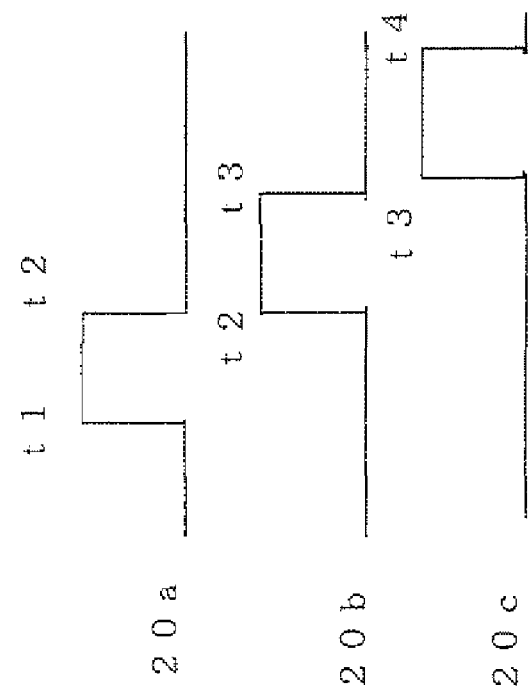
FIG. 22 is a time chart describing a control of the third embodiment of the present invention.

Suppose the storage battery module 52a is selected, for example. The DC/AC inverter 60a connected to the relevant storage battery module 52a is started up to instruct the DC/AC conversion operation. An instruction to stop is given to other DC/AC inverters 60b, 60c. (see t1 to t2 of FIG. 22)

The requested output power to the DC/AC inverter 60a is a power of substantially three times the power generated in the solar battery array 50a. The calculation formula of the requested output power is (insolation intensity (kW/m$^2$))×(generated power of one solar battery array)×3. Therefore, 0.1×1.02×3=0.306 kW.

In this case, the requested output power obviously lacks with only the power amount generated in the solar battery array 50a, and thus the lacked power amount is obtained from the storage battery module 52a. The DC/AC inverter 60a is thus operated in time of high output, and operated at high conversion efficiency.

Meanwhile, the DC/AC inverters 60b, 60c stop the operation, and charge the respective storage battery module 52b, 52c by the output of the solar battery array 50b, 50c. The charging current in this case is charged with a small charging current.

If the insolation intensity does not greatly vary and is within the range of 0 to 0.3 kW/m$^2$ after five minutes, the output management unit 67 selects the storage battery module indicating the largest voltage value among all the storage battery modules 52a, 52b, 52c. That is, since the storage battery module 52a is selected and the storage amount thereof is consumed in the previous five minutes, the storage battery module indicating a larger voltage value than the storage battery module 52a is searched.

In this case, if the storage battery module 52b indicates a larger voltage value, a start-up/operate instruction is sent to the DC/AC inverter 60b connected to the relevant storage battery module 52b. A signal of stop instruction is sent to the DC/AC inverters 60a. A signal of stop instruction is continuously sent to the DC/AC inverter 50c (see t2 to t3 of FIG. 22)

When switching the operation from the DC/AC inverter 60a to the DC/AC inverter 60b, the DC/AC inverter 60a instructed to stop gradually lowers the voltage and the DC/AC inverter 60b gradually raises the voltage so that a continuous switching can be realized.

Thus, this time, the requested output power same as the above is sent to the DC/AC inverter 60b, and the generated power of the solar battery array 50b and the discharge power from the storage battery module 52b are output to the power system 66 through the DC/AC inverter 60b.

When the insolation intensity increases to 0.5 kW/m$^2$ after three more minutes, this is detected from the detection output of the current sensor 56, and the output management unit 67 immediately detects "quantity control 2", and selects two storage battery modules indicating the largest voltage value and the second largest voltage value among all the storage battery modules 52a, 52b, 52c. The start-up/operate instruction is sent to the inverters connected to the two storage battery modules. In this case, the DC/AC inverters 60a and 60c are selected, and the start-up/operate instruction is sent thereto. The stop instruction is sent to the DC/AC inverter 60b (see t3 to t4 of FIG. 22).

The requested output power to each inverter in this case is 0.5×1.02×1.5=0.765 kW, and is a total of 1.53 kW.

By operating the power supply system in the above described manner, when the insolation intensity lowers and the generated power amount of the solar battery array lowers, the number of inverters to operate can be suppressed to a minimum. This has an advantage over a conventional operation method of operating all the inverters even in time of low insolation in that energy for maintaining the operation of the inverter can be reduced.

<<Generalized Operation Algorithm>>

The operation algorithm of the present invention described above can be generalized in the following manner.

First, the prerequisites are as follows.

number of solar battery array (=number of inverter): n
insolation intensity: less than $1/n(kW/m^2)$ The operation algorithm is generalized as below under such conditions.

a) Among the n inverters, only an inverter x connected to the storage battery module having the largest voltage value is started up/operated, and operation of other (n−1) inverters are stopped.

b) The requested output power to the started up inverter x is n times the generated power amount generated by one solar battery array by the relevant insolation intensity. (i.e., power worth (n−1) times is obtained from the storage battery module connected to the relevant solar battery array).

c) The output management unit redetermines the inverter to operate every constant time. That is, after the inverter x is operated for a constant time, the storage amounts of all the storage battery modules are again compared, and an inverter y connected to the storage battery module indicating the highest voltage value starts the start-up/operation. An instruction to stop the operation is sent to the inverter x.

d) In switching the inverters, the output power of the inverter x is decreased at a constant slope over a few seconds, and the output power from the inverter y is increased at a constant slope over the same time so that the output power does not become discontinuous.

e) If the insolation intensity is changed exceeding the threshold value before the constant time has elapsed, the output management unit immediately makes the determination again and resends the instruction to each inverter.

The operation algorithm with the following prerequisite are as follows.

number of solar battery array (=number of inverter): n
insolation intensity is 1/n to $2/n(kW/m^2)$ a) Among the constant n inverters, only the inverters x, y connected to two storage battery modules having the highest voltage value and the second highest voltage value are started up/operated, and operation of other (n−2) inverters are stopped.

b) The requested output power to the started up inverters x, y is n/2 times the generated power amount generated by one solar battery array by the relevant insolation intensity. (i.e., power worth (n/2−1) times is obtained from the storage battery module connected to the relevant solar battery array.)

c) The output management unit redetermines the inverter to operate every constant time. That is, after the inverters x, y is operated for a constant time, the voltage value of all the storage battery modules are again compared, and an inverter za connected to the two storage battery modules having the largest voltage value and the second largest voltage value starts the start-up/operation. An instruction to stop the operation is sent to the inverters x, y.

d) In switching the inverters, the output powers of the inverters x, y are decreased at a constant slope over a few seconds, and the output powers from the inverters x, y are increased at a constant slope over the same time so that the output power does not become discontinuous.

e) If the insolation intensity is changed exceeding the threshold value before the constant time has elapsed, the output management unit immediately makes the determination again and resends the instruction to each inverter.

Figure 23:
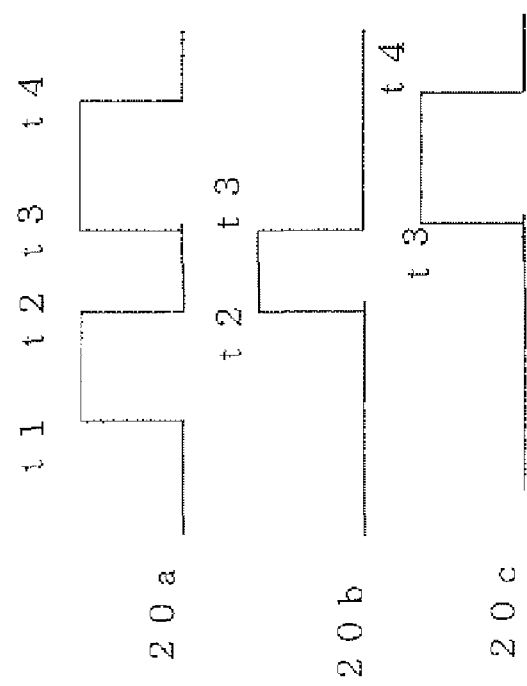
FIG. 23 is a time chart describing another control of the third embodiment of the present invention.

In another embodiment of the third embodiment, each solar battery string is started up in order assuming the output of the solar battery array and the power stored in the storage battery module are substantially equal. That is, the DC/AC inverters 60a to 60c are started up in order at equal interval as shown in a timing chart of FIG. 23. The sensor and the control become unnecessary by determining the order and the time interval in advance, and each DC/AC inverter can be controlled with an easy algorithm. Therefore, the output management unit 67 can be eliminated, and the start-up order merely needs to be determined among the DC/AC inverters.

As another embodiment of the third embodiment, when applying to the large scale power supply system, the solar battery array becomes a larger area, and thus the same output cannot be obtained from each solar battery array. For instance, a solar battery array that generates great amount of power in the morning and a solar battery array that generates great amount of power in the evening exist due to the installed location or the direction and tilt of the installation of the solar battery array. The solar battery arrays with different areas inevitably need to be used. Thus, the output power of each solar battery array, and the power amount stored in the storage battery module differ. Furthermore, if cloudy or rainy weather is predicted the next day, each power supply system can be controlled according to such prediction.

In other words, with respect to the solar battery string including the solar battery array that generates great amount of power in the morning, control is made to store great amount of power in the morning and discharge great amount in the evening. With respect to the solar battery string including the solar battery array that generates great amount of power in the evening, control is made to store great amount of power in the evening and discharge great amount in the morning.

Similarly, if cloudy or rainy weather is predicted the next day, the discharge of the present day is made small and the discharge of the next day is made large.

(Fourth Embodiment)

A power supply system according to a fourth embodiment of the present invention includes a plurality of DC power supply strings in which a storage battery module is connected in parallel to a DC power supply in each string, a DC/AC power conversion device for connecting the plurality of DC power supply strings to a power system or a load, and a storage battery module control unit for controlling the DC/AC power conversion device so that each storage battery module voltage becomes substantially the same.

Since the same amount of current can be retrieved without being biased from each DC power supply string by aligning the voltage of each storage battery module, the power conversion device can request a maximum power from the power supply system.

In the power supply system of the fourth embodiment, the storage battery module is desirably charged/discharged with a predetermined current.

The fourth embodiment further includes a storage battery current detecting unit for detecting an output current of each storage battery module. The voltage of each storage battery module can be aligned by arranging the storage battery current detecting unit, and thus the same amount of current can be retrieved without being biased from each DC power supply string, and the power conversion device can request a maximum power from the power supply system. Since the power request of the DC/AC power conversion device and the current of the storage battery modules are merely detected and controlled, the control or the aim of the present invention can be realized with an extremely simple control circuit.

The power supply system of the present invention preferably has the storage battery control unit which performs a control such that each storage battery module voltage becomes substantially equal before the DC/Ac power conversion device outputs power, at every predetermined time or constant interval, or when the storage battery module voltage reaches a predetermined voltage, in an example. According to such control, the output of each storage battery module is substantially the same when the power supply system outputs power, and thus the total power of each storage battery module can be supplied.

In the example, the power supply system of the present invention preferably has the DC power supply as solar battery or fuel battery. Thus, the generated power output of the solar battery or the fuel battery can be effectively used. Similarly, the DC power supply obtained by converting the AC power supply of a power generator, wind power generator etc. can also be used.

In the example, the power supply system of the present invention preferably has each DC power supply string connected through a backflow prevention diode. The over-charging of the storage battery module arranged in each DC power supply string is thereby prevented with a simple circuit.

Furthermore, according to another standpoint, a control method of the power supply system, the power supply system including a plurality of DC power supply strings with a DC power supply and a storage battery module, and a DC/AC power conversion device for converting the DC output of the plurality of DC power supply strings to AC output, includes a first process of controlling the voltage of each storage battery module so as to be substantially equal, and a second process of outputting power from the DC/AC power conversion device. The total power of each storage battery module then can be obtained.

The control method of the power supply system of the present invention further includes a third process in which each storage battery module charges with the lowest DC power supply output amount aligned, and outputs the remaining DC power supply output amount to the power conversion device when the output of the DC power supply differs. In other words, in the third process, when n+1 DC power supply strings are connected and the output of each DC power supply differs, control is made such that the DC/AC power conversion device always requests for the output power of greater than or equal to (I1−Ia)+(I2−Ia)+ . . . (In−Ia) where Ia is the minimum current and I1, I2, . . . , In are the current of the remaining DC power supplies of the DC power supplies.

Thus, the generated power output is obtained from the DC power supply such as solar battery or fuel battery, and the charging amount to each storage battery module can be aligned.

The control method of the power supply system of the present invention preferably gradually increases the output power of the power conversion device when having the voltage of each storage battery module substantially the same in the first process. When performing such control, the storage battery module voltage can be made the same by flowing small current.

The control method of the power supply system of the present invention preferably checks whether or not each storage battery module are all outputting the same current when having the voltage of each storage battery module substantially the same in the first process.

(Fourth Embodiment-1)

The fourth embodiment-1 is a power supply system enabling the total power of each storage battery module to be obtained from the power supply system, and preventing one storage battery module from being overly used.

Figure 24:
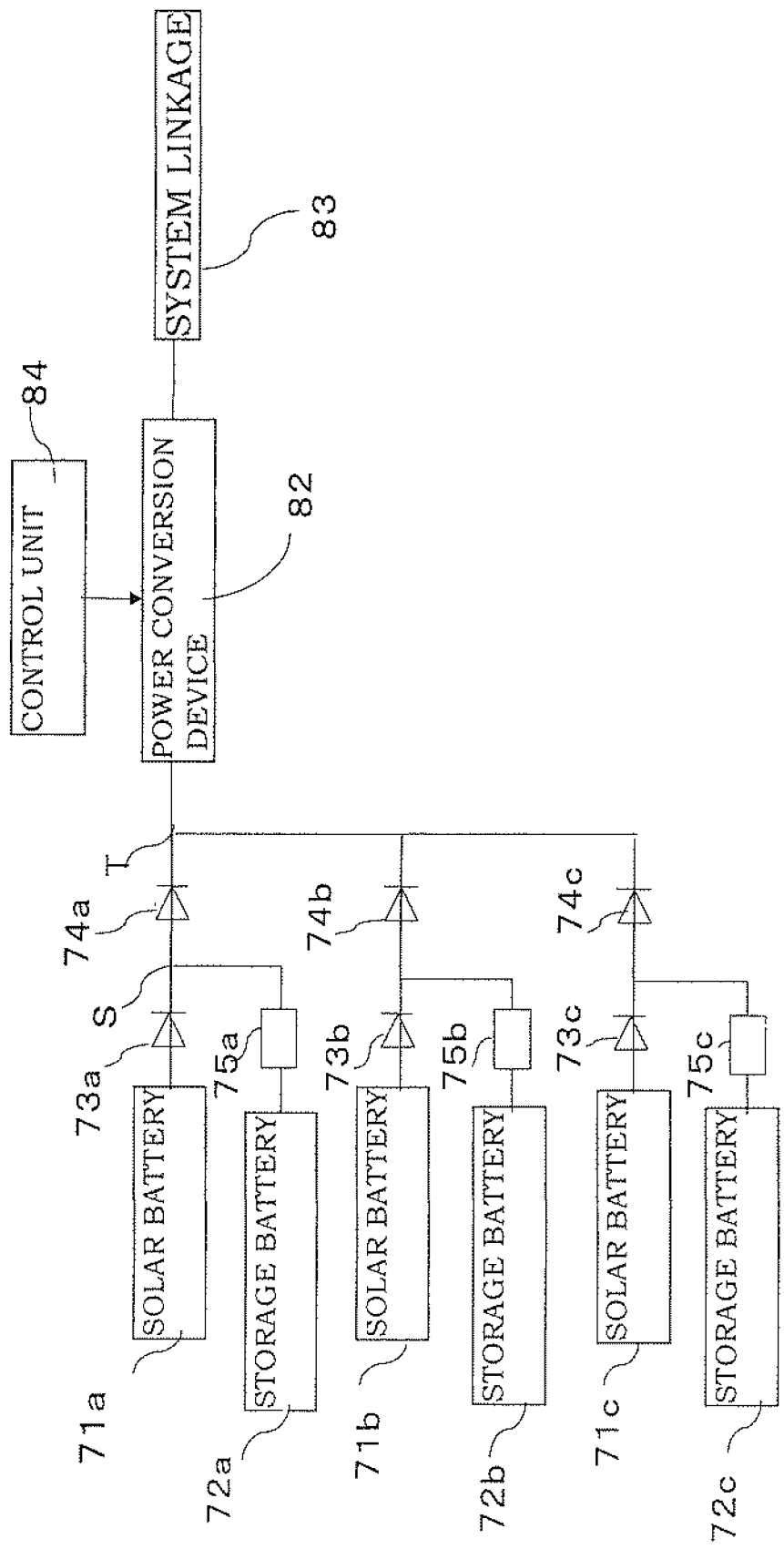
FIG. 24 is a block diagram of a power supply system according to a fourth embodiment-1 of the present invention.

As shown in FIG. 24, the power supply system of the fourth embodiment of the present invention configures a DC power supply string 81a by connecting a DC power supply 71a and a storage battery module 72a in parallel, and connects a plurality of DC power supply strings to the DC/AC power conversion device 82 in parallel. FIG. 24 shows a case where three DC power supply strings 81 are connected to the DC/AC conversion device 82, but the number of DC power supply strings is not limited, and may be two or may be three or more. In FIG. 24, each portion is indicated with an alphabet subscript to indicate plurality.

The DC/AC power conversion device 82 is connected to a system linkage 83, and the power supply system of the fourth embodiment power sells the output power to the system linkage 83. Alternatively, although not shown, the power may be supplied to a load. A storage battery control unit 84 is connected to the power conversion device 82, and the power conversion device 82 is controlled as described below.

A backflow prevention diode 73 is connected on the DC power supply side than a node S of the DC power supply 71 and the storage battery module 72. A backflow prevention diode 74 is connected between a node T of each DC power supply string and the node S. The diode 73 prevents the current from flowing into the DC power supply 71, and the diode 74 prevents exchange of power between each DC power supply string. A means for ensuring safety of the storage battery module such as a current fuse or a breaker 75 for allowing current in a safety range of the storage battery is connected on the output side of the storage battery module 72.

The DC power supply 71 is a DC power supply obtained from the solar battery, the fuel battery, or the like, but may be a DC power supply obtained by converting the power obtained by a wind generator or a power generator to a DC power. In the fourth embodiment, description is made on the solar battery.

The system linkage 83 shows a portion that absorbs power generated by the operation of the power supply system of the present invention, and may be a storage battery module as long as the output power can be absorbed. The power charged in the storage battery module may be subsequently supplied to the load.

As the storage battery module 72 arranged in the DC power supply string, a number of types of storage batteries such as lead battery, lithium ion battery, nickel battery, and the like can be used. The description is made on the lithium ion battery in the present embodiment. The storage battery module can be replaced with an electric double layer capacitor or a superconductive power storage device.

In FIG. 24, a switch is not arranged between the storage battery module 72 and the node S, but a switch may be arranged as in the first embodiment and controlled as in the first embodiment.

The power supply system of the fourth embodiment-1 may be a small scale power supply system to be mounted in a general household house, or may be a medium scale or a large scale power supply system to be mounted on the roof of an apartment house, a factory, a public facility, and the like, but the power supply system of the present invention needs to be a plurality of DC power supply strings. Therefore, the solar battery is divided into at least two regions, and the storage battery is arranged for every divided region to configure a plurality of DC power supply strings. The solar battery is configured by connecting a plurality of solar battery cells or a solar battery cell group in series.

The types of the solar battery in the fourth embodiment are the same as the solar battery module of the first to the third embodiments. The storage battery in the fourth embodiment-1 is the same as the storage battery module of the first to the third embodiments.

In the description below, in the fourth embodiment-1, the output current value of the storage battery needs to be suppressed to lower than or equal to 5 A from the aspect of safety of the system, and the rated output of each solar battery is 300 W and the usage region of the storage battery voltage is between 40 V and 60 V, but such numerical values are illustrated for explanation, and do not limit the scope of the present invention. In the following description, the current value and the voltage value of each storage battery are shown to facilitate the description, but such current value and voltage value do not need to be detected in the fourth embodiment-1, and thus a current sensor or a voltage sensor do not need to be arranged.

In the circuit shown in FIG. 24, the voltages of the storage battery modules 72a, 72b, and 72c are all aligned at 40 V. Thereafter, the solar battery modules 71a, 71b and 71c photovoltaic generate to charge each storage battery module. However, the solar battery modules 71a hides in the shadow of the cloud and the generated power output lowers. The solar battery module 71c hides in the shadow and does not generate power at all. As a result, the storage battery 72a becomes 50 V, the storage battery battery module 72b becomes 45 V, the storage battery module 72c becomes 40 V, and variation in the voltage of each storage battery occurs. The cause of variation in the voltage of the each storage battery is not only The variation in the insolation amount, but also direction of installation of each solar battery module, area of each solar battery module, power generation performance of each solar battery module, and charging characteristic of each storage battery module.

Therefore, when the power conversion device 82 makes a power request with the voltage of each storage battery module varied, the power is output from the storage battery module of high voltage. Since each battery voltage and the storage battery module current are not monitored in the present system, 5 A or greater is definitely not requested assuming a worst case (each battery voltage is greatly varied) where all 5 A is output from one string. In the present system, the larger the current is, the quicker the variation of the voltage can be corrected, and thus 5 A is preferable. In this case, the storage battery module 72a has the highest voltage, and thus power is output from the storage battery 72a. Other storage battery modules 72b, 72c cannot contribute to the output since the voltage is sufficiently lower than the storage battery 72a. The power supply system thus can only supply power in the allowable current range of the storage battery 72a.

In order to resolve the variation of each storage battery module voltage described above, the storage battery control unit 84 requests 5 A to be output from the power conversion device 82 in the power supply system of the fourth embodiment-1. The storage battery 72a has a higher voltage than the other storage battery modules 72b, 72c and thus current flows from the storage battery module 72a. If the internal resistance of the storage battery module 72a is 1Ω, the voltage of the storage battery module 72a lowers by the amount of internal resistance, and substantially becomes 45 V. Thus, the voltage becomes equal to the voltage of the storage battery module 72b on appearance. Thereafter, as the discharge advances, the power is also output from the storage battery module 72b. The discharging current is obviously larger in the storage battery module 72a for a while, and thus the storage battery module 72a is discharged more than the storage battery module 72b, and the lowering in voltage is also faster. Subsequently, the voltage of the node T lowers to 40 V, and discharge also starts from the storage battery module 72c. The discharging current of the storage battery module 72a at the instant the voltage of the node T becomes 40 V is 3 A, and the discharging current of the storage battery module 72b is 2 A. The voltage of the storage battery module 72a of when polarization by discharge does not exist is 43 V, 42 V, respectively, and the voltage difference of the two storage battery modules decreases from 5 V to 1 V at this time point.

Similarly, if the power conversion device 82 continues to request for 5 A even after the node T becomes 40 V, it operates so that the voltage between the storage batteries is aligned, where as a result of continuing such operation, each storage battery discharges by 1.7 A when the node T becomes 37 V so that the voltage is completely aligned. Exactly one hour has elapsed from when the control unit 84 has first requested to output 5 A from the power conversion device 82.

In the present system, each storage battery module voltage can be safely and rapidly aligned without monitoring each storage battery module voltage and storage battery module current by periodically making the power request from the power conversion device 82 at the current of one string.

Here, the reason for explaining the voltage of each storage battery module with the voltage of the node T is because since the solar battery module is installed on the roof or the rooftop, and the storage battery module is installed indoor, the solar battery module and the storage battery module are connected by a connection line and thus the voltage lowers by the resistance of the connection line.

The voltages of the three storage battery modules can be aligned, as described above. Meanwhile, the power conversion device 82 merely requests for the output power, and the storage battery control unit 84 merely commands the output request to the power conversion device 82, where the voltages are self-aligned by having each storage battery module output, and thus other special control is not necessary. The predetermined current in this case is the current the power conversion device only requests the current that definitely does not flow for greater than or equal to the allowable current in each string, and is 5 A in the fourth embodiment-1 but may be any ampere as long as it is lower than or equal to 5 A. Since the power requested by the power conversion device 82 during this operation is output to the system linkage to sell power, the power stored in the storage battery module does not become a waste. Instead of power selling, a storage battery module may be arranged in place of the system linkage, so that power is stored in the storage battery module to be used for power supply as one part of the power supply system of the present invention.

Therefore, when power selling to the system linkage or a request is made from the load after the voltages of the three storage batteries are aligned, the output can be safely obtained even if the control unit causes the power conversion device 82 to output a maximum current suppressed in view of safety of each DC power supply string, for example, 5 A from each DC power supply string and a total maximum current of 15 A.

The power supply system of the fourth embodiment-1 in the case that the DC power supply is a solar battery module, is operated for a constant time when reaching a predetermined time such as after sunset or in the evening of the day, so that voltage of each storage battery module can be aligned. Alternatively, the voltage of each storage battery module may be controlled to be aligned before the power supply system of the present invention outputs power. A timer may be arranged in the control unit, so that when a predetermined time interval such as a constant time or every three hours has elapsed, the generated power output of the solar battery module differs in each DC power supply string. Thus the above-described operation may be performed assuming the voltage of the storage battery, module becomes uneven. It is preferable to know the frequency at which the variation in the voltage of the system actually occurs so that how often and how long the above control needs to be performed can be predicted.

In the fourth embodiment-1, the storage battery module is charged as the solar battery module generates power, and the generated power output of the solar battery module is power supplied to the system linkage or the load through the power conversion device, which will be described in fourth embodiment-2 and fourth embodiment-3.

(Fourth Embodiment-2)

Figure 25:
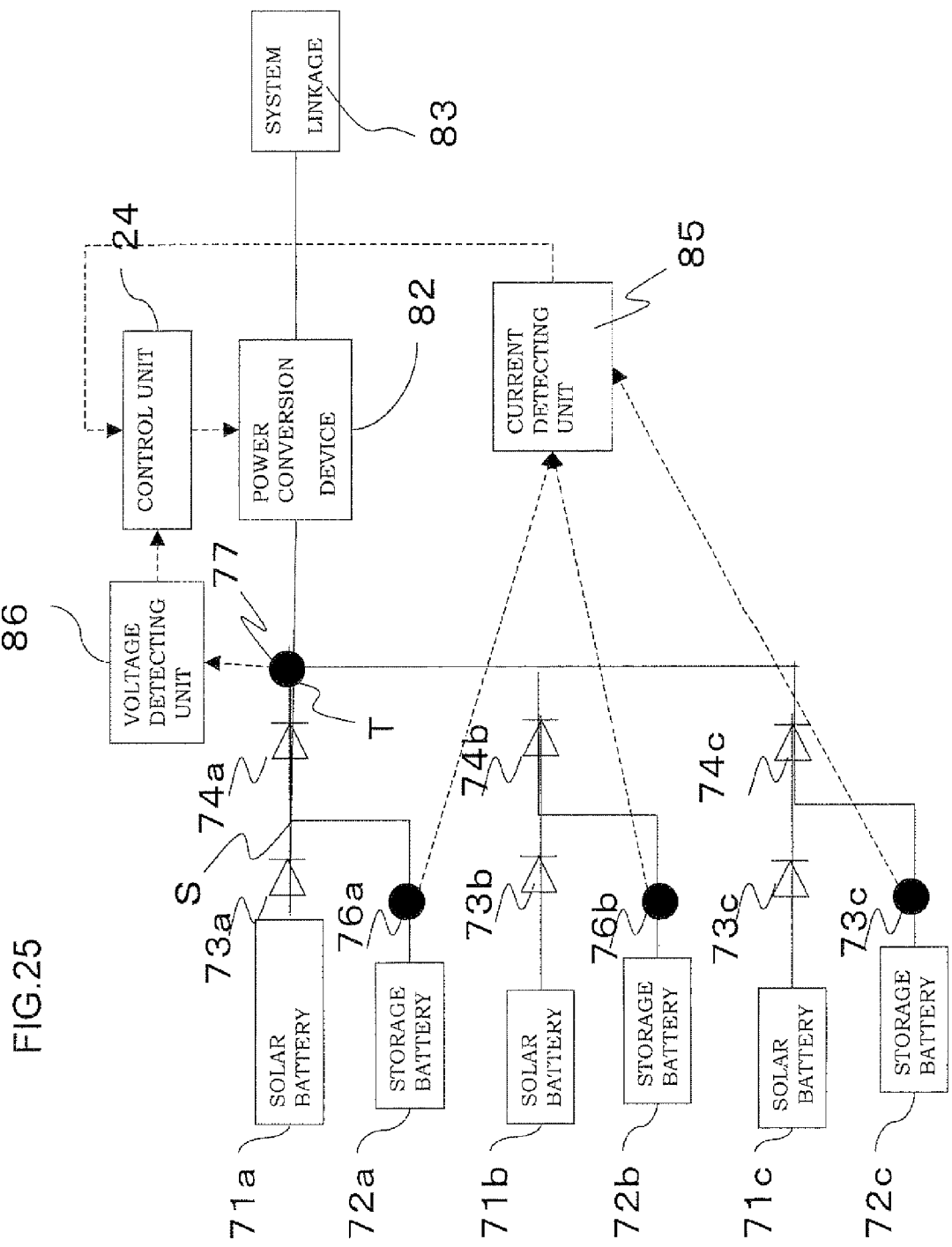
FIG. 25 is a block diagram of a power supply system according to a fourth embodiment-2 of the present invention.

FIG. 25 shows a power supply system of the fourth embodiment-2. The fourth embodiment-2 differs from FIG. 24 in the configuring portion in that current sensors 76a, 76b, 76c for detecting the charging current or the discharging current of each storage battery module are arranged, the detection output is monitored with a current detecting unit 85, and the result is sent to the storage battery control unit 84, and in that a voltage sensor 77 for detecting the voltage of the node T of each DC power supply string is arranged, the detection output is monitored with a voltage detecting unit 86, and the result is sent to the storage battery control unit 84. Others are the same as the fourth embodiment-1 shown in FIG. 24. FIG. 25 does not show a current fuse or a breaker 75 for ensuring safety of the storage battery module on the output side of the storage battery module 72 to prevent the drawing from being complicating, but can be connected similar to FIG. 24. The output current value of the storage battery module needs to be suppressed to lower than or equal to 10 A in view of the safety of the system.

In the circuit shown in FIG. 25, the voltages of the storage battery modules 72a, 72b, and 72c are all aligned at 50 V at this moment. Strictly, the storage battery module voltage of each DC power supply string is measured at the node T in the fourth embodiment-2 as well, but each storage battery module voltage will be described for the sake of convenience. Thereafter, the solar battery modules 71a, 17b, and 71c charge each storage battery module 72a, 72b, and 72c but the generated power output of the solar battery modules 71b and 71c lower, and as a result, the storage battery module 72a becomes 60 V, the storage battery module 72b becomes 55 V, and the storage battery module 72c becomes 59 V, and voltage of each storage battery module varies. Alternatively, variation due to individual difference of the performance of each solar battery module and each storage battery module occurs. The voltage of the node T is detected at the highest storage battery module voltage, and thus 60 V is detected at this point.

Since the usage region of the storage battery is 40 V to 60 V, the control unit 84 commands a power request of 2 A to the power conversion device 82 when detecting that the voltage of the node T is 60V. Alternatively, the control unit commands a power request of 2 A to the power conversion device 82 before the power conversion device outputs or for every predetermined time or a constant interval.

The current then flows from the storage battery module 72a, but since the internal resistance of the storage battery module 72a is 1Ω, the voltage drops by that much and substantially becomes 58 V. Thus, the voltage is higher than the storage battery modules 72b, 72c, and only the storage battery module 72a outputs. The control unit 84 then increases the power request amount of the power conversion device 82 so that the voltage of the storage battery module 72a becomes equal to the voltage of the storage battery module 72b. The control unit 84 also increases the power request amount of the power conversion device 82 so that the voltages of the storage battery module 72b, 72c become equal to the voltage of the storage battery module 72a. When the voltages of the three storage battery modules 72a, 72b, and 72c become the same on appearance, the current can be output from the three storage battery modules 72a, 72b, and 72c.

Since the voltages of the three storage battery modules can be aligned as described above, the output power of the power conversion device 82 is then reduced. When the currents of the three storage battery modules become the same, the control unit 84 stops the operation of the power conversion device 82, and the power supply system waits until a request of output power is made.

Figure 26:
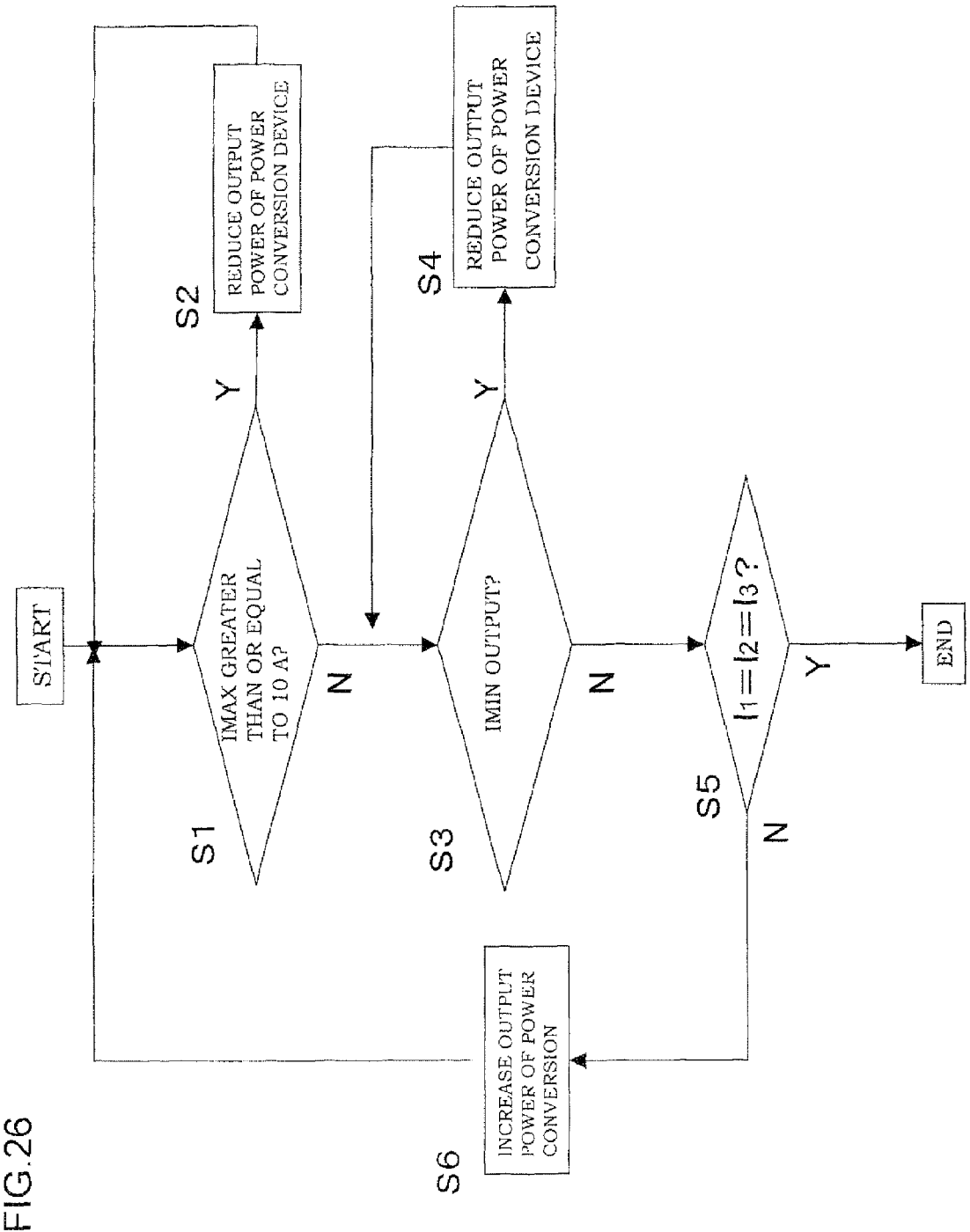
FIG. 26 is a flowchart of the fourth embodiment-2 of the present invention.

The above description will be described in detail with a flowchart shown in FIG. 26. That is, in the power supply system, when n+1 DC power supply strings are connected and the outputs of the DC power supplies differ, a third process of controlling such that the power conversion device constantly requests for the power amount of greater than or equal to (I1−Ia)+(I2−Ia)+(In−Ia), where Ia is the minimum current, and I1, I2, . . . , In are the remaining currents of the DC power supplies, is provided. The third process may be provided as needed.

The control unit 24 first detects the currents I1, I2, I3 flowing from each storage battery module when detecting that any one of the three storage battery modules 72a, 72b, 72c has become 60 V (i.e., when voltage of the node T is detected as 60 V), when the output currents of the three storage battery modules 72a, 72b, 72c are misaligned at greater than or equal to a predetermined value, when reaching a predetermined time, before the power supply system outputs power, or when reaching a predetermined time interval. Assuming the detected maximum current as Imax and the minimum current as Imin, determination is made on whether or not Imax is greater than or equal to 10 A (step S1). If Imax is greater than or equal to 10 A, the requesting power of the power conversion device is decreased (step S2) and the process returns to step S1. If Imax is less than 10 A, the process proceeds to step S3.

Determination is then made on whether or not Imin is output (step S3). If Imin is output, the requesting power of the power conversion device 82 is decreased (step S4), and the process returns to step S3. If Imin is not output, the process proceeds to step S5.

Whether the currents I1, I2, I3 are the same is checked (Step S5). As it is difficult to accurately obtain I1=I2=I3, a range such as the difference between Imax and Imin is within 10% is preferably provided. If I1=I2=I3 (value is substantially zero), the flow is terminated. If I1=2=I3 is not met, the requesting power of the power conversion device is increased (step S6), and the process returns to step S1.

In the fourth embodiment-2, the power conversion device 82 is controlled in a state either one of the three storage battery module currents is close to zero and discharges, but if the generated power output from the solar battery module is added, a detecting unit for detecting a combined output is arranged, where the combined output of each string is monitored and control is made in a state the minimum combined output is close to zero. That is, the determination reference of step S3 is not set to Imin, but the minimum value of the combined output is set to a value close to zero. The power usage amount of the storage battery module thus is suppressed to a minimum, and the voltage of each storage battery module can be aligned in a fastest manner. This is because at the point output from the string, the string voltage thereof can be assumed as the same voltage on appearance as at the node T. The predetermined current refers to the current at which Imin operates close to zero instead of zero, or the current at which Imax operates near the allowable current.

The voltage and the current of each storage battery described above will be described below with elapse of time.

Figure 27:
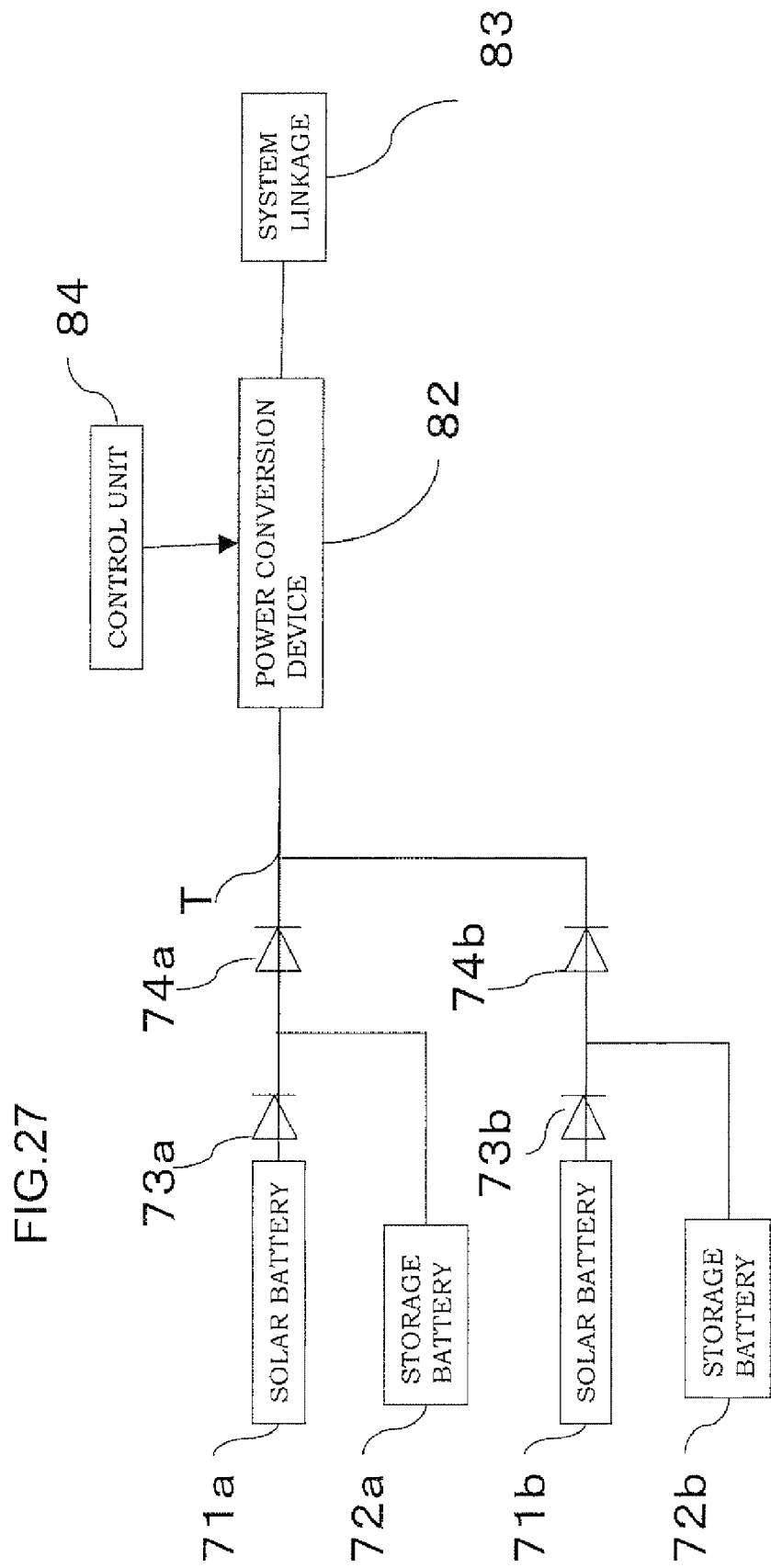
FIG. 27 is a block diagram describing voltage and current of each storage battery with elapse of time in a fourth embodiment-3 of the present invention.
Figure 28:
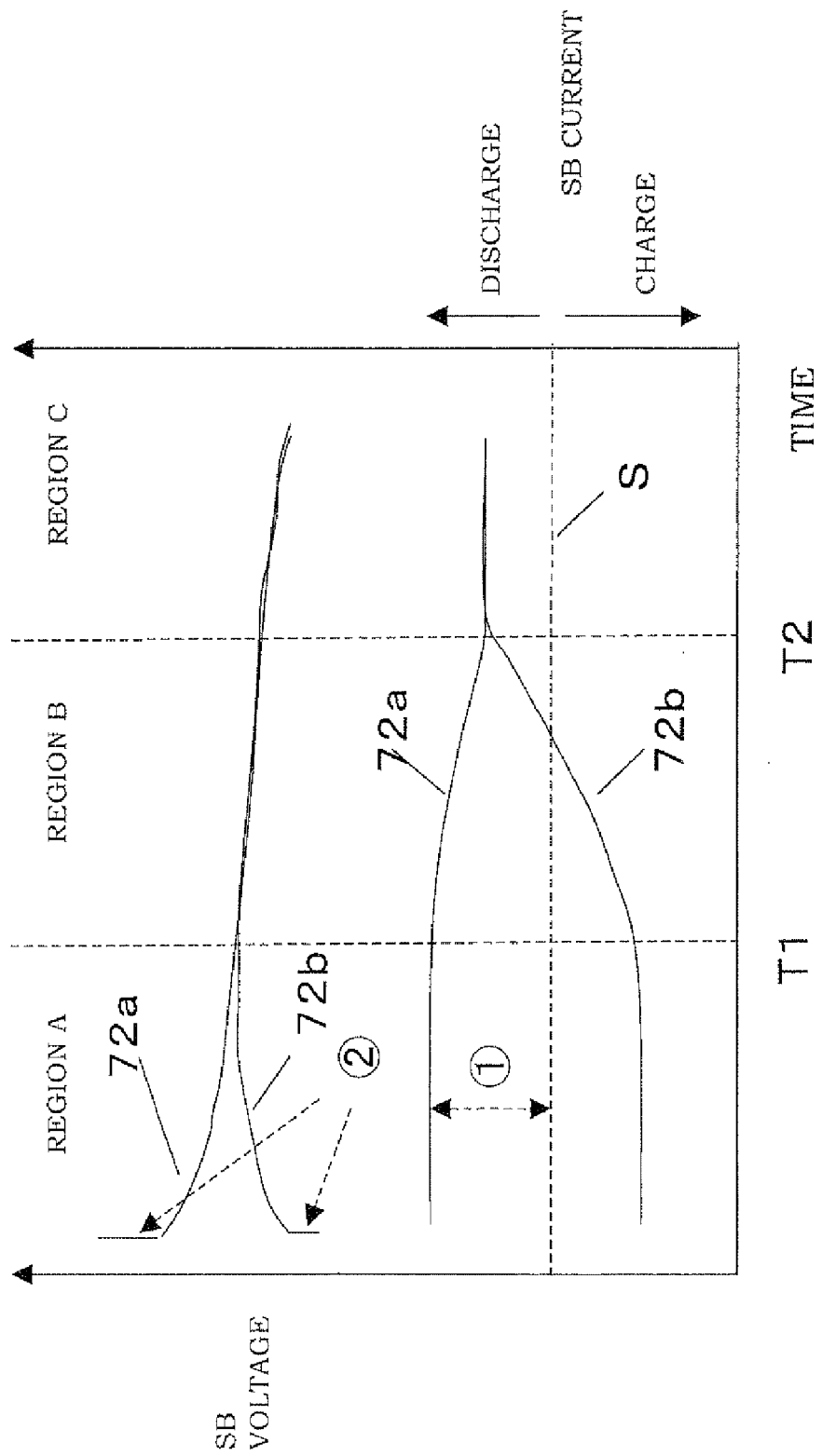
FIG. 28 is a view describing voltage and current of each storage battery with elapse of time in the fourth embodiment-3 of the present invention.

FIG. 27 is a block diagram for describing the voltage and the current of each storage battery module with elapse of time, where two DC power supply strings are shown to simplify the description. FIG. 28 shows change in voltage and current of each storage battery module when request of power from the power conversion device with elapse of time. Each solar battery module is assumed to make a constant output. The storage battery module of higher initial battery voltage is 72a, and the lower one is 72b.

When the power conversion device requests power, output is first made from the storage battery module 72a of higher battery voltage. If the power requested by the power conversion device cannot be covered by the solar battery module output 71a of higher battery voltage, power is also discharged from the storage battery module 72a of lower voltage. Regarding the solar battery module 71b and the storage battery module 72b, whether power is discharged to the power conversion device or power is charged to the storage battery module 72b is determined according to the difference of the voltage between the power requested amount of the power conversion device and the storage battery module 72a. In FIG. 28, the power of the solar battery module 71b is charged to the storage battery module 72b in the region A to the first time T1. The fact that the storage battery module 72b is being charged is indicated by having the current of the storage battery module 72b below a boundary line S of charge and discharge of the storage battery module current in FIG. 28.

In the region A, the above-described state is continued, where the storage battery module voltages are lined on appearance when entering the region B from time T1 to time T2. This is a state in which if the power conversion device stops the power request while the battery voltages appeared to be aligned, the voltages again disperse by polarization. In region B, the current difference of the storage battery module 72a and the storage battery module 72b is in a saturated state, where the current difference does not become larger even if more power is requested from the power conversion device. However, the current difference still exists, where the voltage difference of the two storage battery modules becomes smaller by the current difference and eventually the currents flowing through the two storage battery modules become the same and the voltages thereof also become the same, and a region C indicated after time T2 is reached. In region C, a state in which the voltages of the two storage battery modules are actually aligned is obtained.

That is, if variation exists in each storage battery module, the variation of each battery can be said as being corrected at fastest speed if the state is in region B. The condition existing in region B includes that the power conversion device is sufficiently requesting power as a prerequisite. If the power conversion device is not sufficiently requesting power, the polarization to the discharge side of the storage battery module 72a is small, and the storage battery module voltages are not aligned on appearance. When attempting to forcibly align the storage battery module voltages on appearance by increasing the requesting power of the power conversion device, the variation of the voltage is large, the discharging current of the storage battery module 72a becomes too large, whereby the storage battery module may become overcurrent, the wiring may be burnt and cut, the safety fuse may blow out, and the safety of the system may not be ensured. According to the above-described reasons, if the voltages of the storage battery modules cannot be aligned on appearance, the power conversion device needs to be controlled so as to request as large as possible to the extent and at an extent the above-described state does not occur.

As described above, the fourth embodiment-2 can align the variation of each storage battery module voltage at the fastest speed. Furthermore, each storage battery module voltage can be quickly aligned since the power requesting amount of the power conversion device is small, and the discharge power of the storage battery module can be made small. In the description of the present embodiment, a case of minimizing the power requesting amount of the power conversion device is not described, but the power requesting amount of the power conversion device can be minimized by measuring and controlling the output of the solar battery module.

(Fourth Embodiment-3)

The fourth embodiment-3 will be described using FIG. 25. In the fourth embodiment-3, a method of charging the storage battery module to a maximum extent while preventing variation in voltage of the storage battery module in advance when the generated power amount of the solar battery module differs using the sensors 76a, 76b, 76c for detecting the current of the storage battery module is realized. In the fourth embodiment-3, the power is supplied by the power supply system after aligning the storage battery module voltages as described in the fourth embodiment-1 and -2. Furthermore, in the fourth embodiment-3, a method of charging the storage battery module to a maximum extent while preventing variation of the voltage of the storage battery module in advance when the generated power amount of the solar battery module differs is implemented as below.

Figure 29:
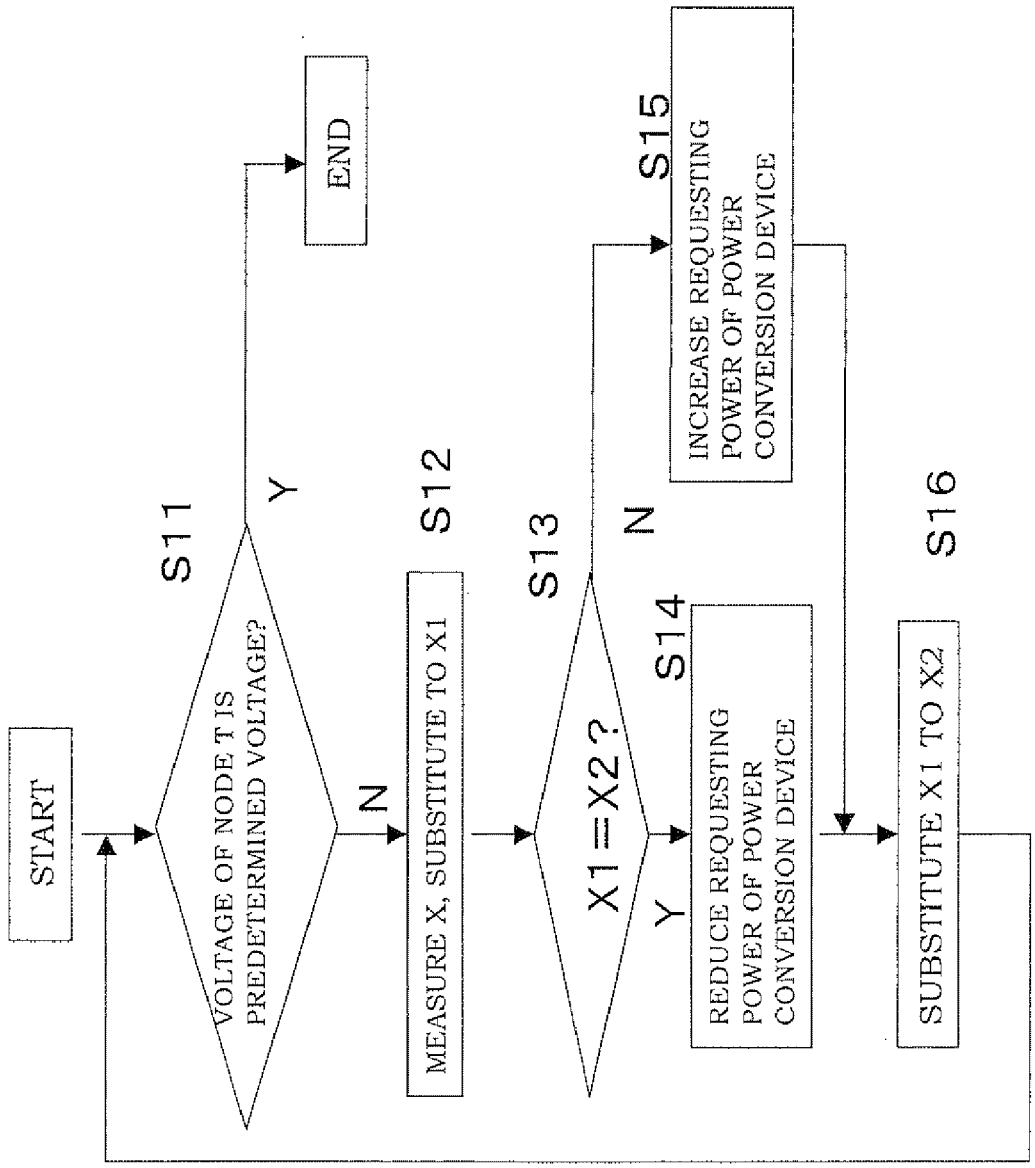
FIG. 29 is a flowchart of the fourth embodiment-3 of the present invention.

FIG. 29 shows a flowchart of the fourth embodiment-3, describing a process of charging without varying the storage battery module voltage even if the generated power amount of the solar battery module is different. In the following description, the current value of the solar battery module is shown to simplify the explanation, but such current values do not need to be detected in the fourth embodiment-3, and thus a current sensor does not need to be arranged.

Figure 30:
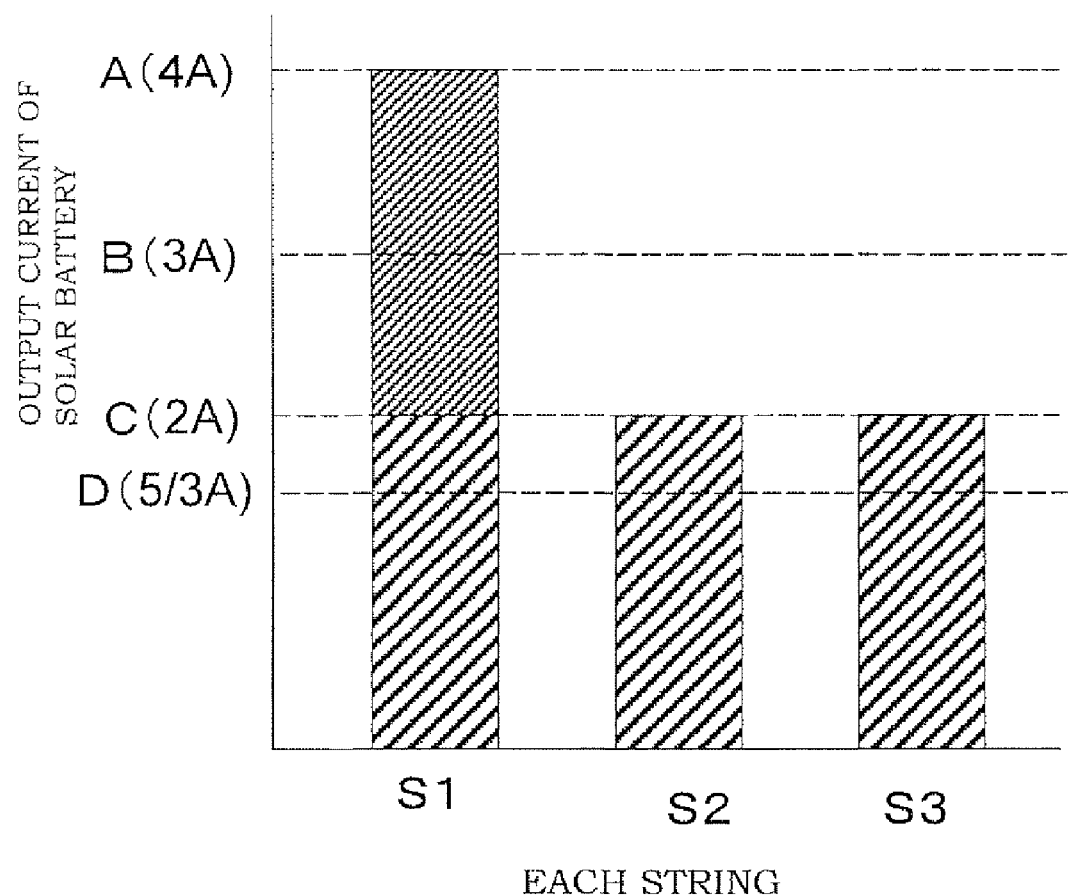
FIG. 30 is a view describing an output current of each DC power supply string in the fourth embodiment-3 of the present invention.
Figure 31:
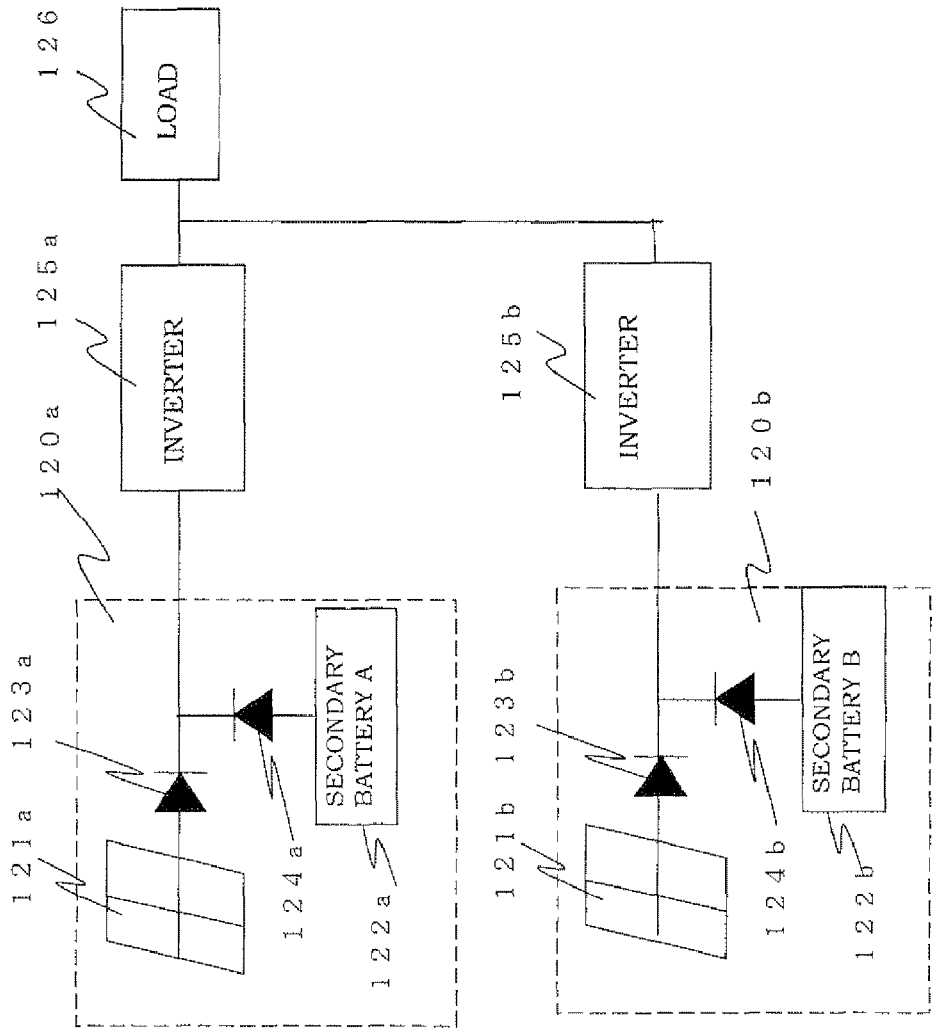
FIG. 31 is a configuration view of a first power supply system of the prior art.
Figure 32:
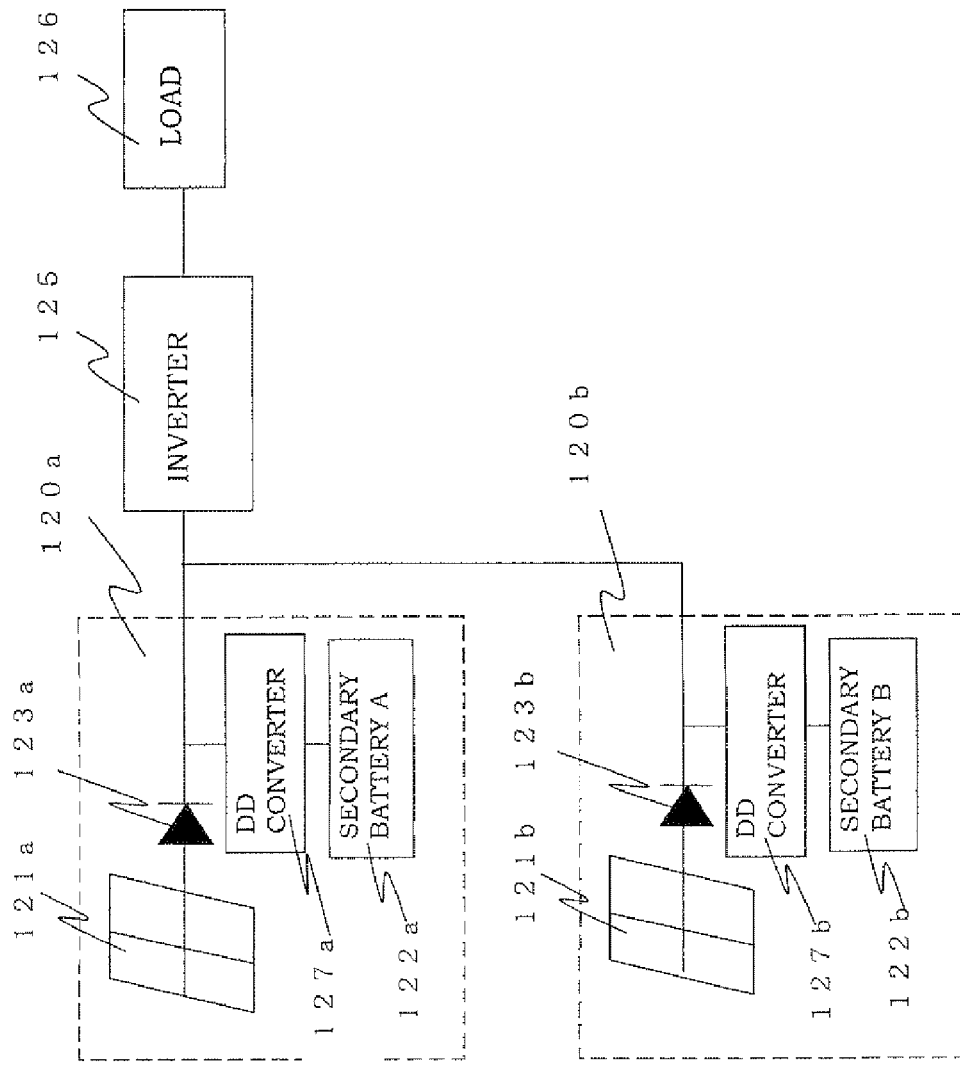
FIG. 32 is a configuration view of a second power supply system of the prior art.
Figure 33:
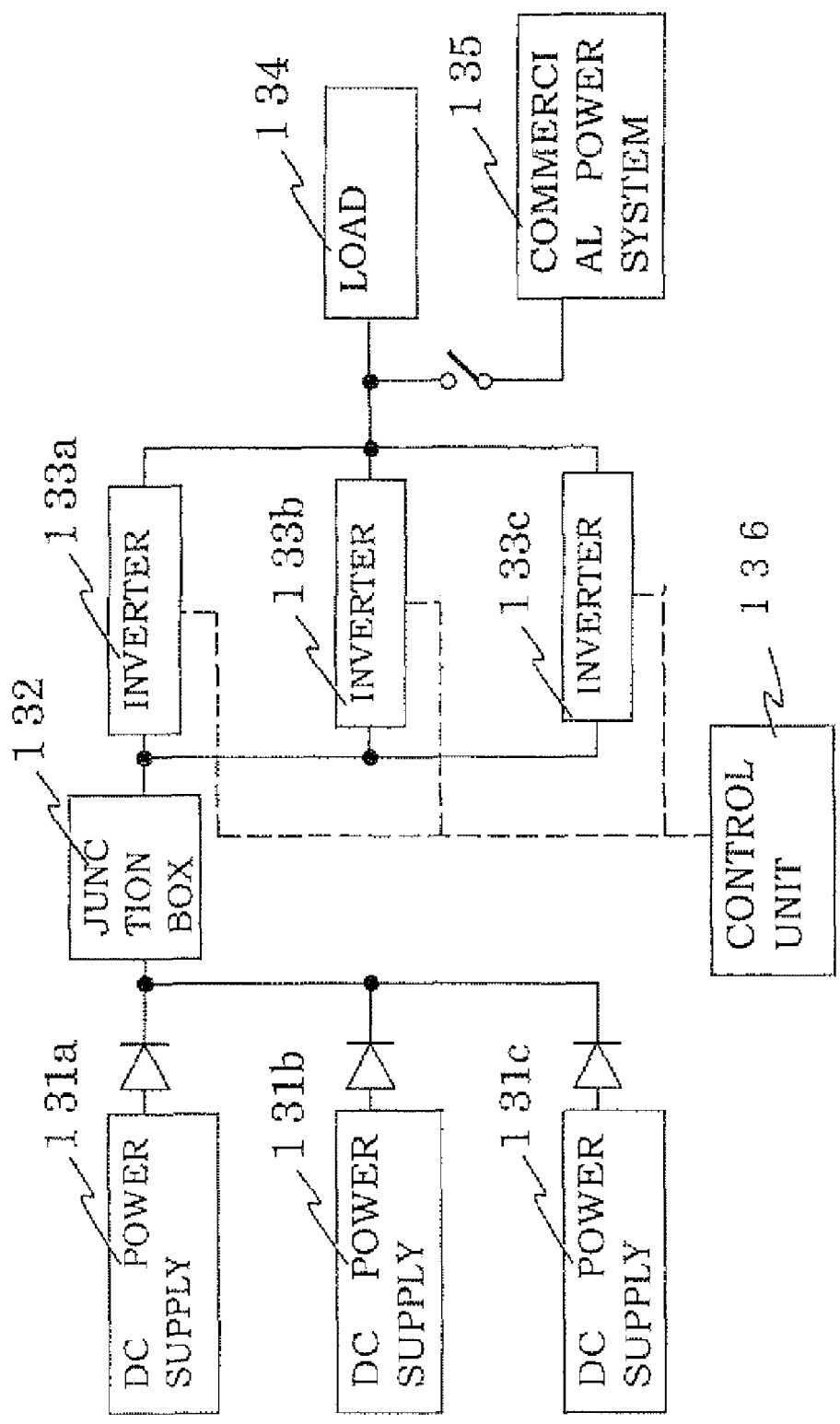
FIG. 33 is a configuration view of a third power supply system of the prior art.

FIG. 30 shows a solar battery module output current of three DC power supply strings. The solar battery module output current of string S1 is 4 A, and the solar battery module output currents of string S2 and string S3 are 2 A.

If each storage battery module voltage is aligned as in the process of fourth embodiment-1, -2, the output of the solar battery module of each string are all input to each storage battery module, and thus the storage battery module of string 1 is charged more by 2 A than the storage battery module of other strings. A difference creates in the state of charge of the storage battery module in this state.

Description will be described in the flowchart of FIG. 29 based on the above. In step S11, whether or not the voltage of the node T is full charge voltage is determined in this case. If full charge, the flowchart is terminated. If not full charge voltage, X is calculated in step S12, and its value is substituted to X1. X is the value of the difference between the maximum value and the minimum value of the output currents I1, I2, I3 of the storage battery modules 72a, 72b, and 72c. Regarding the current X1, the maximum current is 4 A at the output current I1 of the solar battery module 71a, the minimum current is 2 A at the output currents I2,I3 of the solar battery modules 71b, 71c, and the difference X1 is 2 A.

In step S13, X1=X2 is determined. X2 is desirably zero for an initial value. Since the X1 is currently 2 A and X2 is zero, the process proceeds to step S15, and the requested power of the power conversion device is increased. If 1 A is increased, output is made from the string of great solar battery output, and the power of the region of output A to B shown in FIG. 30 is supplied to the power conversion device.

In step S16, X1 is substituted to X2. The data (2A) of the current X1 is thereby stored in X2.

The process then returns to the first step S11, and whether or not the voltage of the node T is the full charge voltage is made. If not the full charge, the process proceeds to step S12, X is again calculated, and the value thereof is substituted to X1. Regarding the current X1, the maximum current is 3 A at the output current I1 of the solar battery module 71a, the minimum current is 2 A at the output currents I2, I3 of the solar battery modules 71b, 71c, and the difference X1 is 1 A.

In step S13, X1=X2 is determined. Since the X1 is currently 1 A and X2 is 2 A, the process proceeds to step S15, and the requested power of the power conversion device is increased. If 1 A is further increased, output is made from the string of great solar battery output, and the power of the region of output A to C shown in FIG. 30 is supplied to the power conversion device.

In step S16, X1 is substituted to X2. The data (1A) of the current X1 is thereby stored in X2.

The process then returns to the first step S11, and the determination whether or not the voltage Of the node T is the full charge voltage is made. If not the full charge, the process proceeds to step S12, X is again calculated, and the value thereof is substituted to X1. Regarding the current X1, the maximum current is 2 A at the output current I1 of the solar battery 1 A, the minimum current is 2 A at the output currents I2, I3 of the solar batteries 2 A, 3 A, and the difference X1 is zero.

In step S13, X1=X2 is determined. Since the X1 is currently zero and X2 is 1 A, the process proceeds to step S15, and the requested power of the power conversion device is increased. If 1 A is further increased, since 2 A is already output from the string of great solar battery output at the current point, the solar battery output is at point C (2 A) in each string, and thus output is made by ⅓ A equally. As a result, the power of the region of output A to D shown in FIG. 30 is supplied to the power conversion device.

In step S16, X1 is substituted to X2. The data (1A) of the current X1 is thereby stored in X2.

The process returns to the first step S11, and the determination whether or not the voltage of the node T is the full charge voltage is made. If not the full charge, the process proceeds to step S12, X is again calculated, and the value thereof is substituted to X1. Regarding the current X1, that maximum current is I1=I2=I3=⅔ A, and the difference X1 is zero.

In step S13, X1=X2 is determined. Since the X1 is currently zero and X2 is also zero, the process proceeds to step S14, and the requested power of the power conversion device is decreased.

In step S16, X1 is substituted to X2. The data (1A) of the current X1 is thereby stored in X2. The process thereafter returns to step S11, and this flowchart is repeated.

In the above described description, the behavior in an ideal state is described, but actually, an allowable range needs to be set when determining X1=X2 in step S13.

In the present system, control is basically made such that the storage battery module voltage does not vary, but there is actually a possibility the voltage will slightly vary due to instantaneous insolation variation and the like. In this case, X does not become zero even in the region (below C in FIG. 30) X should become zero. X moves in a direction of approaching zero if the output of the power conversion device is maintained within the scope of the description of the present invention. However, the amount of change per unit time of the approaching speed is small.

The change in current due to local insolation variation, and output change of the power conversion device occurs in a relatively short time interval. Using this difference, determination can be made when the value of X is changed, on whether the change in X is due to local insolation variation or output change of the power conversion device, or the change in X is due to voltage variation of each storage battery module.

In the flowchart of FIG. 29, the optimum value of the allowable range can be determined by quickening the state transition, and setting the amount of change of the requesting power of the power conversion device large enough the change in X due to variation of the storage battery module can be ignored.

The X that changes by the variation of the storage battery module is preferably set to lower than or equal to ⅕ of X that changes by the output adjustment of the power conversion device, more preferably to lower than or equal to ¹⁄₁₀, and most preferably to lower than or equal to ¹⁄₂₀. If set to lower than or equal to ⅕, X1=X2 can be determined in step S13 with an error range of 20%.

According to the above processes, the charging power to each storage battery module can be aligned even if the output of the solar battery module is varied, and charging can be carried out to a maximum extent while suppressing voltage variation between each storage battery, module. In other words, when n+1 DC power supply strings are connected, the power conversion device constantly requests for the power amount of greater than or equal to (I1−Ia)+(I2−Ia)+ . . . (In−Ia), where Ia is the minimum current, and I1, I2, . . . , In are the remaining currents of the DC power supplies, so that the current values of each storage battery module are all unified at Ia, and charging can be carried out to a maximum extent while suppressing voltage variation between each storage battery module.

It should be apparent to those skilled in the art that the present invention may be embodied in many other specific forms without departing from the spirit or scope of the invention. Therefore, the present invention is not to be limited to the details given herein, but may be modified within the scope and equivalence of the appended claims.

What is claimed is:

1. A power supply system comprising:
  a DC power supply string in which a storage battery module is connected in parallel to a DC power supply;
  a DC/AC power conversion device for connecting the DC power supply string to a power system or a load; and
  a switch, connected between the DC power supply and the storage battery module, for switching an output power of the DC power supply when the switch is ON or OFF or a combined output power of the DC power supply and the storage battery module when the switch is ON and supplying to the DC/AC power conversion device,
  wherein the DC power supply is a solar battery module, and the DC power supply string is a solar battery string, wherein the DC power supply string includes a time monitoring unit, a voltage detecting unit, or a current detecting unit, wherein the switch is switched when one of the time monitoring unit, the voltage detecting unit, or the current detecting unit satisfies a predetermined condition, and wherein the predetermined condition is
   i) start output (switch ON) when a detected voltage of the voltage detecting unit or a detected current of the current detecting unit becomes greater than or equal to a predetermined value, or stop output (switch OFF) when becoming smaller than or equal to the predetermined value,
   ii) start output (switch ON) or stop output (switch OFF) in accordance with a predetermined time of the time monitoring unit,
   iii) start output (switch ON) or stop output (switch OFF) when the detected voltage of the voltage detecting unit or the detected current of the current detecting unit becomes greater than or equal to the predetermined value and in accordance with the predetermined time of the time monitoring unit, and
   iv) start output (switch ON) or stop output (switch OFF) when the detected voltage of the voltage detecting unit or the detected current of the current detecting unit becomes smaller than or equal to the predetermined value and in accordance with the predetermined time of the time monitoring unit.

2. The power supply system according to claim 1, wherein the storage battery module has a charging capacity for storing an output power generated by the solar battery module for at least 0.3 hours.

3. The power supply system according to claim 1, wherein the storage battery module is set to a voltage range capable of retrieving a power of greater than or equal to 60% and less than or equal to 100% with respect to a maximum power point voltage (Vpmax) output when the solar battery module receives a predetermined insolation amount at a predetermined temperature.

4. The power supply system according to claim 1, including a plurality of power supply devices in parallel to the power system or the load including the DC power supply string and the DC/AC power conversion device, further comprising a power conversion control unit for controlling the DC/AC power conversion device according to the output power of the DC power supply.

5. The power supply system according to claim 4, further comprising a storage amount detecting means for detecting a storage amount of a storing unit, wherein the power conversion control unit controls the DC/AC power conversion device according to the storage amount detected by the storage amount detecting means.

6. The power supply system according to claim 4, further comprising an output power amount detecting means for detecting an output power amount of the power supply system, wherein the power conversion control unit controls the DC/AC power conversion device according to the output power amount detected by the output power amount detecting means.

7. A power supply system comprising:
   a solar battery string in which a storage battery is connected in parallel to a solar battery;
   a DC/AC power conversion device for connecting the solar battery string to a power system or a load;
   a battery state detecting unit for detecting a state of the storage battery;
   an output detecting unit for detecting an output power of the DC/AC power conversion device; and
   an output control unit for controlling the DC/AC power conversion device based on the state of the storage battery detected by the battery state detecting unit and the output power detected by the output detecting unit,
   wherein the storage battery includes a plurality of storage battery modules with a corresponding plurality of electromotive forces, and
   wherein the output control unit controls the DC/AC power conversion device such that power is drawn from a storage battery module whose electromotive force will not cause an overcurrent flow from any other storage battery module.

8. The power supply system according to claim 7, wherein the battery state detecting unit includes one or more of a voltage of the storage battery modules, a state of charge (SOC), and a rate of change in the state of charge (SOC) per unit time.

9. The power supply system according to claim 7, further comprising a data storage unit or a communication unit for receiving external data, wherein
   the data storage unit or the communication unit acquires one or more information of past insolation data, average air temperature data, predicted insolation amount or predicted air temperature by weather forecast, temperature data of the solar battery module, predicted temperature characteristics of the solar battery module, and degrading information of the storage battery module; and
   the output control unit controls the DC/AC power conversion device based on the information.

10. The power supply system according to claim 7, wherein the battery state detecting unit includes
   a voltage comparison part numbering in the order of high storage battery voltage detected by the battery state detecting unit,
   a storage battery group generating part for generating a storage battery group in the order of high numbering by the voltage comparison part, and
   a first start-up control part for controlling the DC/AC power conversion device so that the output power of the DC/AC power conversion device becomes smaller than a total output power permitted from the storage battery group in start-up of the power supply system.

11. The power supply system according to claim 7, wherein the battery state detecting unit includes
   an SOC comparison part numbering in the order of large state of charge (SOC) of the storage battery modules detected by the battery state detecting unit,
   an SOC storage battery group generating part for generating an SOC storage battery group in the order of large state of charge (SOC) numbered by the SOC comparison part, and
   a second start-up control part for controlling the DC/AC power conversion device so that the output power of the DC/AC power conversion device becomes smaller than a total output power permitted from the SOC storage battery group in start-up of the power supply system.

12. The power supply system according to claim 7, wherein the solar battery string includes a charge switch for every storage battery module to turn ON the charge switch and charge the storage battery module with the solar battery module configuring the DC power supply when a charging amount of the storage battery module is small in time of solar irradiation.

13. The power supply system according to claim 7,
wherein the power supply system comprises a plurality of (n) solar battery strings,
wherein SB1, SB2 ... SBn are the storage battery modules at time of start-up of the power supply system in order of high voltage E1, E2, ... En,
wherein the output control unit controls the DC/AC power conversion device to output power P from each storage battery module SBi satisfying a condition $(E1-Ei)/r < \Delta I\max, i=2, 3 \ldots, k,$ r being an internal resistance of the storage battery module,
$\Delta I\max$ being a margin from an absolute maximum rating Imax of an output current of the storage battery module, and $k \geq n$, and
wherein the output power P satisfies a relational expression, $P < (E1 - r \times I\max) \times (I\max + I2\max + \ldots + Ik\max) \times \eta,$ $(Ii\max = I\max \times (Ei - (E1 - r \times I\max))/(E1 - r \times I\max), i=2, 3 \ldots, k)$ η being an efficiency of the DC/AC power conversion device.

14. The power supply system according to claim 13, wherein the voltage of each storage battery module is periodically monitored from the start-up of the power supply system, and an output acceptable value of the DC/AC power conversion device is increased in correspondence to increase in k when the k is increased as additional storage battery modules satisfy the condition $(E1-Ei)/r < \Delta I\max$.

15. The power supply system according to claim 7,
wherein the plurality of storage battery modules include first and second storage battery modules with corresponding first and second electromotive forces, the first electromotive force being highest of all electromotive forces, and
wherein the output control unit controls the DC/AC power conversion device to draw power from the second storage battery module only when the second electromotive force is sufficiently high such that a difference between the first and second electromotive forces will not cause the overcurrent to be drawn from the first storage battery module.

16. The power supply system according to claim 7, further comprising a switch, connected between the solar battery and the storage battery for switching an output power of the solar battery when the switch is OFF or a combined output power of the solar battery and the storage battery when the switch, is ON and supplying to the DC/AC power conversion device.

17. A power supply system, comprising:
a plurality of DC power supply strings in which a storage battery module is connected in parallel to a DC power supply in each DC power supply string;
a DC/AC power conversion device arranged to connect the plurality of DC power supply strings to a power system or a load; and
a storage battery control unit arranged to control the DC/AC power conversion device to substantially equalize voltages of the storage battery modules by controlling the DC/AC power conversion device to make a power request from the plurality of DC power supply strings.

18. The power supply system according to claim 17, further comprising:
a storage battery current detecting unit for detecting an output current of each storage battery module,
wherein the storage battery control unit controls the DC/AC power conversion device based on the currents detected by the current detecting units so that each storage battery module voltage becomes substantially equal.

19. The power supply system according to claim 17, wherein the storage battery control unit controls the DC/AC power conversion device such that each storage battery module voltage becomes substantially equal before the DC/AC power conversion device outputs power, at every predetermined time or constant interval, or when the storage battery module voltage reaches a predetermined voltage.

20. The power supply system according to claim 17, further comprising a switch for one or more of the DC power supply strings, wherein the switch is connected between the DC power supply and the storage battery of the DC power supply string for switching an output power of the DC power supply when the switch is OFF or a combined output power of the DC power supply and the storage battery module when the switch is ON and supplying to the DC/AC power conversion device.

21. The power supply system according to claim 17, wherein the storage battery control unit controls the DC/AC power conversion device so that each storage battery module voltage becomes substantially the same without having overcurrent drawn from any of the storage battery modules.

22. The power supply system according to claim 17, wherein storage battery control unit is arranged output control signals only to the DC/AC power conversion device.

23. The power supply system according to claim 17, wherein the storage battery control unit is arranged such that when the storage battery control unit controls the DC/AC power conversion device to substantially equalize the voltages of the storage battery modules, the storage battery control unit controls the DC/AC power conversion device such that a total amount of current drawn from all of the plurality of DC power supply strings is less than or equal to a maximum allowable current from the storage battery module of one DC power supply string.

24. The power supply system according to claim 17, further comprising:
a plurality of current sensors each arranged to detect charging or discharging currents of the storage battery modules,
wherein the storage battery control unit is arranged such that when the storage battery control unit controls the DC/AC power conversion device to substantially equalize the voltages of the storage battery modules, the storage battery control unit controls the DC/AC power conversion device such that an amount of current drawn from each DC power supply strings is less than or equal a maximum allowable current from the storage battery module of one DC power supply string.

25. The power supply system according to claim 24, further comprising:
a voltage sensor arranged to detect a voltage output by the plurality of DC power supply strings,
wherein the storage battery control unit is arranged to control the DC/AC power conversion device to substantially equalize the voltages of the storage battery modules when the voltage detected by the voltage sensor is at or above a predetermined maximum operating voltage.

26. The power supply system according to claim 24, wherein the storage battery control unit is arranged such that when the storage battery control unit controls the DC/AC power conversion device to substantially equalize the voltages of the storage battery modules, the storage battery control unit controls the DC/AC power conversion device such that the amounts of current drawn from the DC power supply strings are all substantially equal.

27. A control method of a power supply system, the power supply system including a plurality of DC power supply strings in which a storage battery module is connected in parallel to a DC power supply in each DC power supply string, and a DC/AC power conversion device for connecting the plurality of DC power supply strings to a power system or a load, the method comprising the steps of:
controlling the DC/AC power conversion device to substantially equalize voltages of the storage battery modules; and
outputting power from the DC/AC power conversion device,
wherein the step of controlling the DC/AC power conversion device to substantially equalize voltages of the storage battery modules comprises controlling the DC/AC power conversion device to make a power request from the plurality of DC power supply strings.

28. The control method of the power supply system according to claim 27, further comprising when n+1 DC power supply strings are connected and the output of each DC power supply differs, controlling the DC/AC power conversion device such that the DC/AC power conversion device always requests for the output power of greater than or equal to (I1-Ia)+(I2-Ia)+ ... (In-Ia) where Ia is a minimum current and I1, I2, ... In is the current of the remaining DC power supplies of the DC power supplies.

29. The control method according to claim 27, wherein in the step of controlling the DC/AC power conversion device to substantially equalize the voltages of the storage battery modules, only the DC/AC power conversion device is directly controlled.

30. The control method according to claim 27, wherein the step of controlling the DC/AC power conversion device to make the power request to substantially equalize the voltages of the storage battery modules comprises controlling the DC/AC power conversion device to make the power request such that a total amount of current drawn from the plurality of DC power supply strings is less than or equal to a maximum allowable current from the storage battery module of one DC power supply string.

31. The control method according to claim 30, wherein the step of controlling the DC/AC power conversion device to make the power request to substantially equalize the voltages of the storage battery modules is performed without monitoring the voltage and the current of each storage battery module.

32. The control method according to claim 27, further comprising detecting currents of each of the storage battery modules,
wherein the step of controlling the DC/AC power conversion device to make the power request to substantially equalize the voltages of the storage battery modules comprises controlling the DC/AC power conversion device to make the power request such that an amount of current drawn from each DC power supply strings is less than or equal a maximum allowable current from the storage battery module of one DC power supply string.

33. The control method according to claim 32, wherein the step of controlling the DC/AC power conversion device to make the power request to substantially equalize the voltages of the storage battery modules comprises controlling the DC/AC power conversion device to make the power request such that the amounts of current drawn from the DC power supply strings are all substantially equal.

34. The control method according to claim 32, further comprising detecting a voltage output by the plurality of DC power supply strings,
wherein the step of controlling the DC/AC power conversion device to make the power request to substantially equalize the voltages of the storage battery modules is performed when the detected voltage output by the plurality of DC power supply strings is at or above a predetermined maximum voltage.

* * * * *